United States Patent
Jung et al.

(10) Patent No.: US 7,694,881 B2
(45) Date of Patent: Apr. 13, 2010

(54) SUPPLY-CHAIN SIDE ASSISTANCE

(75) Inventors: Edward K. Y. Jung, Bellevue, WA (US);
Royce A. Levien, Lexington, MA (US);
Mark A. Malamud, Seattle, WA (US);
John D. Rinaldo, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 994 days.

(21) Appl. No.: 11/061,387

(22) Filed: Feb. 18, 2005

(65) Prior Publication Data
US 2006/0080188 A1     Apr. 13, 2006

Related U.S. Application Data

(63) Continuation-in-part of application No. 11/041,861, filed on Jan. 21, 2005, and a continuation-in-part of application No. 11/037,828, filed on Jan. 18, 2005, and a continuation-in-part of application No. 11/037,827, filed on Jan. 18, 2005, and a continuation-in-part of application No. 11/037,825, filed on Jan. 18, 2005, and a continuation-in-part of application No. 11/000,736, filed on Dec. 1, 2004, and a continuation-in-part of application No. 11/000,687, filed on Dec. 1, 2004, and a continuation-in-part of application No. 10/978,243, filed on Oct. 29, 2004, and a continuation-in-part of application No. 10/974,561, filed on Oct. 27, 2004, and a continuation-in-part of application No. 10/974,555, filed on Oct. 26, 2004, and a continuation-in-part of application No. 10/974,476, filed on Oct. 26, 2004, and a continuation-in-part of application No. 10/955,966, filed on Sep. 30, 2004.

(51) Int. Cl.
*G06K 15/00*     (2006.01)

(52) U.S. Cl. .................. 235/462.13; 235/376; 235/375; 235/383; 235/385; 235/462.01; 235/440

(58) Field of Classification Search ............ 235/462.13, 235/376
See application file for complete search history.

(56) References Cited

U.S. PATENT DOCUMENTS 5,287,102 A     2/1994   McKiel, Jr.

(Continued)

OTHER PUBLICATIONS

Alexander, Keith; Gilliam, Tig; Gramling, Kathy; Grubelic, Chris; Kleinberger, Herb; Leng, Stephen; Moogimane, Dhaval; Sheedy, Chris; "IBM Business Consulting Services—Applying Auto-ID to Reduce Losses Associated with Shrink"; Auto-ID Center Massachusetts Institute of Technology; bearing dates of Nov. 1, 2002, Feb. 1, 2003, Jun. 2002 and Nov. 2002; pp. 1-56; Auto-ID Center IBM-AUTOID-BC-003; located at: http://quintessenz.org/rfid.docs/www.autoidcenter.org/publishedresearch/ibm-autoid-bc-003.pdf; printed on Feb. 3, 2005.

(Continued)

*Primary Examiner*—Michael G Lee
*Assistant Examiner*—Kristy A Haupt
(74) *Attorney, Agent, or Firm*—Suiter Swantz pc llo

(57) ABSTRACT

An apparatus, device, method, computer program product, and system that identifies an item having a presence within a geographic locale in response to a signal indicative of the item, obtains a first instance of a supply-chain assistance corresponding to the identified item from a first source and obtaining a second instance of a supply-chain assistance corresponding to the identified item from a second source; and aggregates the first supply-chain assistance and the second supply-chain assistance.

39 Claims, 55 Drawing Sheets

U.S. PATENT DOCUMENTS

| | | | |
|---|---|---|---|
| 5,388,251 | A | 2/1995 | Makino et al. |
| 5,812,977 | A | 9/1998 | Douglas |
| 5,825,355 | A | 10/1998 | Palmer et al. |
| 5,877,757 | A | 3/1999 | Baldwin et al. |
| 5,887,171 | A | 3/1999 | Tada et al. |
| 5,923,325 | A | 7/1999 | Barber et al. |
| 5,938,721 | A | 8/1999 | Dussell et al. |
| 5,965,858 | A * | 10/1999 | Suzuki et al. ............... 235/375 |
| 5,991,739 | A | 11/1999 | Cupps et al. |
| 6,112,181 | A | 8/2000 | Shear et al. |
| 6,230,170 | B1 | 5/2001 | Zellweger et al. |
| 6,256,378 | B1 | 7/2001 | Iggulden et al. |
| 6,462,660 | B1 | 10/2002 | Cannon et al. |
| 6,466,899 | B1 | 10/2002 | Yano et al. |
| 6,542,814 | B2 | 4/2003 | Polidi et al. |
| 6,584,496 | B1 | 6/2003 | Ludtke |
| 6,651,053 | B1 * | 11/2003 | Rothschild ..................... 707/3 |
| 6,727,830 | B2 | 4/2004 | Lui et al. |
| 6,788,313 | B1 | 9/2004 | Heil |
| 6,799,205 | B2 | 9/2004 | Ludtke |
| 6,816,881 | B1 | 11/2004 | Mohindra et al. |
| 6,829,668 | B2 | 12/2004 | Keskar et al. |
| 6,874,037 | B1 | 3/2005 | Abram et al. |
| 6,882,712 | B1 | 4/2005 | Iggulden et al. |
| 6,920,612 | B2 | 7/2005 | Makinen |
| 7,043,691 | B1 | 5/2006 | Kwon et al. |
| 7,055,737 | B1 | 6/2006 | Tobin et al. |
| 7,082,365 | B2 | 7/2006 | Sheha et al. |
| 7,129,927 | B2 | 10/2006 | Mattsson |
| 7,212,827 | B1 | 5/2007 | Vesschl |
| 7,277,884 | B2 | 10/2007 | Vadai et al. |
| 2002/0023144 | A1 | 2/2002 | Linyard et al. |
| 2002/0032497 | A1 * | 3/2002 | Jorgenson et al. ........... 700/115 |
| 2002/0062280 | A1 | 5/2002 | Zachariassen et al. |
| 2002/0069030 | A1 | 6/2002 | Xydis |
| 2002/0075243 | A1 | 6/2002 | Newton |
| 2002/0105550 | A1 | 8/2002 | Biebesheimer et al. |
| 2002/0152173 | A1 | 10/2002 | Rudd |
| 2002/0164997 | A1 | 11/2002 | Parry |
| 2003/0018742 | A1 | 1/2003 | Imago |
| 2003/0032426 | A1 | 2/2003 | Gilbert et al. |
| 2003/0043178 | A1 | 3/2003 | Gusler et al. |
| 2003/0048288 | A1 | 3/2003 | Drif et al. |
| 2003/0058266 | A1 | 3/2003 | Dunlap et al. |
| 2003/0064805 | A1 | 4/2003 | Wells |
| 2003/0098876 | A1 | 5/2003 | Makinen |
| 2003/0100964 | A1 | 5/2003 | Kluge et al. |
| 2003/0101178 | A1 | 5/2003 | Miyata et al. |
| 2003/0125057 | A1 | 7/2003 | Pesola |
| 2003/0132854 | A1 * | 7/2003 | Swan et al. ............. 340/825.49 |
| 2003/0191820 | A1 | 10/2003 | Ludtke |
| 2003/0192947 | A1 * | 10/2003 | Toedtli ....................... 235/376 |
| 2003/0222897 | A1 | 12/2003 | Moore et al. |
| 2003/0227392 | A1 * | 12/2003 | Ebert et al. ............. 340/825.49 |
| 2004/0034651 | A1 | 2/2004 | Gupta et al. |
| 2004/0088228 | A1 | 5/2004 | Mercer et al. |
| 2004/0088696 | A1 | 5/2004 | Kawano et al. |
| 2004/0090451 | A1 | 5/2004 | Lay et al. |
| 2004/0095480 | A1 | 5/2004 | Battles et al. |
| 2004/0103153 | A1 | 5/2004 | Chang et al. |
| 2004/0107043 | A1 | 6/2004 | de Silva |
| 2004/0107144 | A1 | 6/2004 | Short |
| 2004/0111273 | A1 | 6/2004 | Sakagami et al. |
| 2004/0121764 | A1 | 6/2004 | Rivero |
| 2004/0136574 | A1 | 7/2004 | Kozakaya et al. |
| 2004/0139180 | A1 | 7/2004 | White et al. |
| 2004/0162896 | A1 | 8/2004 | Cen et al. |
| 2004/0179545 | A1 | 9/2004 | Erola et al. |
| 2004/0201867 | A1 | 10/2004 | Katano |
| 2004/0242224 | A1 | 12/2004 | Janik et al. |
| 2005/0055287 | A1 * | 3/2005 | Schmidtberg et al. ......... 705/28 |
| 2005/0060436 | A1 | 3/2005 | Kienhoefer |
| 2005/0076302 | A1 | 4/2005 | Okamoto |
| 2005/0080879 | A1 | 4/2005 | Kim et al. |
| 2005/0108044 | A1 * | 5/2005 | Koster .......................... 705/2 |
| 2005/0154985 | A1 | 7/2005 | Burkhart et al. |
| 2005/0160270 | A1 | 7/2005 | Goldberg et al. |
| 2005/0219223 | A1 | 10/2005 | Kotzin et al. |
| 2005/0228869 | A1 | 10/2005 | Imago |
| 2005/0262062 | A1 | 11/2005 | Xia |
| 2005/0268234 | A1 | 12/2005 | Rossi, Jr. et al. |
| 2006/0026304 | A1 | 2/2006 | Price |
| 2006/0028428 | A1 | 2/2006 | Dai et al. |
| 2006/0073815 | A1 | 4/2006 | Pines et al. |
| 2006/0092033 | A1 | 5/2006 | Hoff et al. |
| 2006/0100912 | A1 | 5/2006 | Kumar et al. |
| 2006/0115802 | A1 | 6/2006 | Reynolds |
| 2006/0164239 | A1 * | 7/2006 | Loda .................... 340/539.22 |
| 2007/0005233 | A1 | 1/2007 | Pinkus et al. |
| 2007/0027903 | A1 | 2/2007 | Evans et al. |
| 2007/0033414 | A1 | 2/2007 | Dunko |
| 2007/0064644 | A1 | 3/2007 | Dowling et al. |

OTHER PUBLICATIONS

"Capabilities"; Profit Logic; pp. 1-2; located at: http://www.profitlogic.com/capabilities.htm; printed on Feb. 3, 2005.

Emigh, Jacqueline; "IBM Unleashes New RFID Middleware"; eWeek Enterprise News & Reviews—Attention Health Care Technology Experts; bearing dates of Dec. 16, 2004 and 2005; pp. 1-2; located at: http://www.eweek.com/print_article2/0,2533,a=141068,00.asp; printed on Feb. 3, 2005.

"EPC RFID-based Inventory Management Solution Delivers Faster, Better Goods Logistics"; Solution Architects; bearing a date of 2003; pp. 1-15; located at: www.intel.com/business/bss/solutions/blueprints/pdf/30034101.pdf; printed on Jan. 10, 2005.

"Get real time warehouse management with Cadence WMS."; Cadre Cadence Warehouse Management System Software; pp. 1; located at: http://www.cadretech.com/warehouse_mgmt.html; printed on Jan. 10, 2005.

"IBM RFID solution for asset tracking and inventory management"; pp. 1-3; located at: http://www-1.ibm.com/industries/wireless/doc/content/solution/1025230104.html; printed on Feb. 3, 2005.

"IBM RFID solution for asset tracking and inventory management"; pp. 1-3; located at: http://www-1.ibm.com/industries/wireless/doc/content/solution/1025230204.html; printed on Feb. 3, 2005.

Kuchinskas, Susan; "IBM in Major RFID Expansion"; Jupiterimages; Sep. 27, 2004; pp. 1-2; located at: http://www.internetnews.com/wireless/print.php/3412991; printed on Feb. 3, 2005.

Kuchinskas, Susan; "IBM Takes on Flood of RFID Data"; Jupiterimages; Jul. 19, 2004; pp. 1-3; located at: http://www.internetnews.com/ent-news/print.php/3382621; printed on Feb. 3, 2005.

"Nordstrom: Inventory Management Transformation"; Accenture.com; bearing a date of 1995-2005; pp. 1-2; located at: http://www.accenture.com/xd/xd.asp?it=enweb&xd=industries%5Cproducts%5Cretail%5Ccase%5Creta_nordstrom.xml; printed on Feb. 3, 2005.

"Solutions"; Profit Logic; pp. 1-2; located at: http://www.profitlogic.com/solutions.htm; printed on Feb. 3, 2005.

The EPCglobal Network™: Overview of Design, Benefits, & Security; EPCglobal Inc.; Sep. 24, 2004; pp. 1-11; located at: http://www.epcglobalinc.org/news/position_papers.html; printed on Feb. 3, 2005.

U.S. Appl. No. 11/528,480, filed Sep. 26, 2006, Jung et al.

U.S. Appl. No. 11/524,025, filed Sep. 19, 2006, Jung et al.

U.S. Appl. No. 11/069,893, filed Feb. 2, 2005, Jung et al.

Heywood, Drew; "Drew Heywood's Windows 2000 Network Services"; bearing a date of Feb. 28, 2001; pp. 1-17; Sam's; located at http://proquest.safaribooksonline.com/print?xmlid=0672317419/ch01lev1sec4; printed on Mar. 13, 2008.

PCT International Search Report; International App. No. PCT/US05/38495; Jul. 9, 2008; pp. 1-2.

PCT International Search Report; International App. No. PCT/US05/38839; Jul. 7, 2008; pp. 1-3.

U.S. Appl. No. 12/012,216, Jung et al.

Excerpt from The Cambridge Dictionary Online; bearing a date of 2009; printed on Oct. 23, 2009; pp. 1-2; Cambridge University Press; located at http://dictionary.cambridge.org/define.asp?key=62453&dict=CALD; (as provided by examiner).

U.S. Appl. No. 12/012,216, filed Sep. 18, 2008, Jung et al.

* cited by examiner

FIG. 11

402 A computer-readable medium.

404 A computer program for executing on a computing device a computer process, the computer process comprising:
a) receiving a signal indicative of an item having a presence within a geographic locale;
b) identifying the item in response to the signal indicative of an item; and
c) obtaining an end user assistance corresponding to the item.

400

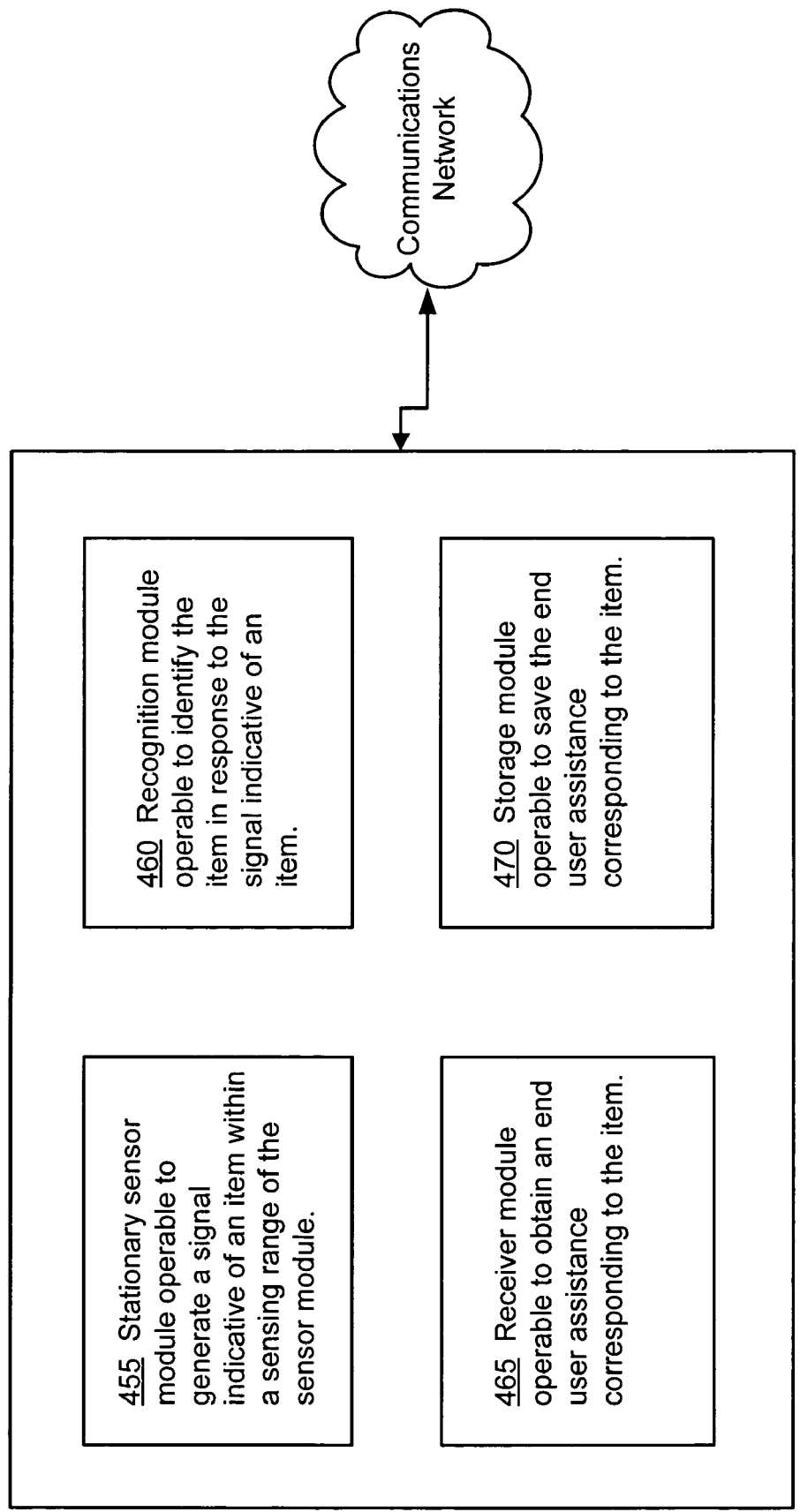

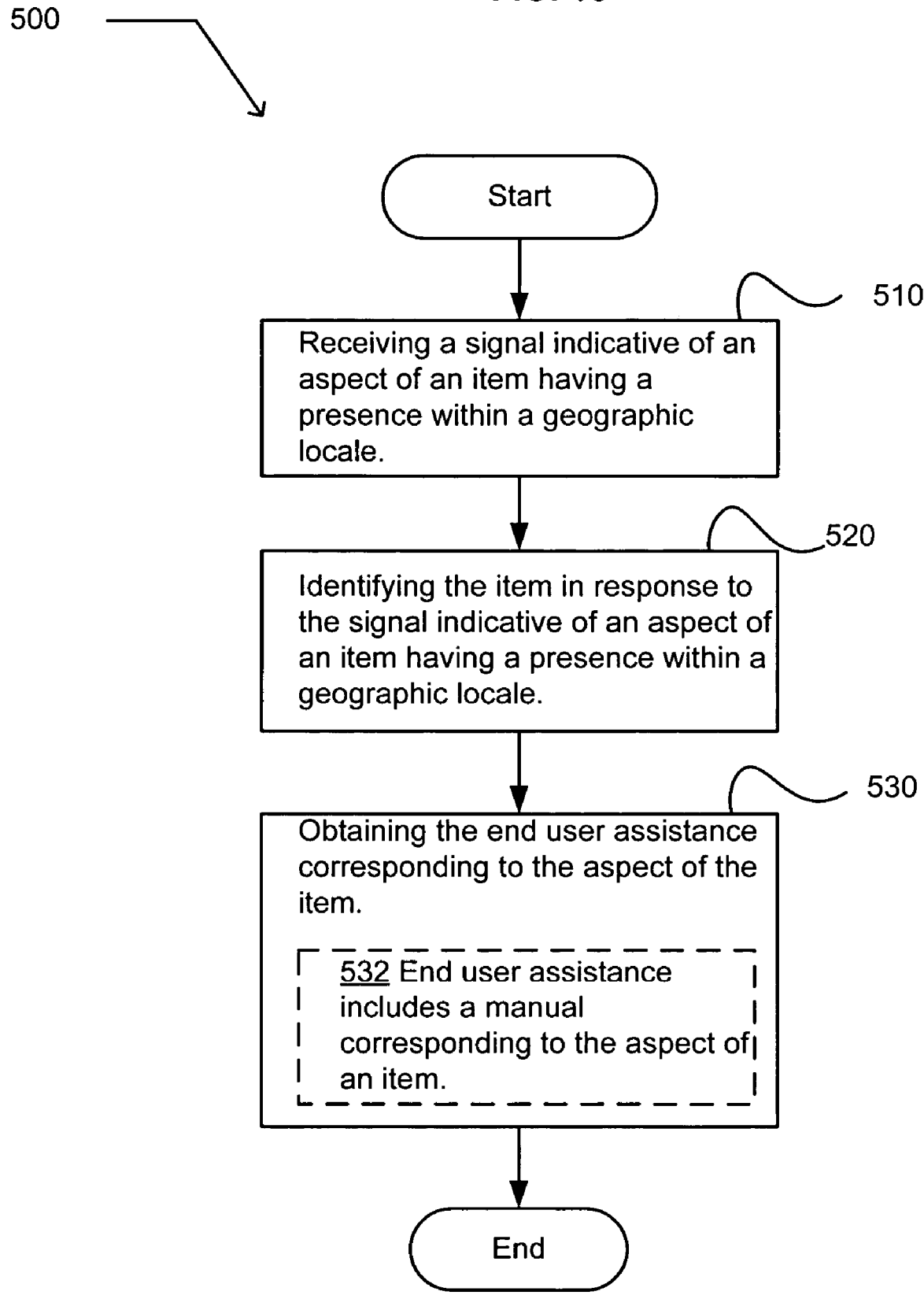

Start → 510

Receiving a signal indicative of an aspect of an item having a presence within a geographic locale.

512 Receiving a signal indicative of an aspect of an item having a presence within a premises.

514 Receiving a signal indicative of a state of the item.

516 Receiving a signal indicative of an intrinsic state of the item.

518 Receiving a signal indicative of an extrinsic state of the item.

519 Receiving a signal indicative of an illumination state of an aspect of the item.

520 Identifying the item in response to the signal indicative of an aspect of an item having a presence within a geographic locale.

530 Obtaining the end user assistance corresponding to the aspect of the item.

End

FIG. 18

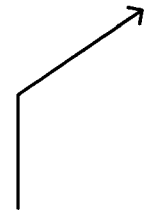

560

562 A computer-readable medium.

564 A computer program for executing on a computing device a computer process, the computer process comprising:
 a) receiving a signal indicative of an aspect of an item having a presence within a geographic locale;
 b) identifying the item in response to the signal indicative of an aspect of an item having a presence within a geographic locale;
 c) obtaining an end user assistance corresponding to the aspect of the item; and
 d) save the end user assistance corresponding to the aspect of the item.

568 detecting a presence of the item within a geographic locale.

570 generating the signal indicative of the aspect of an item.

572 requesting the end user assistance corresponding to aspect of the item.

574 providing the end user assistance corresponding to the aspect of the item.

902 A computer-readable medium.

904 A computer program product encoding a computer program for executing on a computing device a computer process, the computer process comprising:
 a) identifying an operative coupling between a first electronic device and a second electronic device, the first and second electronic devices having a presence in a geographic locale; and
 b) obtaining an end user assistance corresponding to the operative coupling.

906 c) Receiving a signal indicative of the operative coupling between a first electronic device and a second electronic device.

908 c) Saving the end user assistance corresponding to the operative coupling.

910 c) Providing the end user assistance corresponding to the operative coupling.

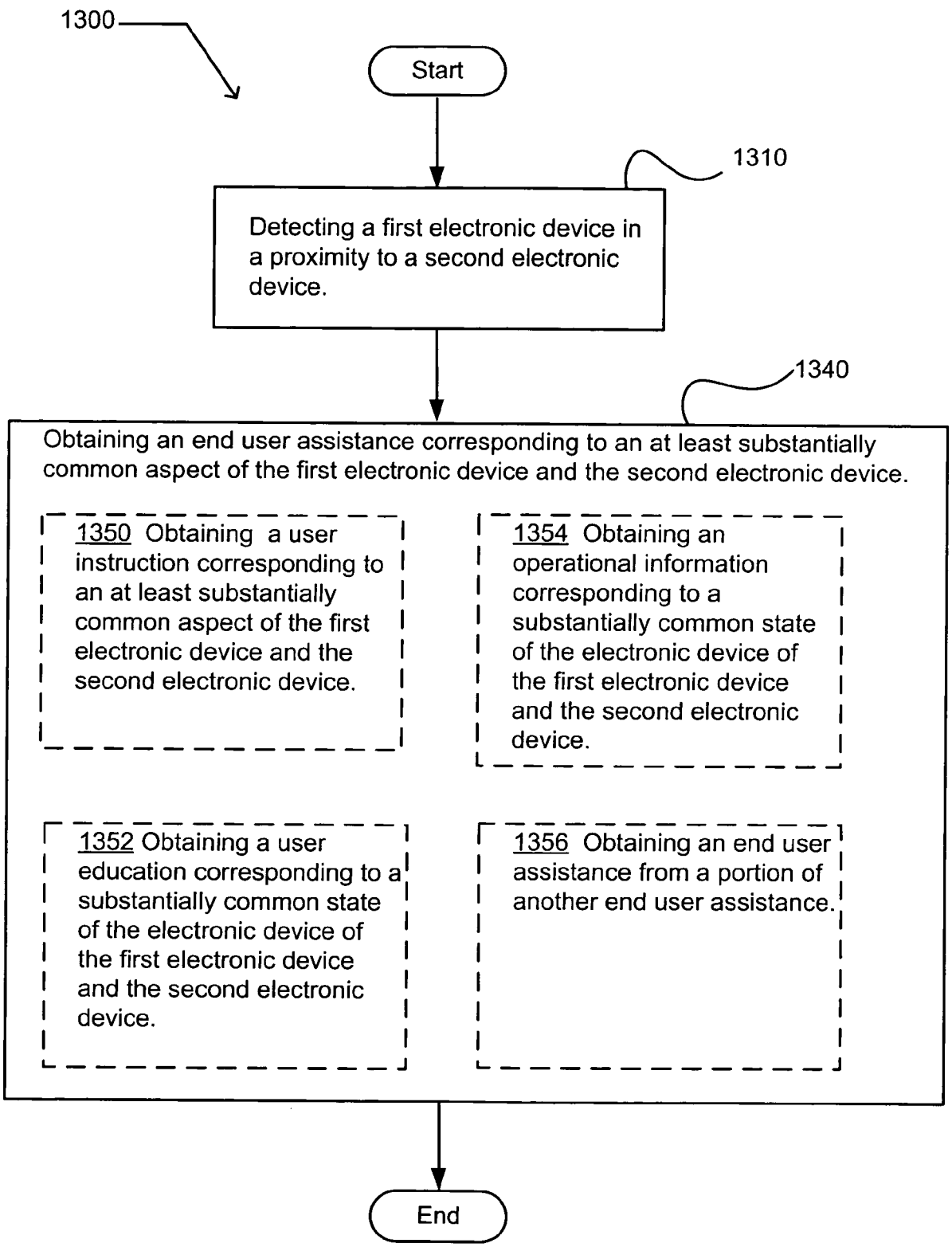

1382 A computer-readable medium.

1384 A computer program product encoding a computer program for executing on a computing device a computer process, the computer process comprising:
 a) detecting a first electronic device in a proximity to a second electronic device; and
 b) obtaining an end user assistance corresponding to an at least substantially common aspect of the first electronic device and the second electronic device.

1386 c) providing the end user assistance.

1702 A computer-readable medium.

1704 A computer program product encoding a computer program for executing on a computing device a computer process, the computer process comprising:
a) identifying an item having a presence within a geographic locale in response to a signal indicative of the item;
b) obtaining a first instance of a supply-chain assistance corresponding to the identified item from a first source and obtaining a second instance of a supply-chain assistance corresponding to the identified item from a second source; and
c) aggregating the first supply-chain assistance and the second supply-chain assistance.

1706 wherein b) obtaining a first instance of a supply-chain assistance corresponding to the identified item from a first source includes obtaining a first instance of a supply-chain assistance corresponding to the identified item from a network.

1708 wherein b) obtaining a second instance of a supply-chain assistance corresponding to the identified item from a second source includes obtaining a second instance of a supply-chain assistance corresponding to the identified item from the network.

FIG. 53

110 Computing device operable to receive a signal indicative of an item having a presence within a geographic locale and to access a computer network.

612 Storage medium.

1730 Computer-executable instructions operable to:
a) identify an item having a presence within a geographic locale in response to the signal indicative of the item;
b) obtain a first instance of a supply-chain assistance corresponding to the identified item from a first source and obtain a second instance of a supply-chain assistance corresponding to the identified item from a second source; and
c) aggregate the first supply-chain assistance and the second supply-chain assistance.

1732 wherein the obtaining a first instance of a supply-chain assistance corresponding to the identified item from a first source includes obtaining a first instance of a supply-chain assistance corresponding to the identified item from a first source over the network.

1734 wherein the obtaining a second instance of a supply-chain assistance corresponding to the identified item from a second source includes obtaining a second instance of a supply-chain assistance corresponding to the identified item from a second source over the network.

410 Geographic locale.

420 Sensor operable to generate a signal indicative of an item.

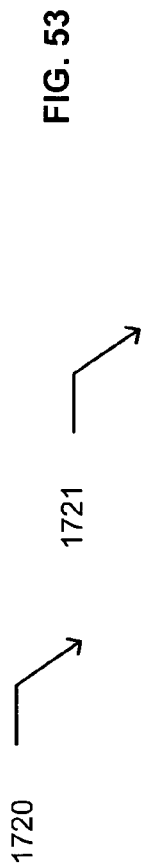

SUPPLY-CHAIN SIDE ASSISTANCE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending U.S. patent application entitled PROVIDING ASSISTANCE, naming Edward K. Y. Jung, Royce A. Levien, Mark A. Malamud, and John D. Rinaldo, Jr., as inventors, filed Sep. 30, 2004, Ser. No. 10/955,966.

2. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,476.

3. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,555.

4. For purposes of the USPTO extra-statutory requirements, the present application constitutes a continuation in part of currently co-pending U.S. patent application entitled ENHANCED CONTEXTUAL USER ASSISTANCE, naming Edward K. Y. Jung, Royce A. Levien, Mark A. Malamud, and John D. Rinaldo, Jr., as inventors, filed Oct. 27, 2004, Ser. No. 10/974,561.

5. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 29, 2004, Ser. No. 10/978,243.

6. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,687.

7. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,736.

8. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,828.

9. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,825.

10. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,827.

11. For purposes of the USPTO extra-statutory requirements, the present application constitutes a continuation in part of currently co-pending U.S. patent application entitled USER ASSISTANCE, naming Edward K. Y. Jung, Royce A. Levien, Mark A. Malamud, and John D. Rinaldo, Jr., as inventors, filed Jan. 21, 2005, Ser. No. 11/041,861.

The above applications are specifically incorporated herein by reference in their entirety for all that they disclose and teach. In an event of any conflict between the instant application and an application incorporated by reference, the instant application controls.

SUMMARY

An embodiment provides a computer-implemented method. The method includes identifying an item having a presence within a geographic locale in response to a signal indicative of the item. Also, obtaining a first instance of a supply-chain assistance corresponding to the identified item from a first source and obtaining a second instance of a supply-chain assistance corresponding to the identified item from a second source. The method further includes aggregating the first supply-chain assistance and the second supply-chain assistance. The method may include enabling a supply-chain user to request at least one instance of supply-chain assistance corresponding to the identified item. The method may include broadcasting the aggregated first supply-chain assistance and the second supply-chain assistance. The method may include causing the first supply-chain assistance corresponding to the identified item to be obtained from the first source and the second supply-chain assistance corresponding to the identified item to be obtained from the second source. In addition to the foregoing, other method embodiments are described in the claims, drawings, and text forming a part of the present application.

Another embodiment provides a computer-implemented method. The method includes receiving a signal indicative of an item having a presence within a geographic locale, and requesting an information corresponding to the item over a computer network from at least two independent sources. The method also includes providing the information. In addition to the foregoing, other method embodiments are described in the claims, drawings, and text forming a part of the present application.

A further embodiment provides a computer-implemented method. The method includes receiving a signal indicative of an item having a presence within a geographic locale, and enabling a supply-chain user to request a supply-chain assistance corresponding to the item having a presence within a geographic locale. The method may also include, in response to a received supply-chain user request for a supply-chain assistance, obtaining a first instance of a supply-chain assistance corresponding to the item from a first source and obtaining a second instance of a supply-chain assistance corresponding to the item from a second source. Further, the method may include aggregating the first supply-chain assistance and the second supply-chain assistance, and broadcasting the aggregated supply-chain assistance. In addition to the foregoing, other method embodiments are described in the claims, drawings, and text forming a part of the present application.

A method provides a computer program product encoding a computer program for executing a computer process on a computing device. The computer process includes identifying an item having a presence within a geographic locale in response to a signal indicative of the item. The computer process also includes obtaining a first instance of a supply-chain assistance corresponding to the identified item from a first source and obtaining a second instance of a supply-chain assistance corresponding to the identified item from a second source. Further, aggregating the first supply-chain assistance and the second supply-chain assistance. In addition to the foregoing, other computer program product embodiments are described in the claims, drawings, and text forming a part of the present application.

Another embodiment provides a system. The system includes a computing device operable to receive a signal indicative of an item having a presence within a geographic locale, and operable to access a network. The system also includes instructions that when executed on the computing device cause the computing device to identify an item having a presence within a geographic locale in response to the signal indicative of the item. The instructions further cause the computing device to obtain a first instance of a supply-chain assistance corresponding to the identified item from a first source and obtain a second instance of a supply-chain assistance corresponding to the identified item from a second source. Also, to aggregate the first supply-chain assistance and the second supply-chain assistance. In addition to the foregoing, other system embodiments are described in the claims, drawings, and text forming a part of the present application.

A further embodiment provides a system. The system includes a sensor operable to generate a signal indicative of an item having a presence within a geographic locale. The system also includes a computing device having a storage medium, and operable to receive the signal indicative of an item and to access a computer network. The system further includes instructions that when executed on the computing device cause the computing device to receive a signal indicative of an item having a presence within a geographic locale, and enable a supply-chain user to request a supply-chain assistance corresponding to the item having a presence within a geographic locale. The instructions may further cause the computing device to, in response to a received supply-chain user request for a supply-chain assistance, obtain a first instance of a supply-chain assistance corresponding to the item from a first source and obtain a second instance of a supply-chain assistance corresponding to the item from a second source from the network. Also, to aggregate the first supply-chain assistance and the second supply-chain assistance, and to broadcast the aggregated supply-chain assistance. In addition to the foregoing, other system embodiments are described in the claims, drawings, and text forming a part of the present application.

An embodiment provides a computer-implemented method. The method includes receiving a first signal indicative of a first item having a presence within a geographic locale, and receiving a second signal indicative of a second item having a presence within the geographic locale. The method also includes requesting an information corresponding to both the first item and the second item over a computer network from at least two independent sources, and providing the information. In addition to the foregoing, other method embodiments are described in the claims, drawings, and text forming a part of the present application.

In addition to the foregoing, various other embodiments are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 11 illustrates a partial view of an exemplary computer program product that includes a computer program for executing a computer process on a computing device;

FIG. 14 illustrates an exemplary system in which embodiments may be implemented;

FIG. 15 illustrates an operational flow representing exemplary operations that obtain an assistance corresponding to an item having presence within a geographic locale;

FIG. 16 illustrates an alternative embodiment of the exemplary operational flow of FIG. 15;

FIG. 18 illustrates a partial view of an exemplary computer program product that includes a computer program for executing a computer process on a computing device;

FIG. 27 illustrates a partial view of an exemplary computer program product that includes a computer program for executing the computer process on a computing device;

FIG. 34 illustrates another alternative embodiment of the exemplary operational flow of FIG. 30;

FIG. 35 illustrates a partial view of an exemplary computer program product that includes a computer program for executing a computer process on a computing device;

FIG. 52 illustrates a partial view of an exemplary computer program product that includes a computer program for executing a computer process on a computing device;

FIG. 53 illustrates an environment in which embodiments of an exemplary system may be implemented;

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
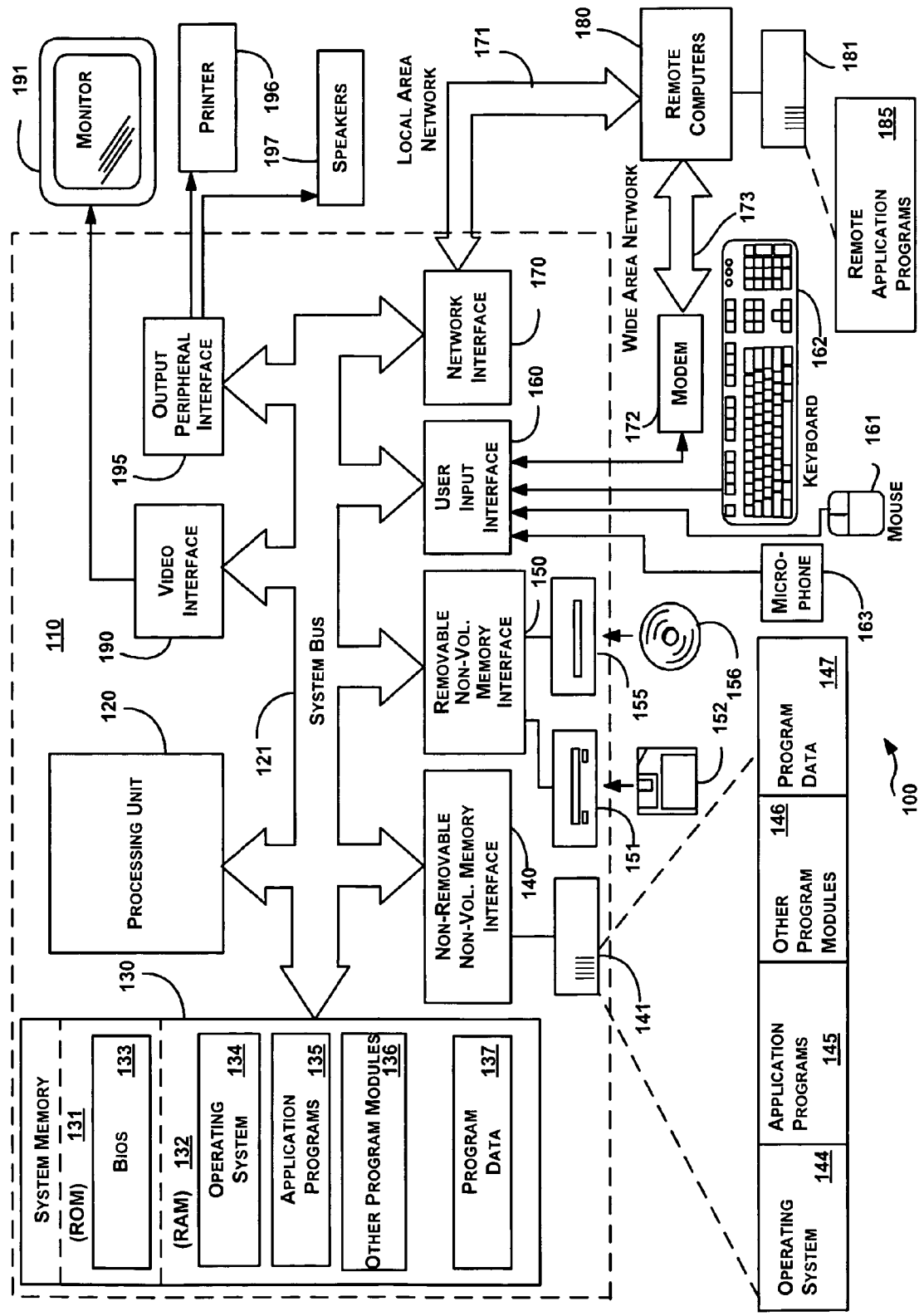
FIG. 1 illustrates an exemplary system in which embodiments may be implemented, including a general-purpose computing device.

FIG. 1 and the following discussion are intended to provide a brief, general description of an environment in which embodiments may be implemented. FIG. 1 illustrates an exemplary electronic device that may correspond in whole or part to a general-purpose computing device, and is shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or a memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such a computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 1 illustrates an example of a suitable environment on which embodiments may be implemented. The computing system environment 100 of FIG. 1 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following include a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 2:
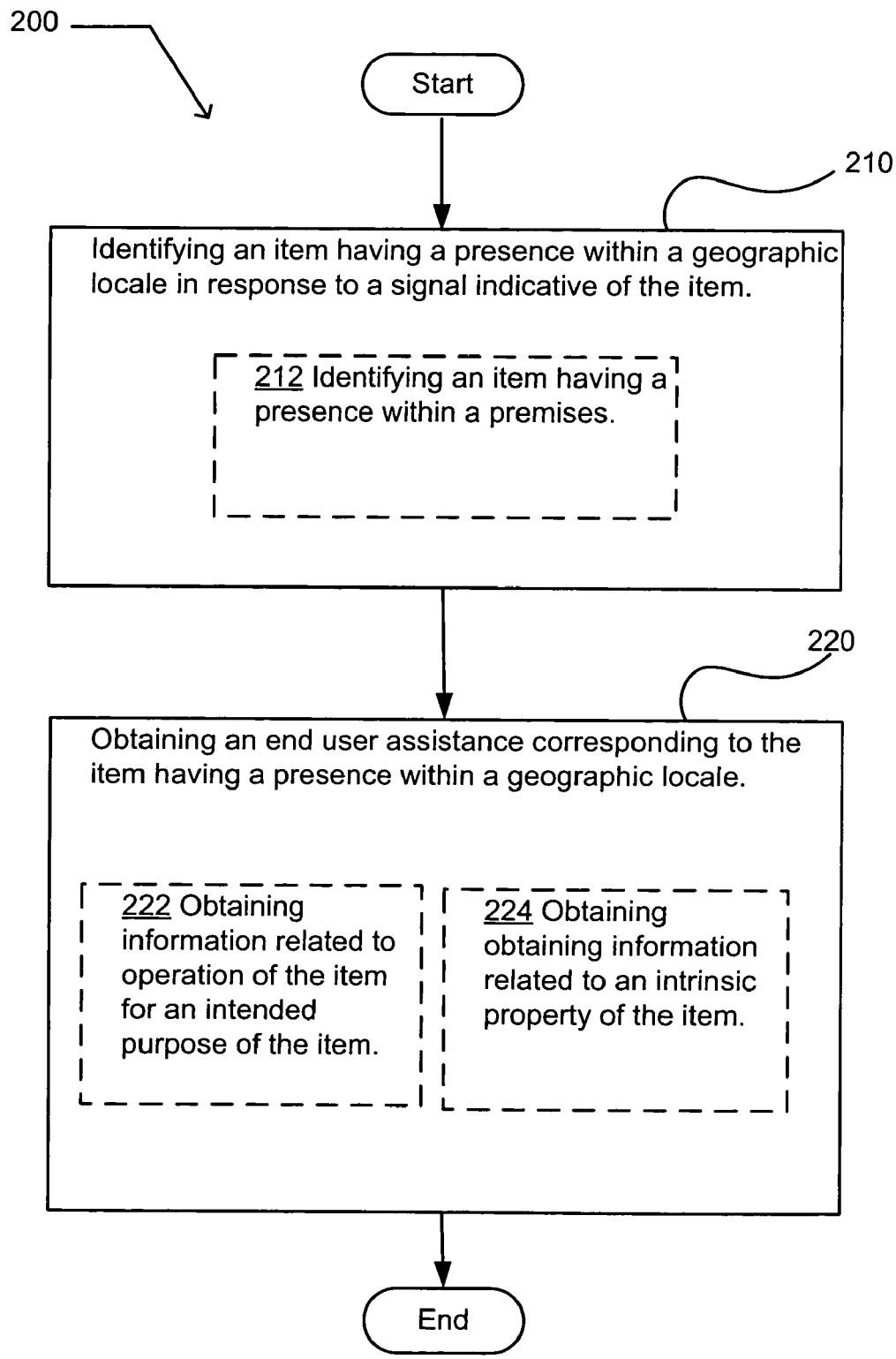
FIG. 2 illustrates an operational flow representing exemplary operations that obtain an assistance corresponding to an item having a presence within a geographic locale.

FIG. 2 illustrates an operational flow 200 representing exemplary operations that obtain an assistance corresponding to an item having a presence within a geographic locale. After a start operation, the operational flow 200 moves to a recognition operation 210 where an item having a presence within a geographic locale is identified in response to a signal indicative of the item. At help operation 220, an end user assistance is obtained corresponding to the item having a presence within a geographic locale. In an embodiment, an end user includes one for whom the item is designed and/or produced, as opposed to those involved creating, manufacturing, transporting, promoting, and/or marketing the item. An end user may include a person, an entity, and/or a government. In another embodiment, an end user includes a consumer of the item. In a further embodiment, an end user assistance may include any type of assistance for an end user. For example, an end user assistance may include an assistance for use by a user, and/or an assistance in operation of the item. In another embodiment, an end user assistance for use by the item may include, for example, an upgrade to a firmware or program present in the item, and responding to a recall notice. A response to a recall notice may include, for example, ordering a replacement part in response to the recall notice.

In an alternative embodiment, the recognition operation 210 may include the operation 212, wherein an item having a presence within a premises is identified in response to a signal indicative of the item. In a further alternative embodiment, the help operation 220 may include the operation 222, wherein information is obtained related to operation of the item for an intended purpose of the item. An alternative embodiment of the help operation 220 may include the operation 224, wherein information is obtained related to an intrinsic property of the item having a presence within a geographic locale. The operational flow 200 then moves to an end operation.

As used herein, in an embodiment, an item may include any object or device capable of having any type of identifiable presence within a geographic locale. For example and without limitation, in certain embodiments an item may include one or more of the following: an electronic device; an appliance; a computing device, such as a personal computer and a server; a limited resource computing device; a pervasive computing device; PDA; a cell phone; a Blackberry appliance; a vehicle, such as a car, boat, and/or aircraft; an X-Box; a home gateway; a set-top box; a point-of-sale terminal; a camera; a TiVo; and an automated teller machine. In other embodiments, an item may be incorporated within another item. In other embodiments, an item may not include a computing device.

Figure 3:
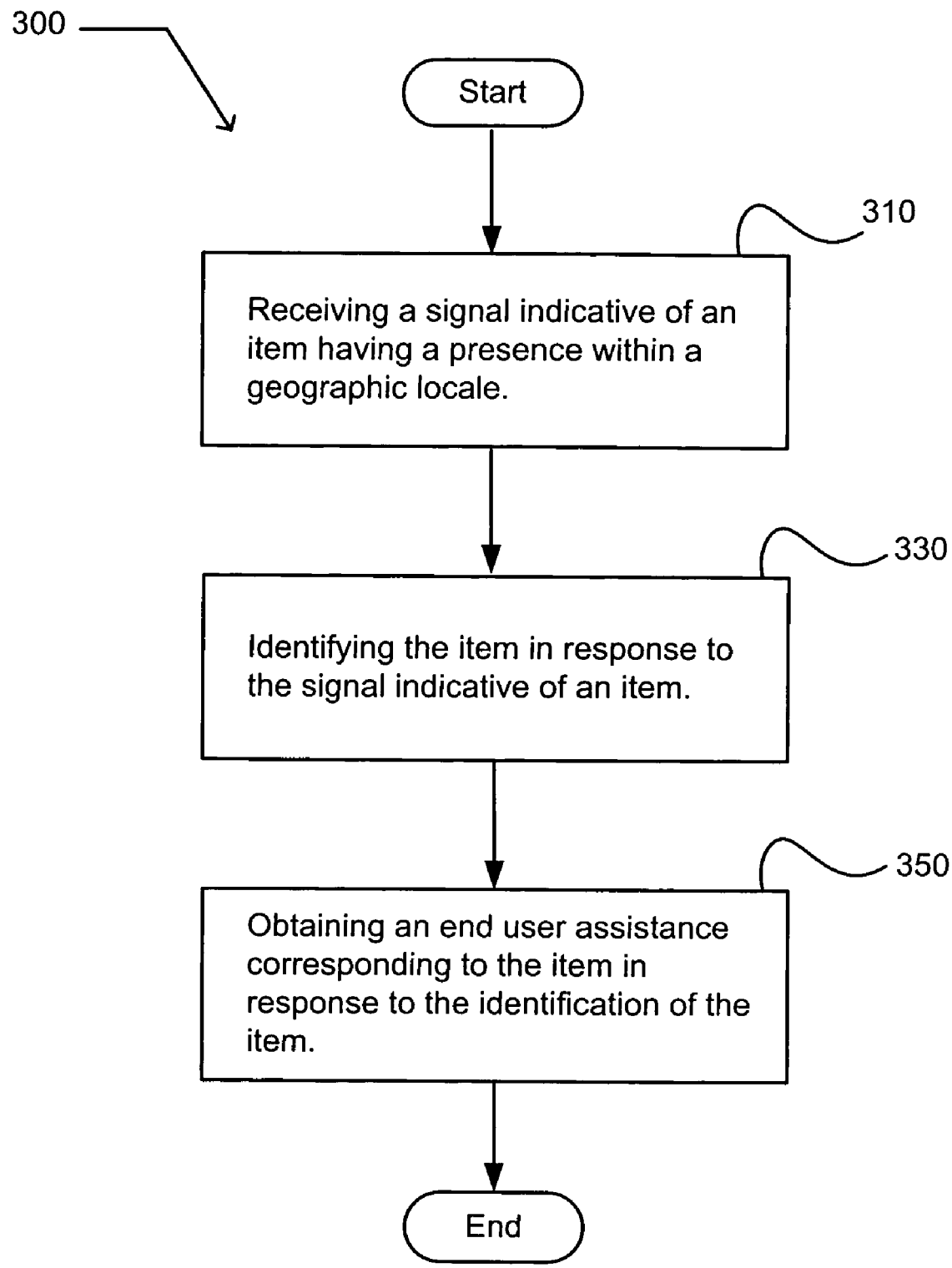
FIG. 3 illustrates another operational flow representing exemplary operations that obtain an assistance corresponding to an item having presence within a geographic locale.

FIG. 3 illustrates an operational flow 300 representing exemplary operations that obtain an assistance corresponding to an item having presence within a geographic locale. After a start operation, the operational flow 300 moves to a reception operation 310. At the operation 310, a signal indicative of an item having a presence within a geographic locale is received. At a recognition operation 330, the item having a presence within a geographic locale is identified in response to the signal indicative of an item. At a help operation 350, an end user assistance is obtained corresponding to the item having a presence within a geographic locale in response to the identification of the item. The operational flow 300 then moves to an end operation.

Figure 4:
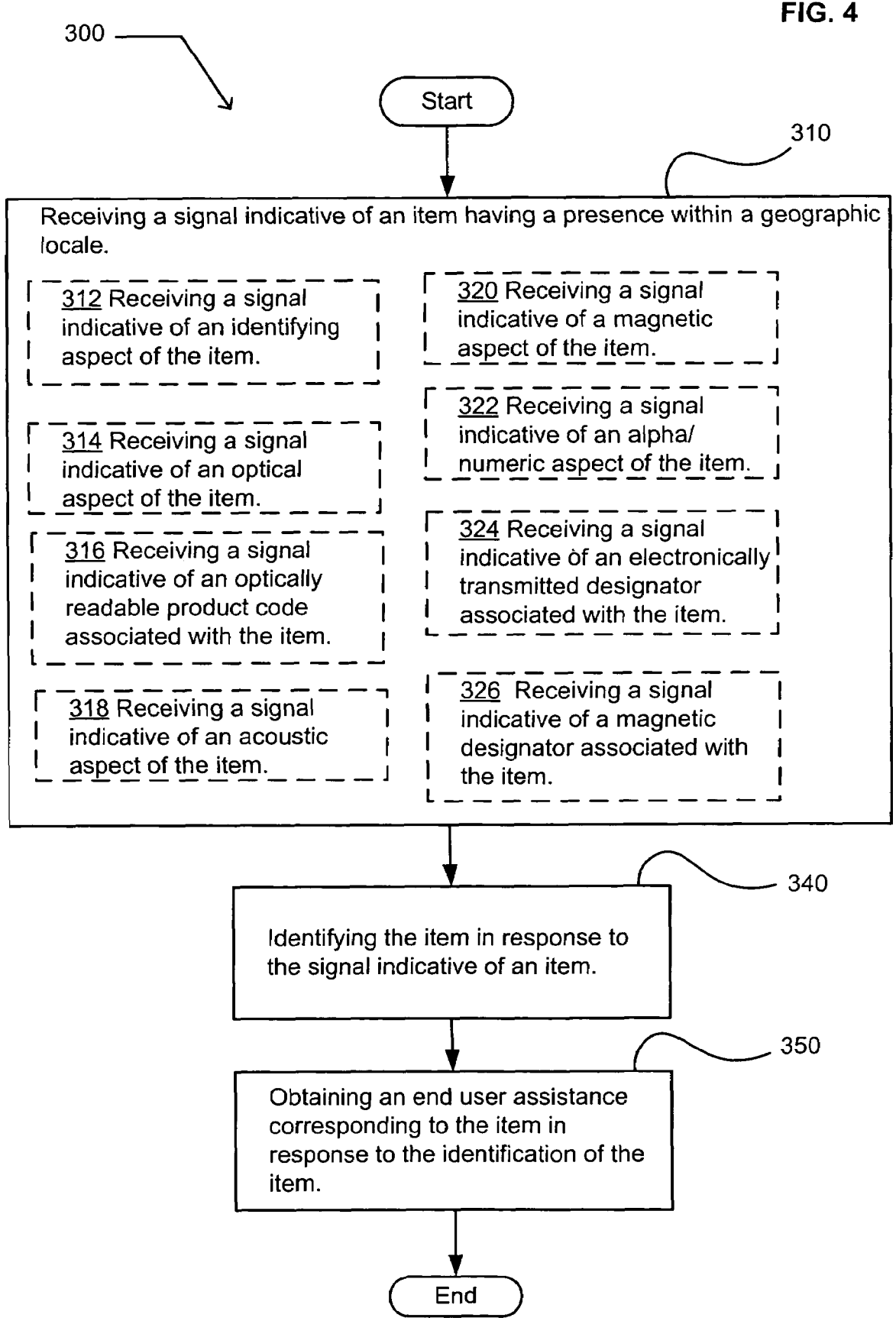
FIG. 4 illustrates an alternative embodiment of the exemplary operational flow of FIG. 3.

FIG. 4 illustrates an alternative embodiment of the exemplary operational flow 300 of FIG. 2. FIG. 4 illustrates an embodiment where the reception operation 310 may include at least one additional operation. Additional operations may include operation 312, operation 314, operation 316, operation 318, operation 320, operation 322, operation 324, and operation 326. At the operation 312, a signal indicative of an identifying aspect of the item is received. An identifying aspect of the item may include any aspect or aspects useful in identifying the item. For example, an identifying aspect of an item may include a profile, a shape, or other of distinguishable aspect of the item. In addition and without limitation, an identifying aspect of the item may include a visual signature the item, an acoustic signature the item, an electromagnetic signature of the item, and/or a magnetic signature of the item. At the operation 314, a signal indicative of an optical aspect of the item is received. An optical aspect of the item may include any optical aspect or aspects useful in identifying the item. For example, an optical aspect may include a known shape, for example a robot, a ship, and a car. At the operation 316, a signal indicative of an optically readable product code associated with the item is received. An optically readable product code associated with the item may include any optically readable product code useful in identifying the item. For example, an optically readable product code may include a bar code reflecting a vehicle identification number, and/or a SKU number.

At the operation 318, a signal indicative of an acoustic aspect of the item is received. An acoustic aspect of the item may include any acoustic aspect or aspects useful identifying the item. For example, an acoustic aspect may include a sound of a motorcycle, such as a Harley Davidson motorcycle. At the operation 320, a signal indicative of a magnetic aspect of the item is received. A magnetic aspect of the item may include a presence or absence of a magnetic characteristic of the item. At the operation 322, a signal indicative of an alpha/numeric aspect of the item is received. An alpha/numeric aspect of the item may include any alpha/numeric aspect useful in identifying the item. For example, an alpha/numeric aspect may include a trademark, such as "Ford" on a vehicle, "Dell" on a computing device. An alpha/numeric aspect may include a model number, and publicly viewable characters on a license plate or an aircraft registration number. At the operation 324, a signal indicative of an electronically transmitted designator associated with the item is received. The electronically transmitted designator may include any designator useful in identifying the item, such as a signal transmitted by an RFID device. At operation 326, a signal indicative of a magnetic designator associated with the item is received. The magnetic designator associated with the item may be any magnetic designator useful identifying the item, such as a scanable magnetic strip incorporated into a card or the item.

Figure 5:
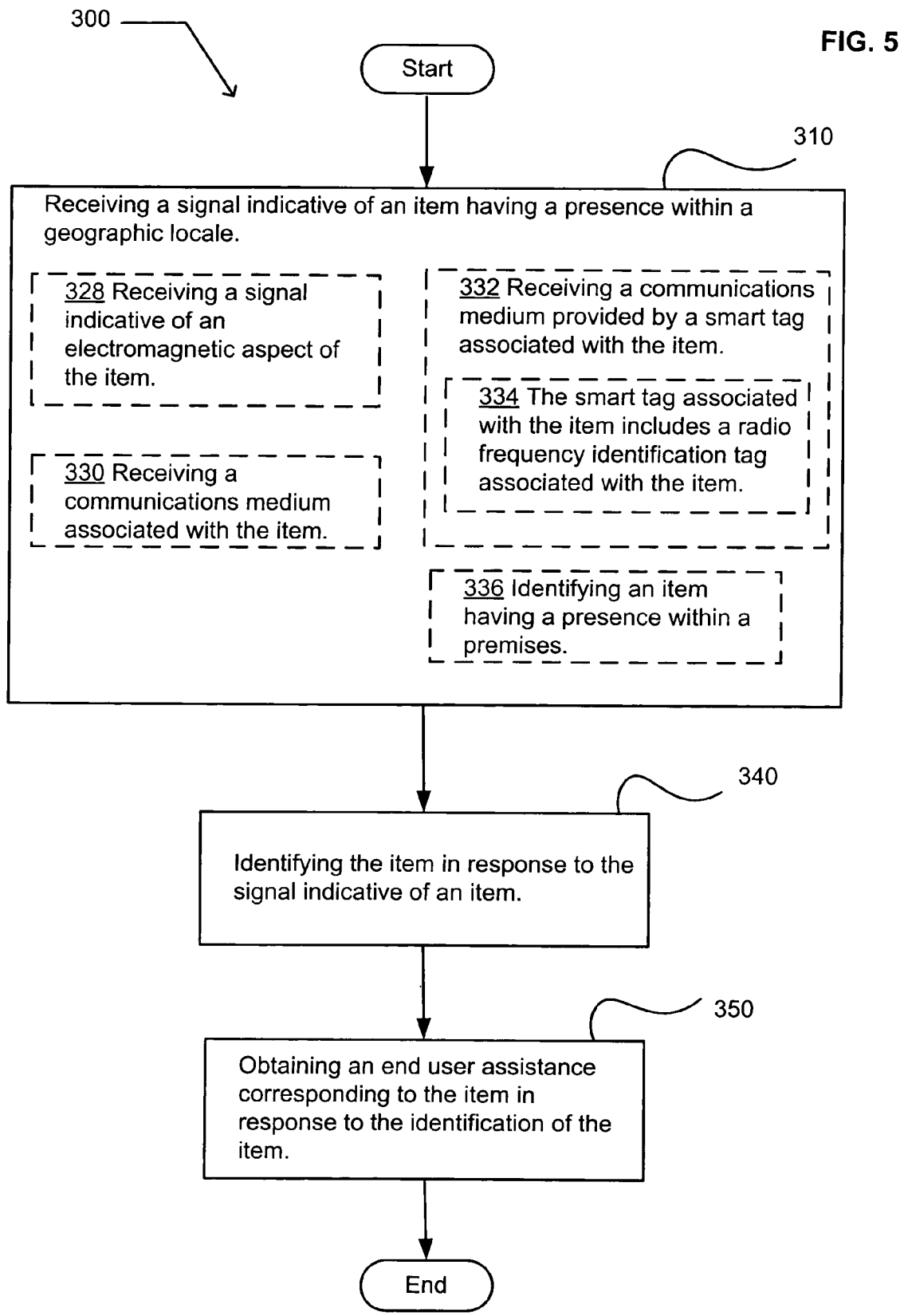
FIG. 5 illustrates another alternative embodiment of the exemplary operational flow of FIG. 3.

FIG. 5 illustrates an alternative embodiment of the exemplary operational flow 300 of FIG. 2. FIG. 5 illustrates an embodiment where the reception operation 310 may include at least one additional operation. The additional operations may include operation 328, operation 330, operation 332, operation 334, and operation 336. At operation 328, a signal indicative of an electromagnetic aspect of the item is received. The electromagnetic aspect may be any aspect of the item useful in identifying the item, such as an electromagnetic signature of the item. At operation 330, a communications medium associated the item is received. The communications medium associated with or associatable with the item may be any communications medium associatable and useful in identifying the item. At operation 332, a communications medium provided by a smart tag associated with the item is received. In a further alternative embodiment, the operation 332 may include operation 334 wherein the smart tag associated with the item includes a radio frequency identification tag associated with the item the identifying an item having a presence within a geographic locale includes identifying an item having a presence within a premises.

Figure 6:
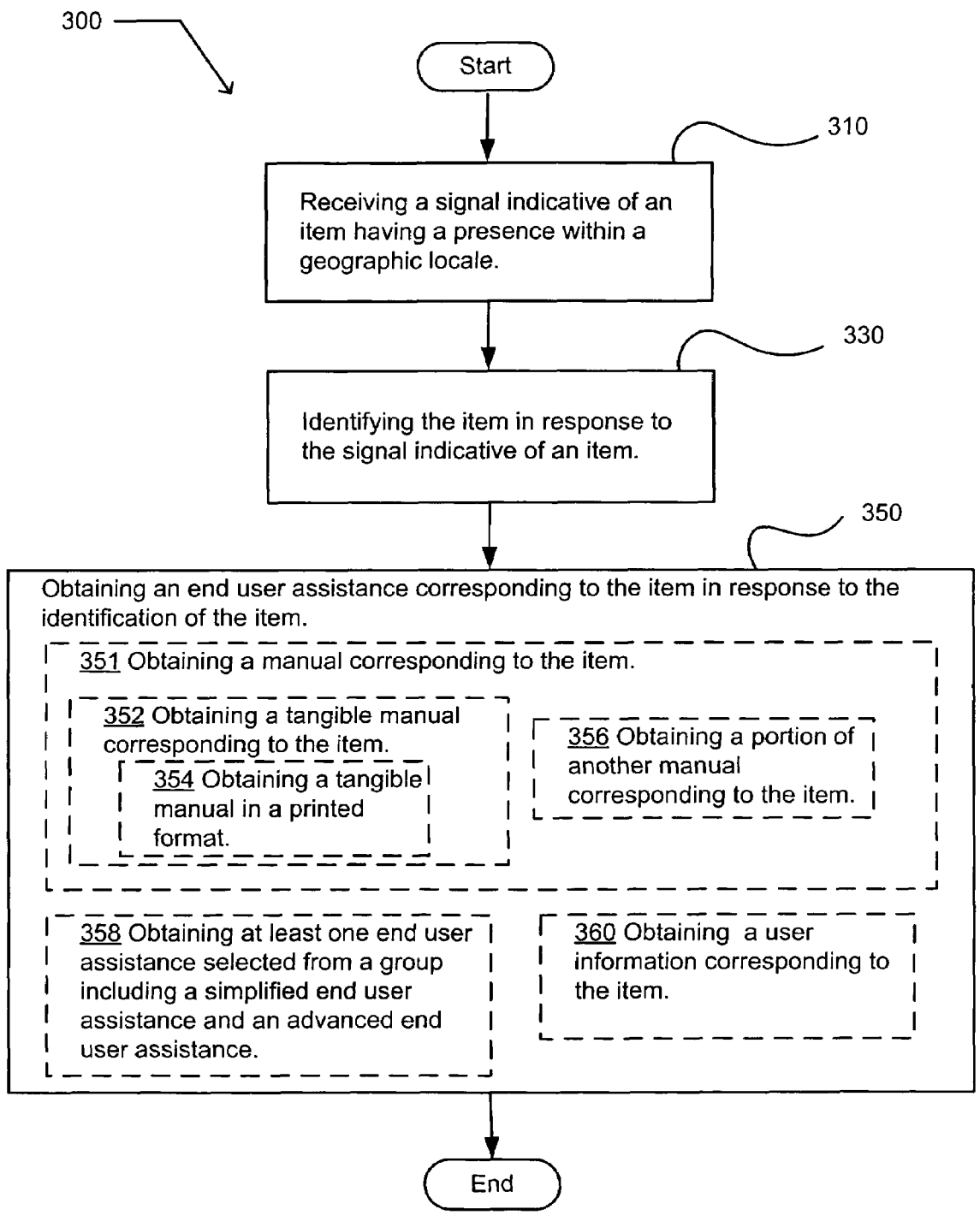
FIG. 6 illustrates a further alternative embodiment of the exemplary operational flow of FIG. 3.

FIG. 6 illustrates an alternative embodiment of the exemplary operational flow 300 of FIG. 2. FIG. 6 illustrates an embodiment where the reception operation 350 may include at least one additional operation. Additional operations may include operation 351, operation 358, and operation 360. At operation 351, a manual corresponding to the item is obtained. Operation 351 may include additional operations, such as operation 352, and operation 356. At operation 352, a tangible manual corresponding to the item is obtained. Operation 352 may include an additional operation 354, wherein a tangible manual in a printed format is obtained. In other alternative embodiments, operation 351 may include obtaining an intangible manual, and the intangible manual may include a manual having a digital format. At operation 356, the obtaining a manual may include a portion of another manual corresponding to the item. At operation 358, at least one end user assistance is obtained by selecting from a group including a simplified user assistance and an advanced user assistance. At operation 360, the obtaining an end user assistance corresponding to the item includes obtaining a user information corresponding to the item.

Figure 7:
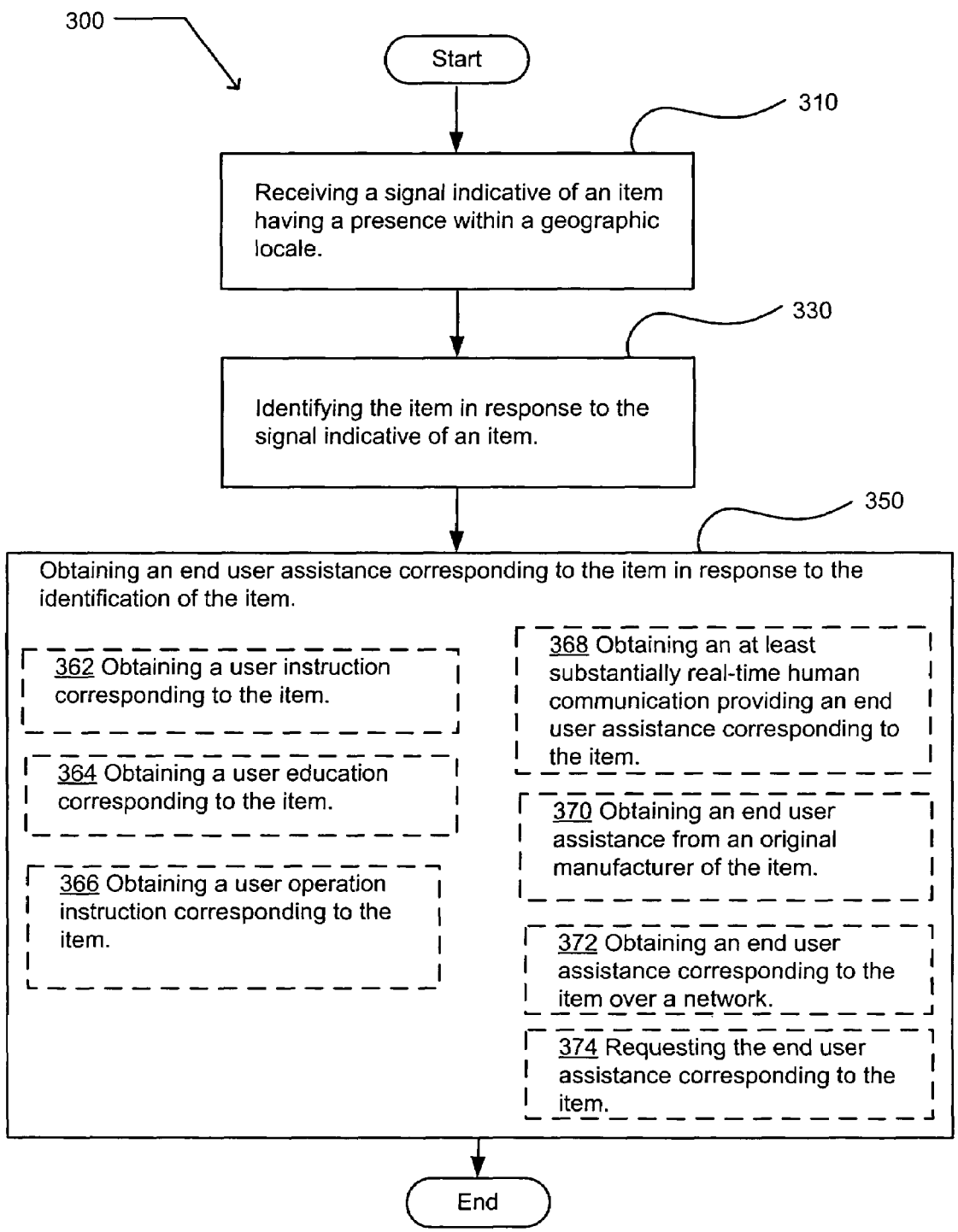
FIG. 7 illustrates yet another alternative embodiment of the exemplary operational flow of FIG. 3.

FIG. 7 illustrates an alternative embodiment of the exemplary operational flow 300 of FIG. 2. FIG. 7 illustrates an embodiment where the reception operation 350 may include at least one additional operation. Additional operations may include operation 362, operation 364, operation 366, operation 368, operation 370, operation 372, and operation 374. At operation 362, a user instruction corresponding to the item is obtained. At operation 364, a user education corresponding to the item is obtained. At operation 366, a user operation instruction corresponding to the item is obtained. At operation 368, an at least substantially real-time human communication is obtained a providing an end user assistance corresponding to the item. At operation 370, an end user assistance is obtained from an original manufacturer of the item. At operation 372, an end user assistance corresponding to the item is delivered over a network. In another alternative embodiment, an end user assistance corresponding to the item is delivered by a mail service, such as the U.S. Post Office or a private mail service. At operation 374, the obtaining an end user assistance corresponding to the item includes requesting the end user assistance corresponding to the item.

Figure 8:
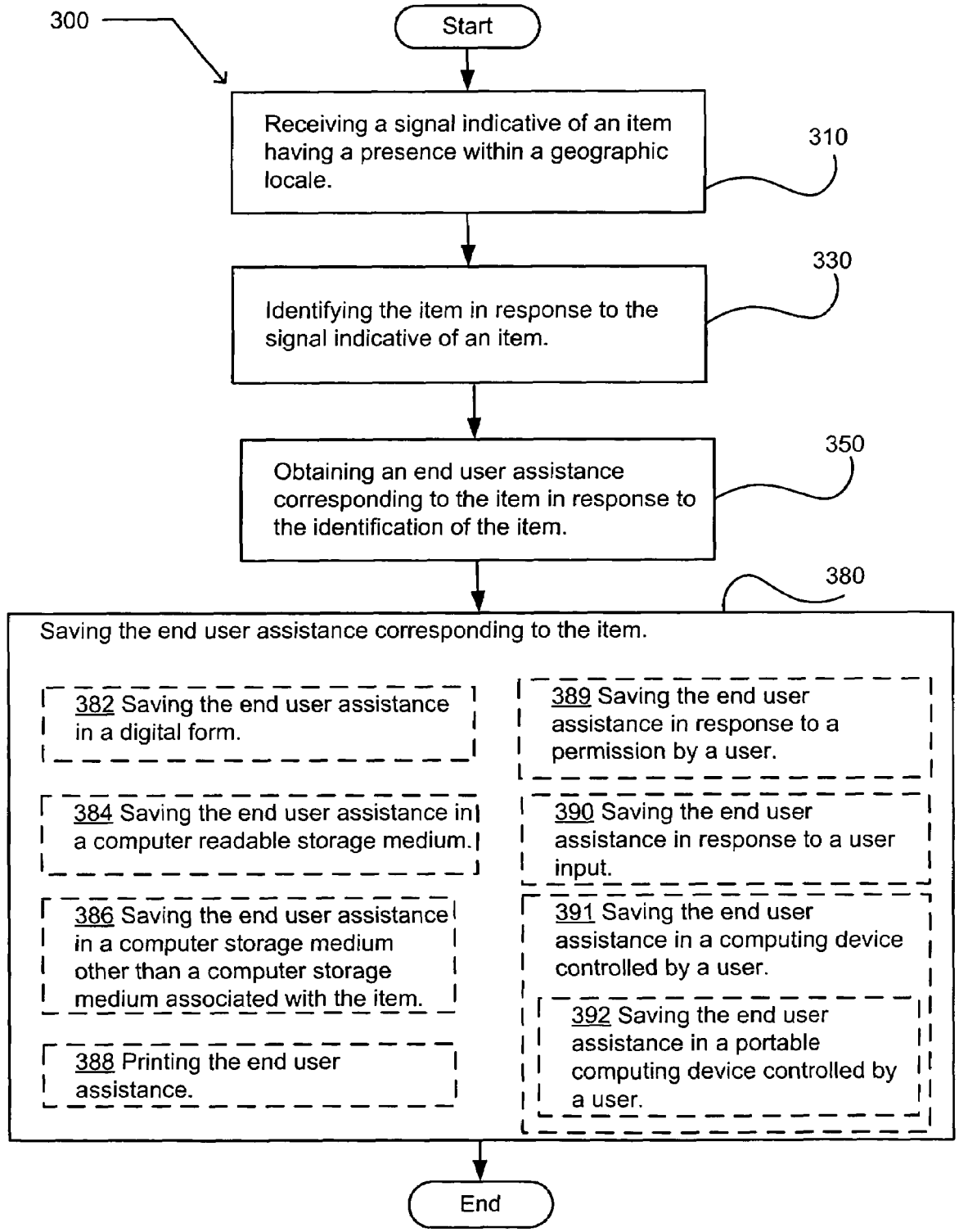
FIG. 8 illustrates an alternative embodiment of the exemplary operational flow of FIG. 3 that includes a retention operation.

FIG. 8 illustrates an alternative embodiment of the exemplary operational flow 300 of FIG. 2 that includes a retention operation 380. At operation 380, the end user assistance corresponding to the item is saved. An alternative embodiment of the operation 380 may include at least one additional operation. Additional operations may include operation 382, operation 384, operation 386, operation 388, operation 389, operation 390, an operation 391. At the operation 382, the end user assistance is saved in a digital form. At operation 384, the end user assistance is saved on a computer readable storage medium. At operation 386, the end user assistance is saved on a computer storage medium other than a computer storage medium associated with the item. At operation 388, the end user assistance is printed. At operation 389, the end user assistance is saved in response to a permission by a user. At operation 390, the end user assistance is saved in response to a user input. At operation 391, the end user assistance is saved in a computing device controlled by a user. An alternative embodiment of the operation 391 includes operation 392, wherein the end user assistance is saved in a portable computing device controlled by the user.

Figure 9:
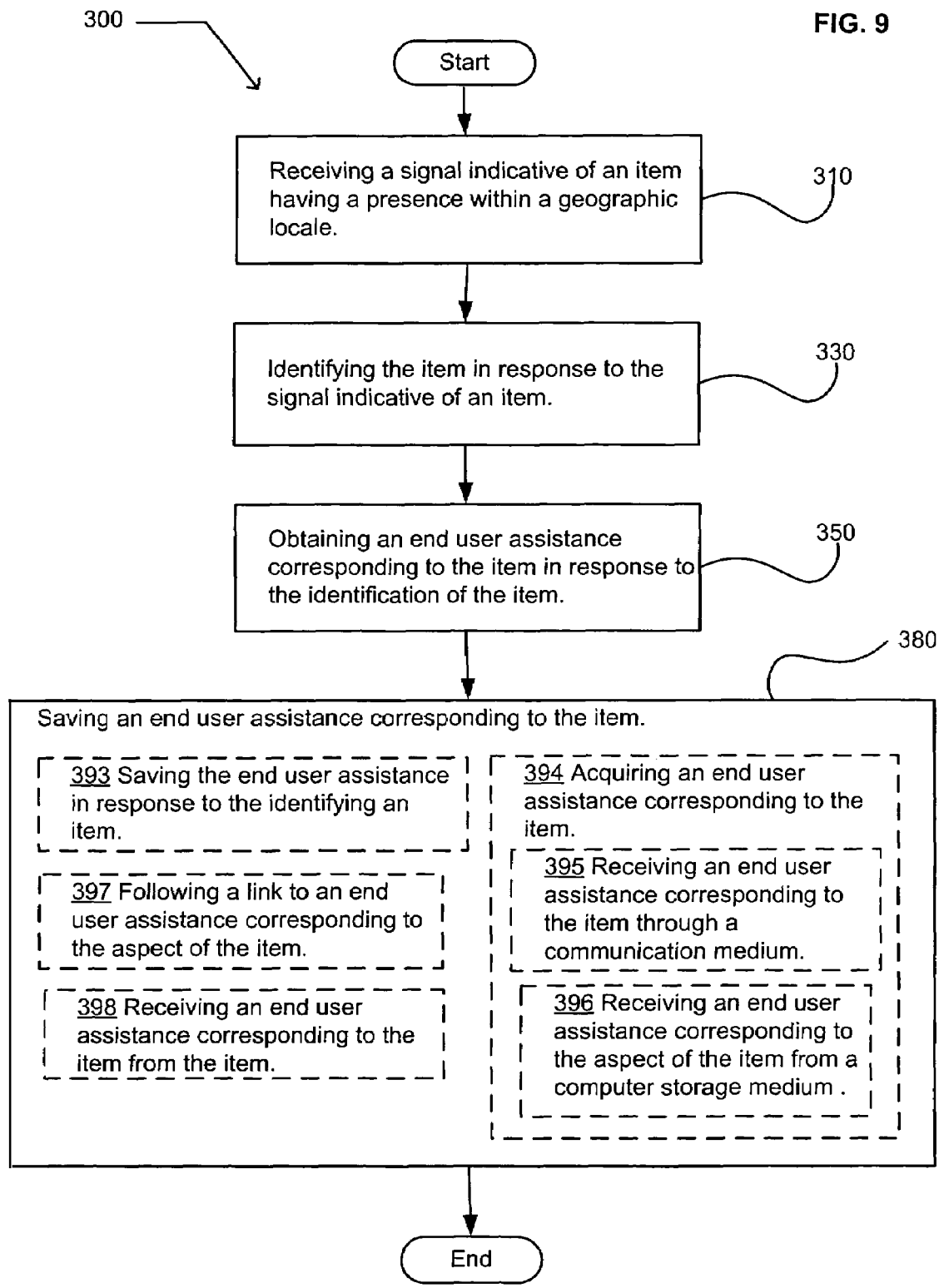
FIG. 9 illustrates an alternative embodiment of the exemplary operational flow of FIGS. 3 and 8.

FIG. 9 illustrates an alternative embodiment of the exemplary operational flow 300 of FIGS. 3 and 8. FIG. 9 illustrates an embodiment where the retention operation 380 may include at least one additional operation. Additional operations may include operations 393 through operation 398. At operation 393, the end user assistance is saved in response to the identifying an item. At operation 394, the saving the end user assistance corresponding to the item includes acquiring an end user assistance corresponding to the item. An alternative embodiment of the operation 394 may include at least one additional operation. Additional operations may include operations 395 and operation 396. At operation 395, an end user assistance corresponding to the item is received through a communication medium. For example, the communications medium may include a modulated data stream, which may be received over a wired and/or wired network connection. At operation 396, an end user assistance corresponding to the aspect of the item is received from a computer storage medium. The computer storage medium may include any medium suitable for conveyance of the end user assistance. For example, the computer storage medium may include a DVD, a CD, a diskette, an external hard drive, and a portable flash memory device. At operation 397, the acquiring an end user assistance corresponding to the item includes following a link to an end user assistance corresponding to the aspect of the item. The link may include a hyperlink. At operation 398, an end user assistance corresponding to the item maybe acquired from the item.

Figure 10:
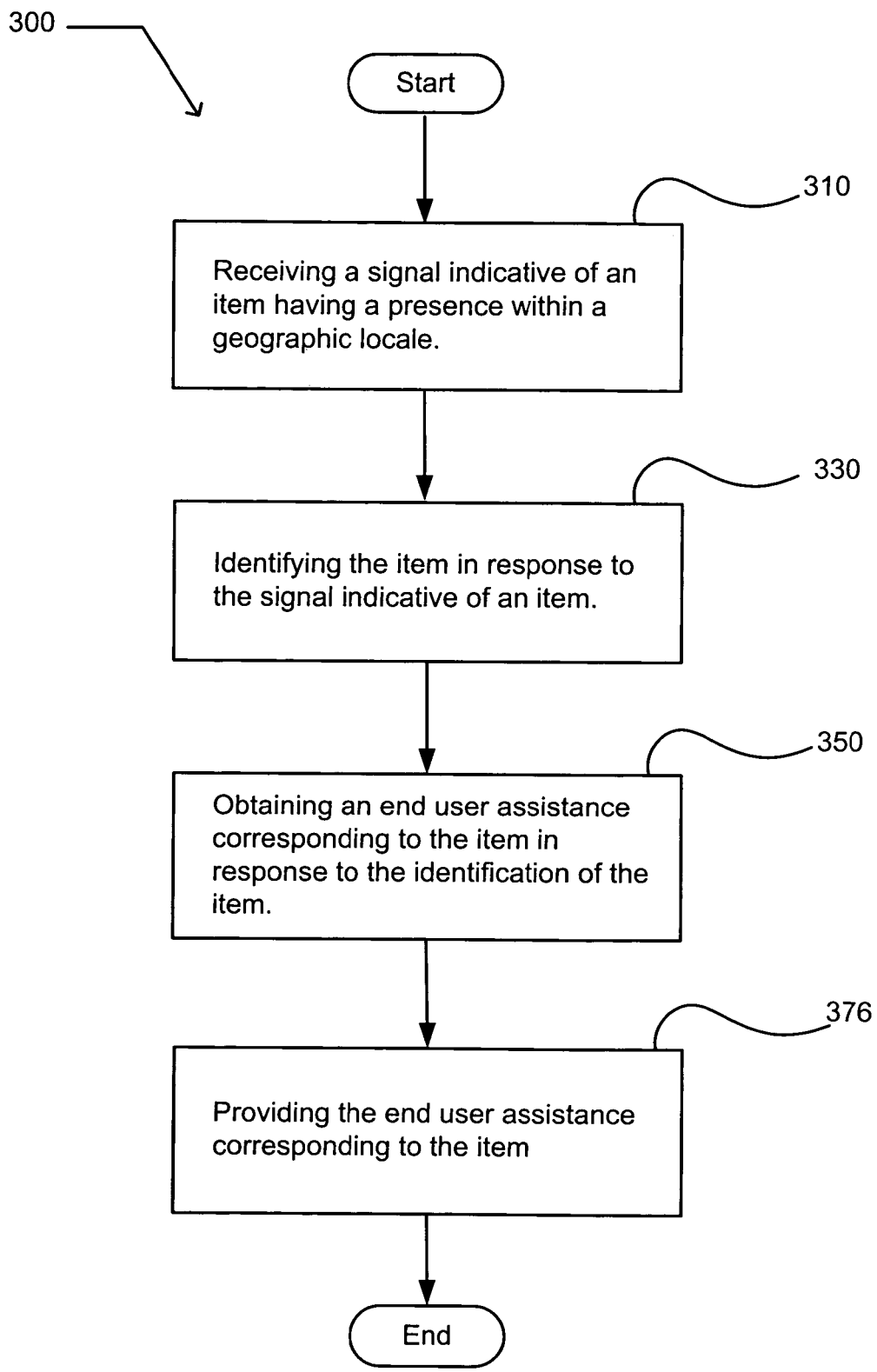
FIG. 10 illustrates an alternative embodiment of the exemplary operational flow of FIG. 3 that includes a broadcast operation.

FIG. 10 illustrates an alternative embodiment of the exemplary operational flow 300 of FIG. 3 that includes a broadcast operation 376. At the operation 376, the end user assistance corresponding to the item is provided.

FIG. 11 illustrates a partial view of an exemplary computer program product 400 that includes a computer program 404 for executing a computer process on a computing device. An embodiment of the exemplary computer program product 400 is provided using a computer-readable medium 402, and includes computer executable instructions. The computer executable instructions encode the computer program 404 for executing on a computing device a process that includes receiving a signal indicative of an item having a presence within a geographic locale, identifying the item in response to the signal indicative of an item, and obtaining an end user assistance corresponding to the item. The computer-readable medium 402 may be carried by a computer-readable carrier (not shown). The computer-readable medium 402 may include a computer storage medium, which may be carried by a computer-readable carrier (not shown). The computer-readable medium 402 may include a communications medium (not shown).

Figure 12:
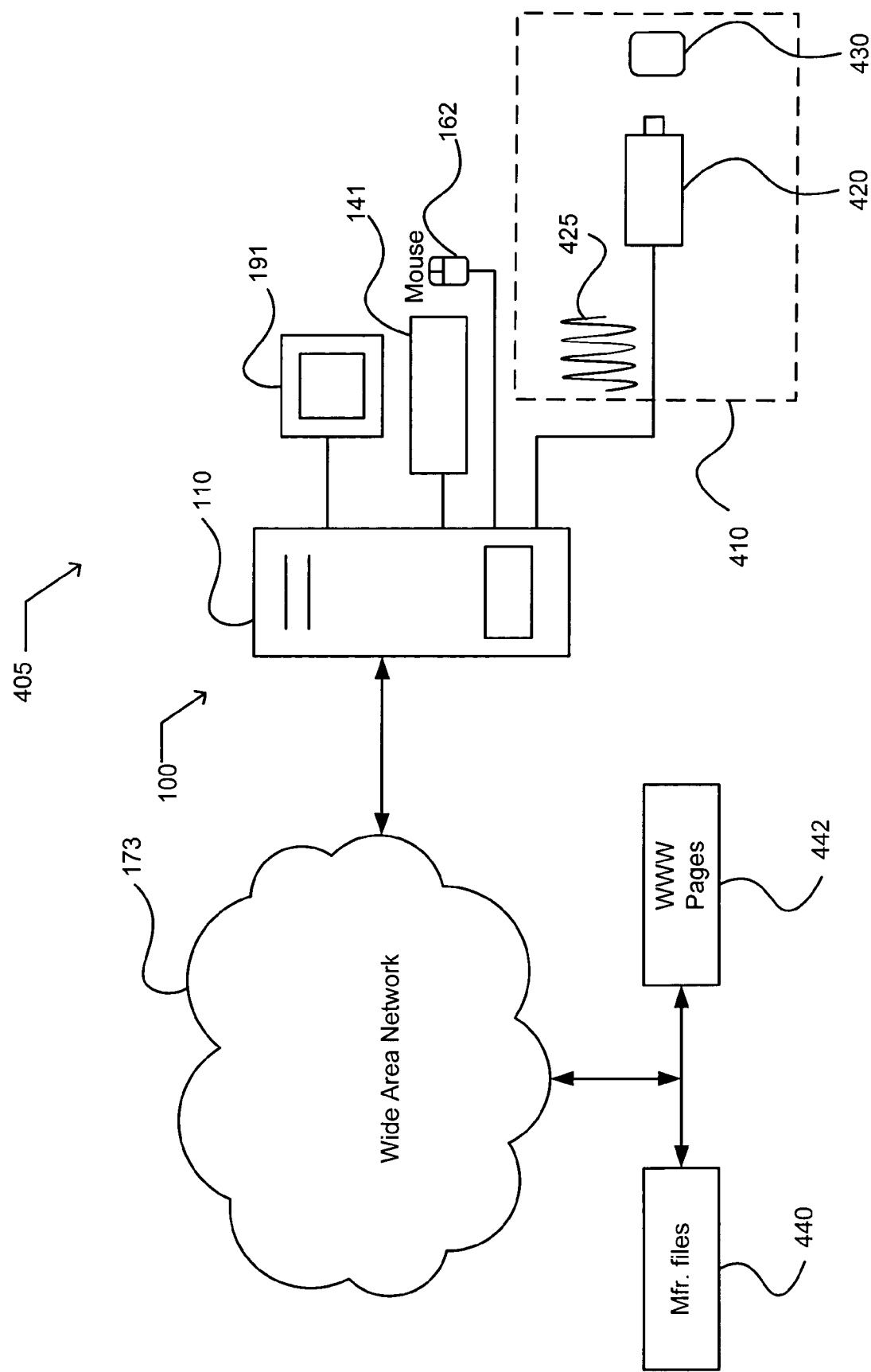
FIG. 12 illustrates an exemplary system in which embodiments may be implemented.
Figure 13:
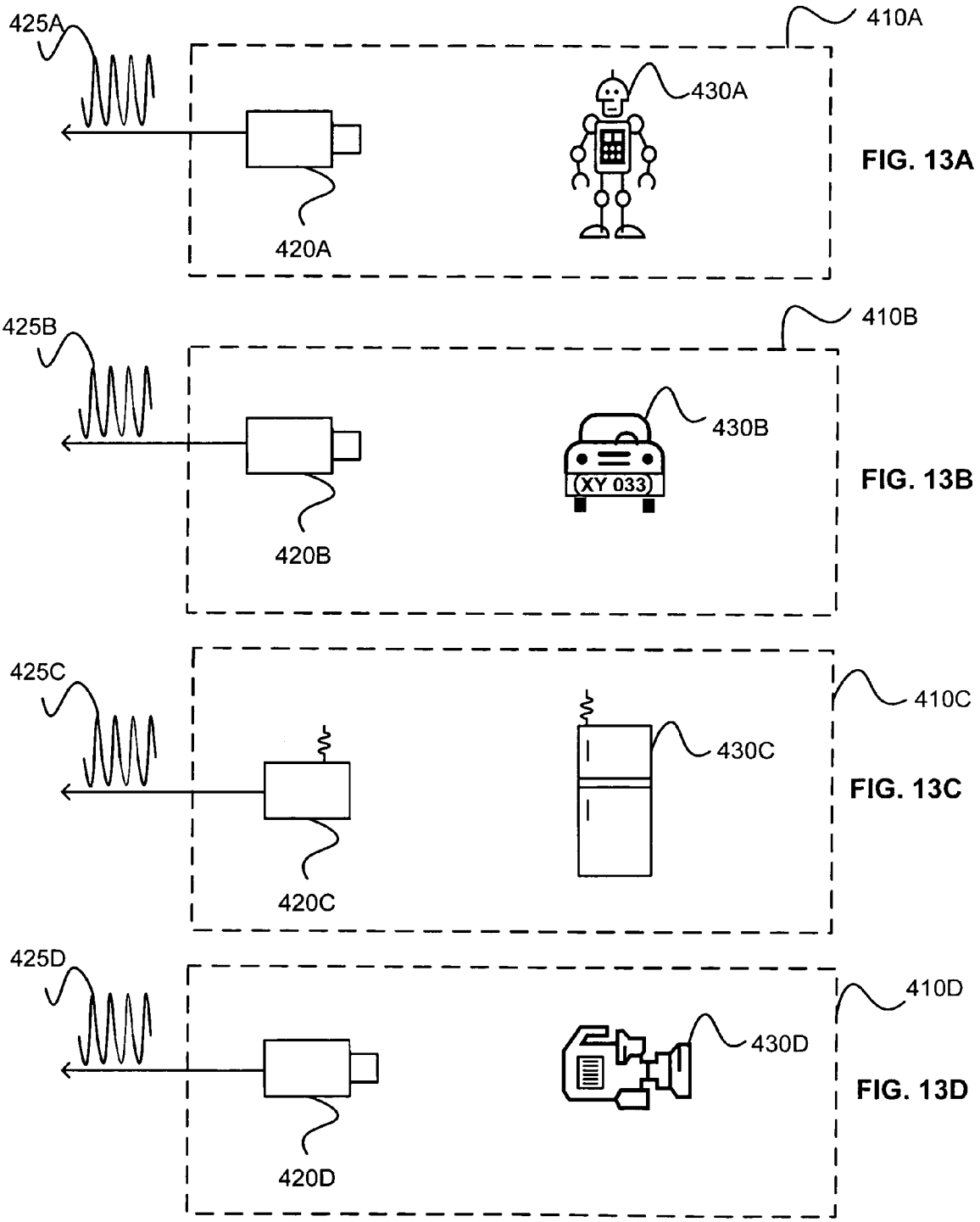
FIGS. 13A-13D illustrate certain alternative embodiments of the sensor and proximate environment of FIG. 12.

FIGS. 12 and 13 illustrate an exemplary system 405 in which embodiments may be implemented. The system 405 includes a computing system environment, illustrated as the computing system environment 100 of FIG. 1. The system 405 also includes a sensor 420 operable to provide a signal 425 indicative of an item 430 having a presence within a geographic locale 410. The computing device 110 includes an operability to receive the signal 425 indicative of an item 430. The system 405 further includes a computer program product encoding a computer program for executing on a computing device a computer process for obtaining an end user assistance, such as the computer program product 400 described in conjunction with FIG. 11. The computer process includes receiving the signal 425 indicative of an item having a presence within a geographic locale 410, and identifying the item in response to the signal indicative of an item. The computer process also includes obtaining an end user assistance corresponding to the item having a presence within a geographic locale.

In an embodiment, the geographic locale may include any environment in which one more items, such as the item 430, may have a presence. The geographic locale may include a bounded environment. For example and without limitation, in certain embodiments, the geographic locale may include a portion of a residential premises or the entire residential premises. The premises may be under control of one or more persons, such as an individual or a family. In other embodiments, the geographic locale may include a portion of a business premises or the entire business premises.

The sensor 420 may include any type of sensor suitable for generating a signal indicative of an item having a presence within its sensing and/or detection range, such as the signal 425 indicative of the item 430. By way of example and without limitation, in an embodiment, the sensor 420 may be positioned in a premises entrance such that items entering and leaving the premises have a presence at some time proximate to the sensor. In another embodiment, the sensor 420 may be physically located within the geographic locale 410. In a further embodiment, the sensor 420 may be proximate to the geographic locale 410 and operable to provide the signal 425 indicative of an item 430 having a presence within the geographic locale.

In an alternative embodiment, the system 405 may include a plurality (not shown) of the sensors 420. The plurality of sensors may include at least two sensors having different sensing parameters, each respectively operable to provide a different signal 425 indicative of the item 430. FIGS. 13A-13D illustrate certain alternative embodiments of the sensor 420 and a proximate environment, illustrated as embodiments 420A-420 D and geographic locales 410A-410D.

FIG. 13A illustrates an alternative embodiment that includes a sensor 420A located within a geographic locale 410A. The sensor 420A includes an optical sensor parameter operable to provide a signal 425A indicative of an optical aspect of an item 430A within the geographic locale, illustrated as a known shape of the robot 3CPO. An optical aspect may include any optical aspect or aspects useful in identifying the item. FIG. 13B illustrates an alternative embodiment that includes a sensor 420B positioned with a geographic locale 410B. The sensor 420B includes an optical sensor parameter operable to provide a signal 425B indicative of an alpha/numeric aspect of the item 430B within the geographic locale, illustrated as a license plate number XY 033 of a car.

FIG. 13C illustrates an alternative embodiment that includes a sensor 420C located within a geographic locale 410C. The sensor 420C includes an identification signal sensor parameter operable to receive an electronically transmitted designator (not shown) associated with the item and provide a signal 425C indicative of item. The item is illustrated as a refrigerator 430C with an associated electronically transmitted designator. For example, the electronically transmitted designator may be transmitted by an RFID device. FIG. 13D illustrates an alternative embodiment that includes a sensor 420D positioned within a geographic locale 410D. The sensor 420D includes an optical code reader parameter operable to provide a signal 425D indicative of an optically readable aspect or aspects useful in identifying the item 430D. The item 430D is illustrated as video camera with an optically readable bar code. The signals 425A-425D are received by the computing device 110 of computing system environment 100 of FIG. 12.

FIG. 14 illustrates an exemplary system 450 in which embodiments may be implemented. The system 450 includes a stationary sensor module 455 operable to generate a signal indicative of an item within a sensing range of the sensor module. In an embodiment, the stationary sensor module 455 is placed in a location selected to sense one or more items that may be under control of a user over time. While the stationary sensor module 455 may be relatively permanently located in an embodiment, another embodiment provides the stationary sensor module 455 being relatively moveable within a premises. The system 450 also includes a recognition module 460 operable to identify the item in response to the signal indicative of an item, and a receiver module 465 operable to obtain an end user assistance corresponding to the identified item. In an alternative embodiment, the system 450 may include a storage module 470 operable to save the end user assistance corresponding to the item.

FIG. 15 illustrates an operational flow 500 representing exemplary operations that obtain an assistance corresponding to an item having presence within a geographic locale. After a start operation, the operational flow 500 moves to an acquisition operation 510, wherein a signal indicative of an aspect of an item having a presence within a geographic locale is received, such as the signal 425 indicative of the item 420 with the geographic locale 410 of FIG. 12. At a recognition operation 520, the item is identified in response to the signal indicative of an aspect of an item having a presence within a geographic locale. Operational flow 500 moves to a reception operation 530, where the end user assistance corresponding to the aspect of the item is obtained. In an alternative embodiment, the operation 530 may include an operation 532, wherein the end user assistance corresponding to an aspect of an item includes a manual corresponding to the aspect of an item. In an alternative embodiment, the reception operation may include an operation (not shown) wherein a manual corresponding to the aspect of the item is obtained. The manual may include any content associated with the item, such as assistance information, instructions, and specifications. The operational flow 500 then moves to an end operation.

FIG. 16 illustrates an alternative embodiment of the exemplary operational flow 500 of FIG. 15. FIG. 16 illustrates an embodiment where the reception operation 510 may include at least one additional operation. The additional operations may include an operation 512, an operation 514, an operation 516, an operation 518, and an operation 519. At operation 512, a signal indicative of an aspect of an item having a presence within a premises is received. At operation 514, a signal indicative of a state of the item is received. At the operation 516, a signal indicative of an intrinsic state of the item is received. At the operation 518, a signal indicative of an extrinsic state of the item is received. At the operation 519, a signal indicative of an illumination state of an aspect of the item is received.

Figure 17:
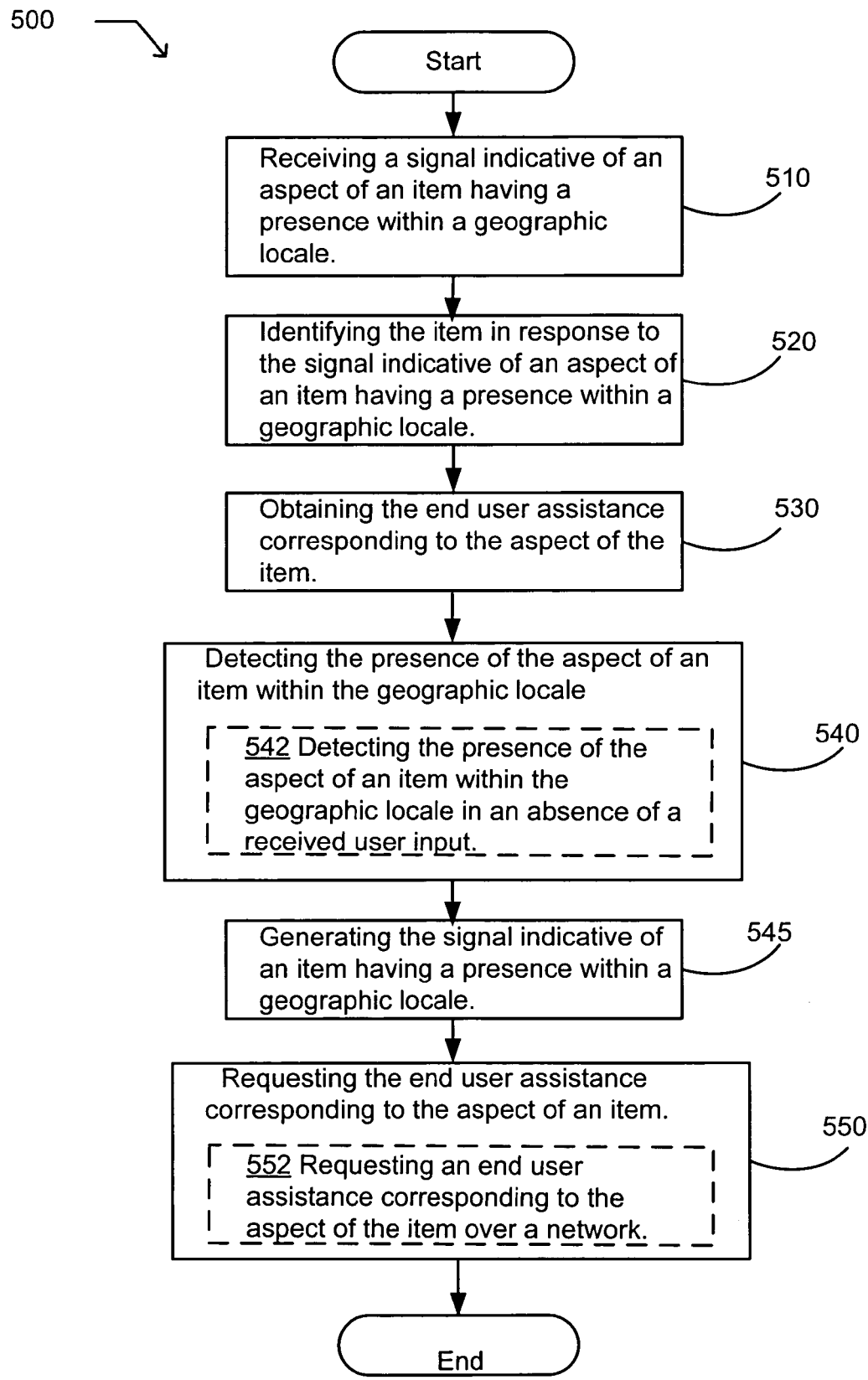
FIG. 17 illustrates another alternative embodiment of the exemplary operational flow of FIG. 15.

FIG. 17 illustrates an alternative embodiment of the exemplary operational flow 500 of FIG. 15. FIG. 17 illustrates an embodiment where the operational flow 500 may include a discovery operation 540, a generating operation 545, and a requesting operation 550. The discovery operation 540 includes detecting the presence of the aspect of an item within the geographic locale. In a further alternative embodiment, the discovery operation 540 may include an operation 542. At operation 542, the presence of the aspect of an item within the geographic locale is detected in an absence of a received user input. At the operation 545, the signal indicative of an item having a presence within a geographic locale is generated. At the request an operation 550, the end user assistance corresponding to the aspect of an item is requested. In a further alternative embodiment, the request operation 550 may include an operation 552. At operation 552, an end user assistance corresponding to the aspect of the item is requested over a network. The requesting end user assistance over a network may include requesting an end user assistance from a server. The operational flow 500 may in another embodiment include a providing operation (not shown). The providing operation includes providing the end user assistance corresponding to the aspect of the item.

FIG. 18 illustrates a partial view of an exemplary computer program product 560 that includes a computer program 564 for executing a computer process on a computing device. An embodiment of the exemplary computer program product 560 may be provided using a computer-readable medium 562, and includes computer executable instructions. The computer executable instructions encode the computer program 564 for executing on a computing device a process that includes receiving a signal indicative of an aspect of an item having a presence within a geographic locale, and identifying the item in response to the signal indicative of an aspect of an item having a presence within a geographic locale. The computer program 564 also includes obtaining an end user assistance corresponding to the aspect of the item, and saving the end user assistance corresponding to the aspect of the item. In certain embodiments, the computer program 564 may also include at least one additional process, such as a process 568, a process 570, a process 572, and a process 574. The process 568 includes detecting a presence of the item within a geographic locale. The process 570 includes generating a signal indicative of the aspect of an item. The process 572 includes requesting the end user assistance corresponding to aspect of the item. The process 574 includes providing the end user assistance corresponding to the aspect of the item. The computer-readable medium 562 may include a computer storage medium, which may be carried by a computer-readable carrier (not shown). The computer-readable medium 562 may include a communications medium (not shown).

Figure 19:
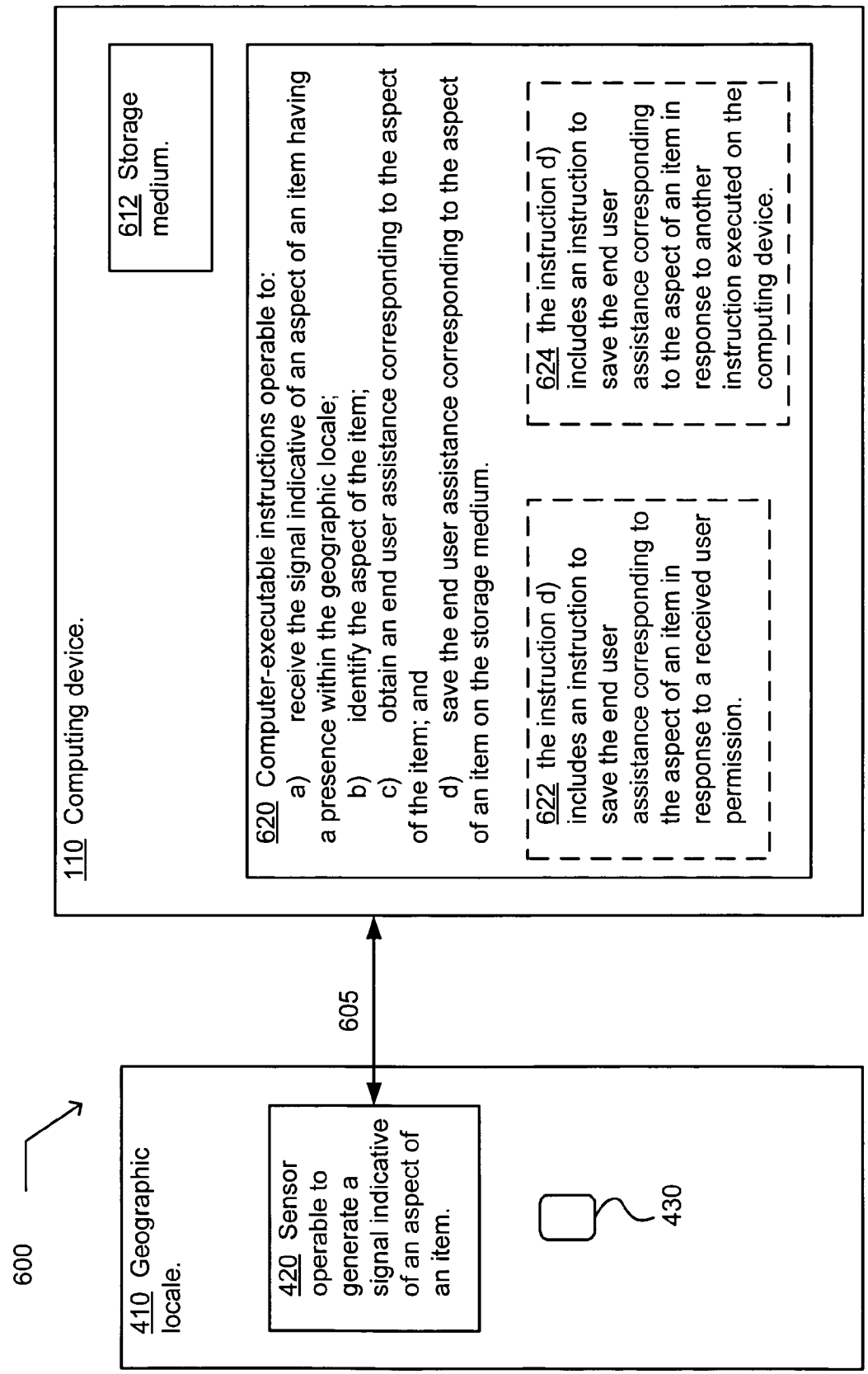
FIG. 19 illustrates an exemplary system in which embodiments may be implemented.

FIG. 19 illustrates an exemplary system 600 in which embodiments may be implemented. The system 600 includes a computing system environment that includes a computing device, illustrated as the computing device 110 of FIG. 1. The system 600 also includes the sensor 420 operable to generate a signal (not shown) indicative of an aspect of the item 430 having a presence within the geographic locale 410. The computing device 110 includes a storage medium 612, and is operable to receive the signal indicative of an aspect of an item through a coupling 605 between the sensor 420 and the computing device 110. The storage medium 612 may be any computer storage media. The system 600 further includes computer executable instructions 620 that when executed on the computing device causes the computing device to receive the signal indicative of an aspect of an item having a presence within the geographic locale, and identify the aspect of the item. The instructions further obtain an end user assistance corresponding to the aspect of the item, and save the end user assistance corresponding to the aspect of an item on the storage medium 612. The computer executable instructions 620 may include at least one additional operation. At operation 622, the instruction d) to save the end user assistance corresponding to the aspect of an item includes an instruction to save the end user assistance corresponding to the aspect of an item in response to a received user permission. At operation 624, the instruction d) to save the end user assistance corresponding to the aspect of an item includes an instruction to save the end user assistance corresponding to the aspect of an item in response to another instruction executed on the computing device 110.

Figure 20:
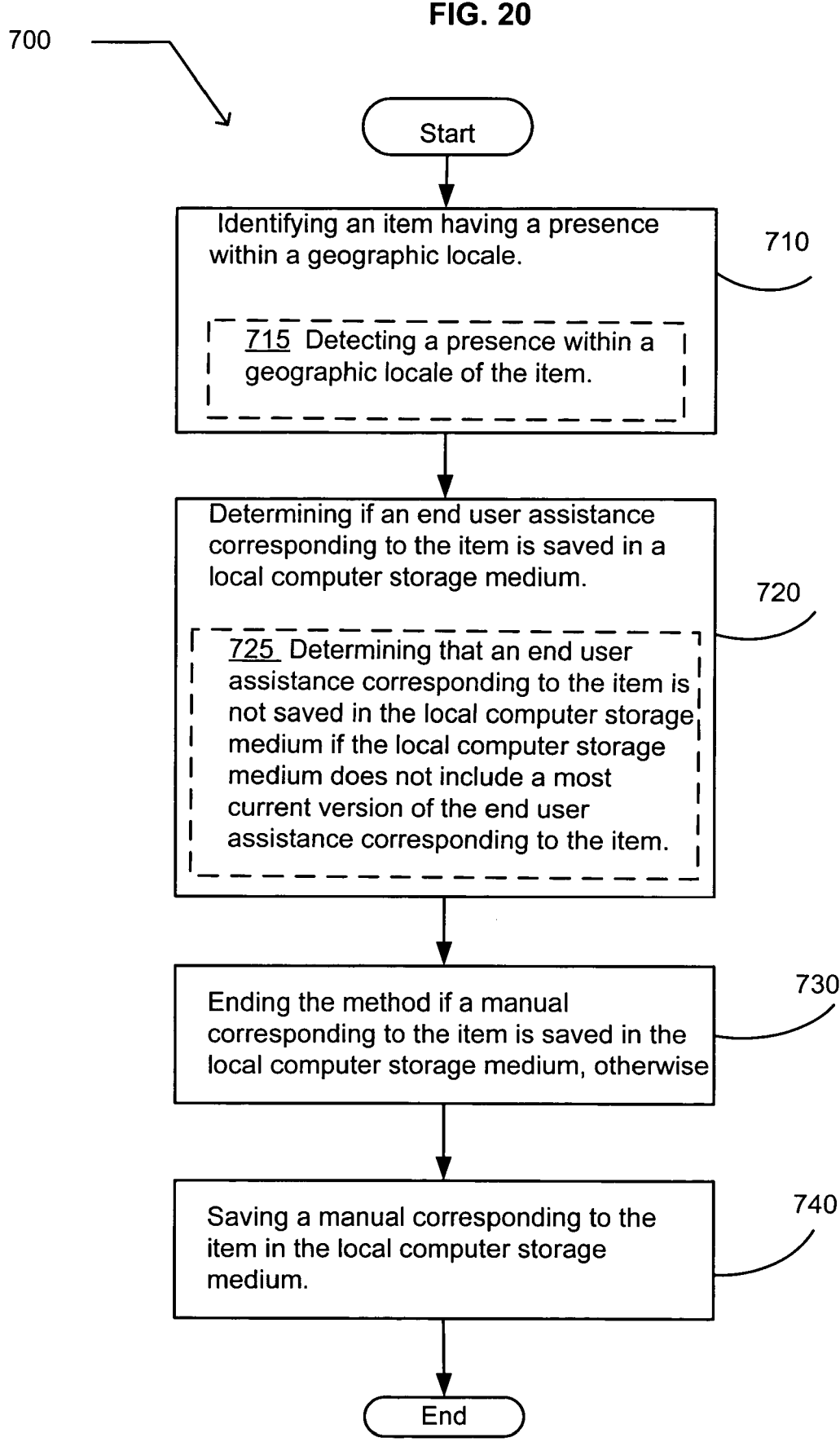
FIG. 20 illustrates an operational flow representing an exemplary operation that saves an end user assistance corresponding to an item having presence within a geographic locale.

FIG. 20 illustrates an operational flow 700 representing exemplary operations that save an end user assistance corresponding to an item having presence within a geographic locale. After a start operation, the operational flow 700 moves to a recognition operation 710 wherein an item having a presence within a geographic locale is identified. At discovery operation 720, a determination is made if an end user assistance corresponding to the item is saved in a computer storage medium local to the geographic locale. At termination operation 730, the operational flow 700 is ended if an end user assistance corresponding to the item is saved in the local computer storage medium. Otherwise, the operation flow 700 moves to retention operation 740, wherein an end user assistance corresponding to the item is saved in the local computer storage medium. The operational flow 700 then moves to an end operation.

In an alternative embodiment, the recognition operation 710 may include a sensing operation 715. At operation 715, a presence of the item within the geographic locale is detected. In another embodiment, the discovery operation 720 may include an operation 725. At the operation 725, a determination is made that an end user assistance corresponding to the item is not saved in the local computer storage medium if the local computer storage medium does not include a most current version of the end user assistance corresponding to the item.

Figure 21:
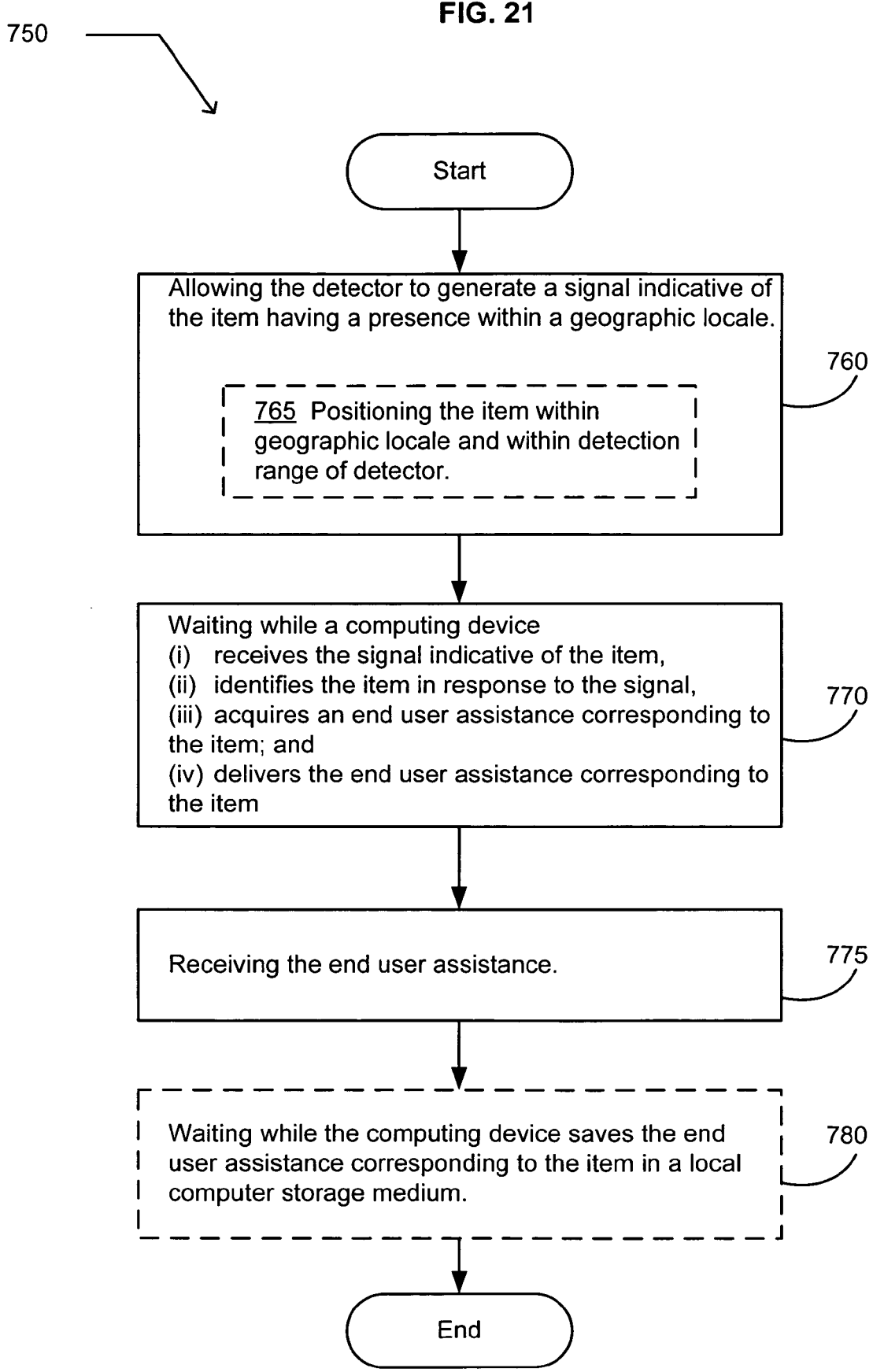
FIG. 21 illustrates an operational flow representing exemplary operations implemented in a computing device for receiving an end user assistance corresponding to an item having presence within a geographic locale.

FIG. 21 illustrates an operational flow 750 representing exemplary operations implemented in a computing device for receiving an end user assistance corresponding to an item having presence within a geographic locale. After a start operation, the operational flow 750 moves to a discovery operation 760 wherein a detector is allowed to generate a signal indicative of an item having a presence within a geographic locale. At operation 770, the operational flow 750 includes waiting while a computing system receives the signal indicative of the item, identifies the item in response to the signal, acquiring an end user assistance corresponding to the item, and delivers the end user assistance corresponding to the item. At operation 775, the end user assistance is received. The operational flow 750 then moves to an end operation. In an alternative embodiment, the discovery operation 760 may include an additional operation, such as an operation 765. At the operation 765, the item and the detector are positioned within a detection range that allows the detector to generate a signal indicative of the item. In a further alternative embodiment, the operational flow 750 may include an additional operation 780. The operation 780 includes a waiting while the computing device saves the end user assistance corresponding to the item in a local computer storage medium.

Figure 22:
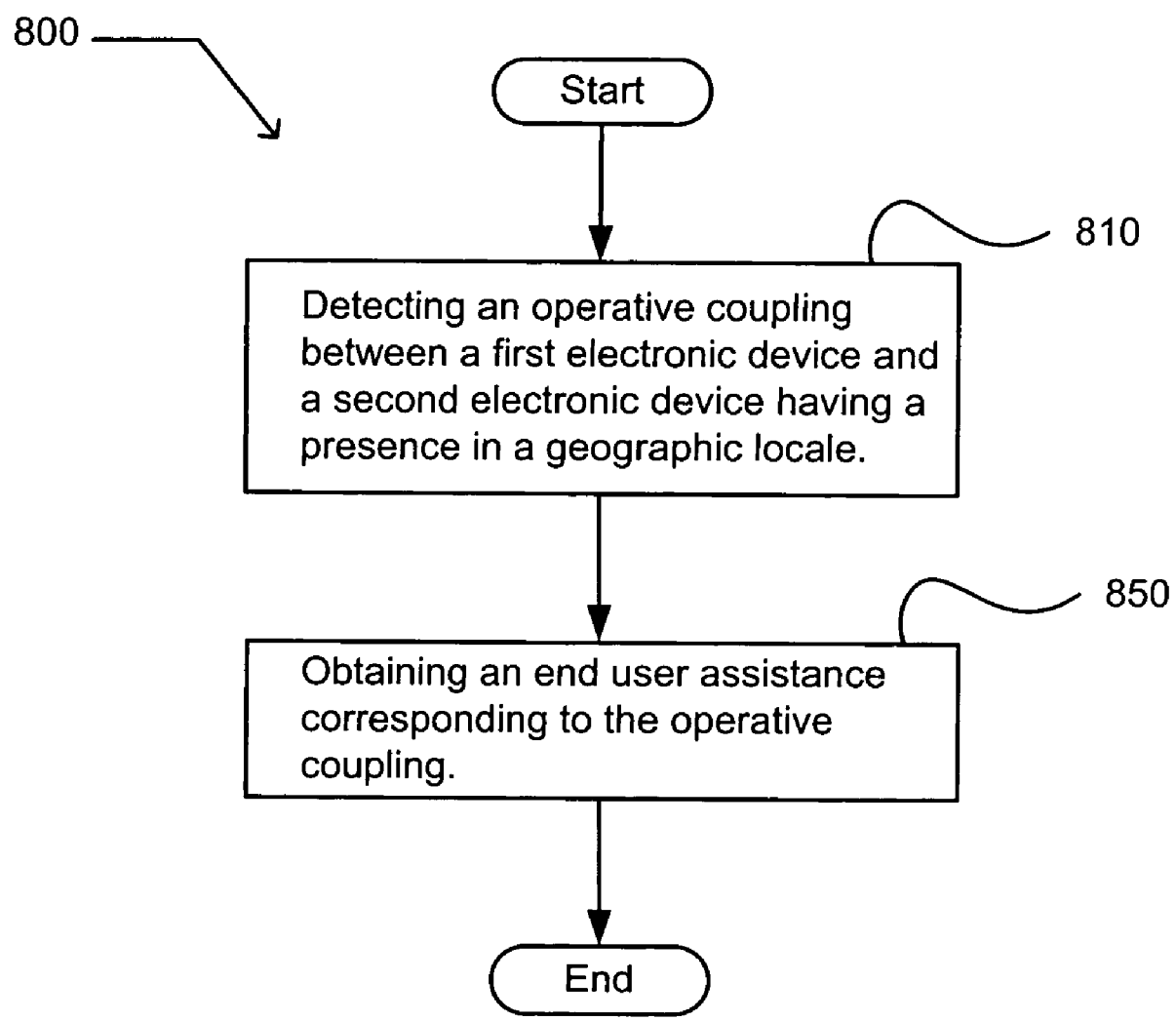
FIG. 22 illustrates an operational flow representing exemplary operations that obtain an end user assistance corresponding to an operative coupling between two electronic devices.

FIG. 22 illustrates an operational flow 800 representing exemplary operations that obtain an end user assistance corresponding to an operative coupling between a plurality of electronic devices. After a start operation, the operational flow 800 moves to a recognition operation 810 wherein an operative coupling is detected between a first electronic device and a second electronic device. The first and second electronic devices each having a presence in a geographic locale. In an embodiment, the first electronic device and the second electronic device both have a generally simultaneous presence within the geographic locale. At help operation 850, an end user assistance is obtained corresponding to the operative coupling. The operational flow 800 then moves to an end operation. In an embodiment, an operative coupling may include any communication of data and/or information between a sending electronic device and a receiving electronic device. In another embodiment, an operative coupling includes a two-way communication of data and/or information between electronic devices. In a further embodiment, an operative coupling between a first electronic device and second electronic device includes both devices having a functionality to mutually communicate without regard to whether a communication has ever occurred.

Figure 23:
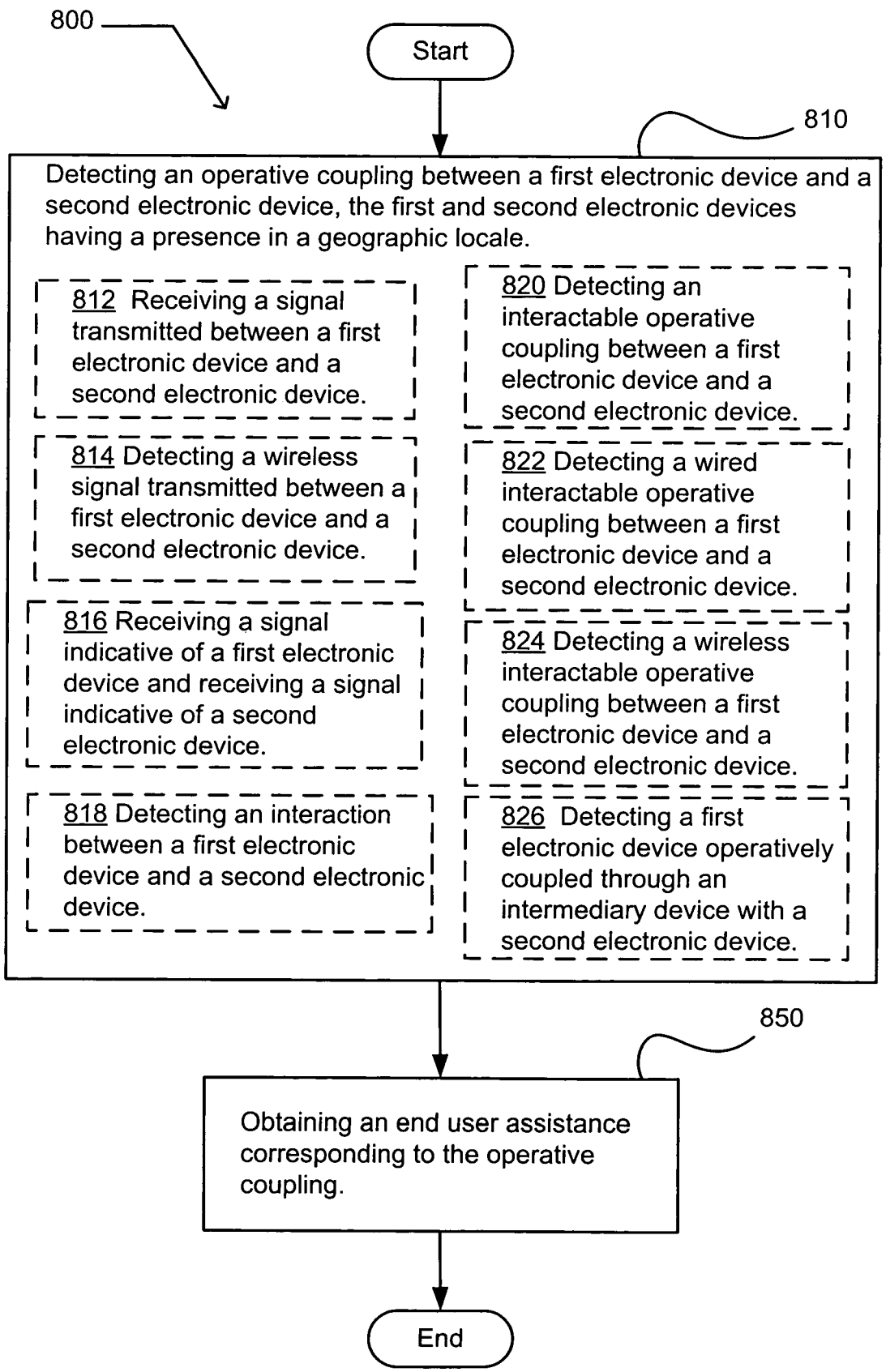
FIG. 23 illustrates an alternative embodiment of exemplary operational flow of FIG. 22.

FIG. 23 illustrates an alternative embodiment of the exemplary operational flow 800 of FIG. 22. FIG. 23 illustrates an embodiment where the recognition operation 810 may include at least one additional operation. Additional operations may include an operation 812, an operation 814, an operation 816, an operation 818, an operation 820, an operation 822, an operation 824, and an operation 826. At operation 812, a signal transmitted between the first electronic device and the second time device is received. At the operation 814, a wireless signal transmitted between a first electronic device and a second electronic device is detected. At the operation 816, a signal indicative of a first electronic device is received and a signal indicative of a second electronic device is received. At the operation 818, an interaction between a first electronic device and a second electronic device is detected. At the operation 820, an interactable coupling between a first electronic device and a second electronic device is detected. At the operation 822, a wired interactable coupling is detected between a first electronic device and a second electronic device. At the operation 824, a wireless interactable coupling is detected between a first electronic device and a second electronic device. At the operation 826, a first electronic device is detected operatively coupled through an intermediary device with a second electronic device.

Figure 24:
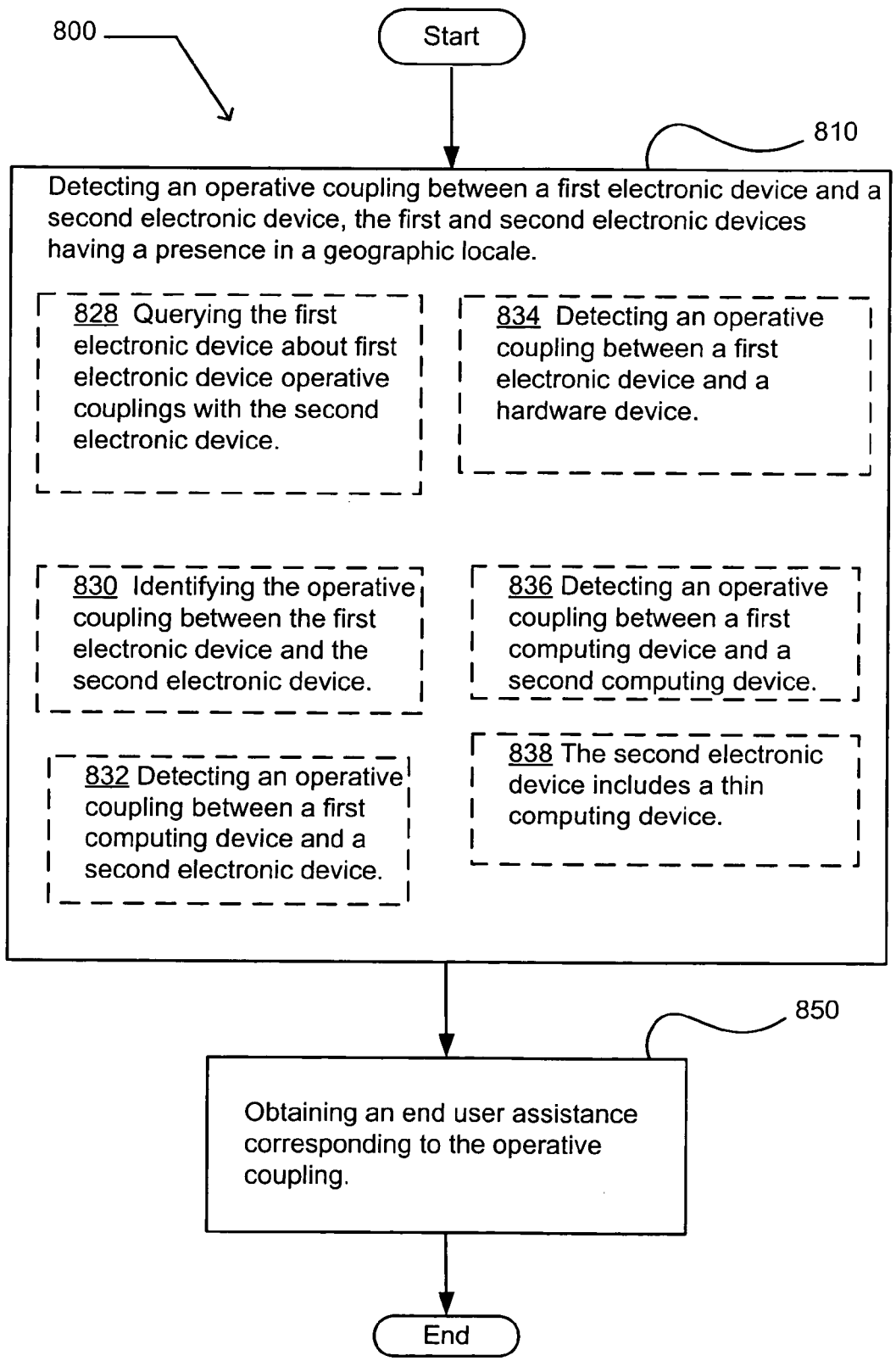
FIG. 24 illustrates a further alternative embodiment of the exemplary operational flow of FIG. 22.

FIG. 24 illustrates a further alternative embodiment of the exemplary operational flow 800 of FIG. 22. FIG. 24 illustrates an embodiment where the recognition operation 810 may include at least one additional operation. Additional operations may include an operation 828, an operation 830, and operation 832, an operation 834, an operation 836, and an operation 838. At the operation 828, the first electronic device is queried about first electronic device operative couplings with the second electronic device. At the operation 830, the operative coupling between the first electronic device and the second electronic device is identified. At the operation 832, an operative coupling is detected between a first computing device and a second electronic device. At the operation 834, an operative coupling is detected between a first electronic device and a hardware device. At the operation 836, an operative coupling is detected between a first computing device and a second computing device. At the operation 838, the second electronic device includes a thin computing device.

Figure 25:
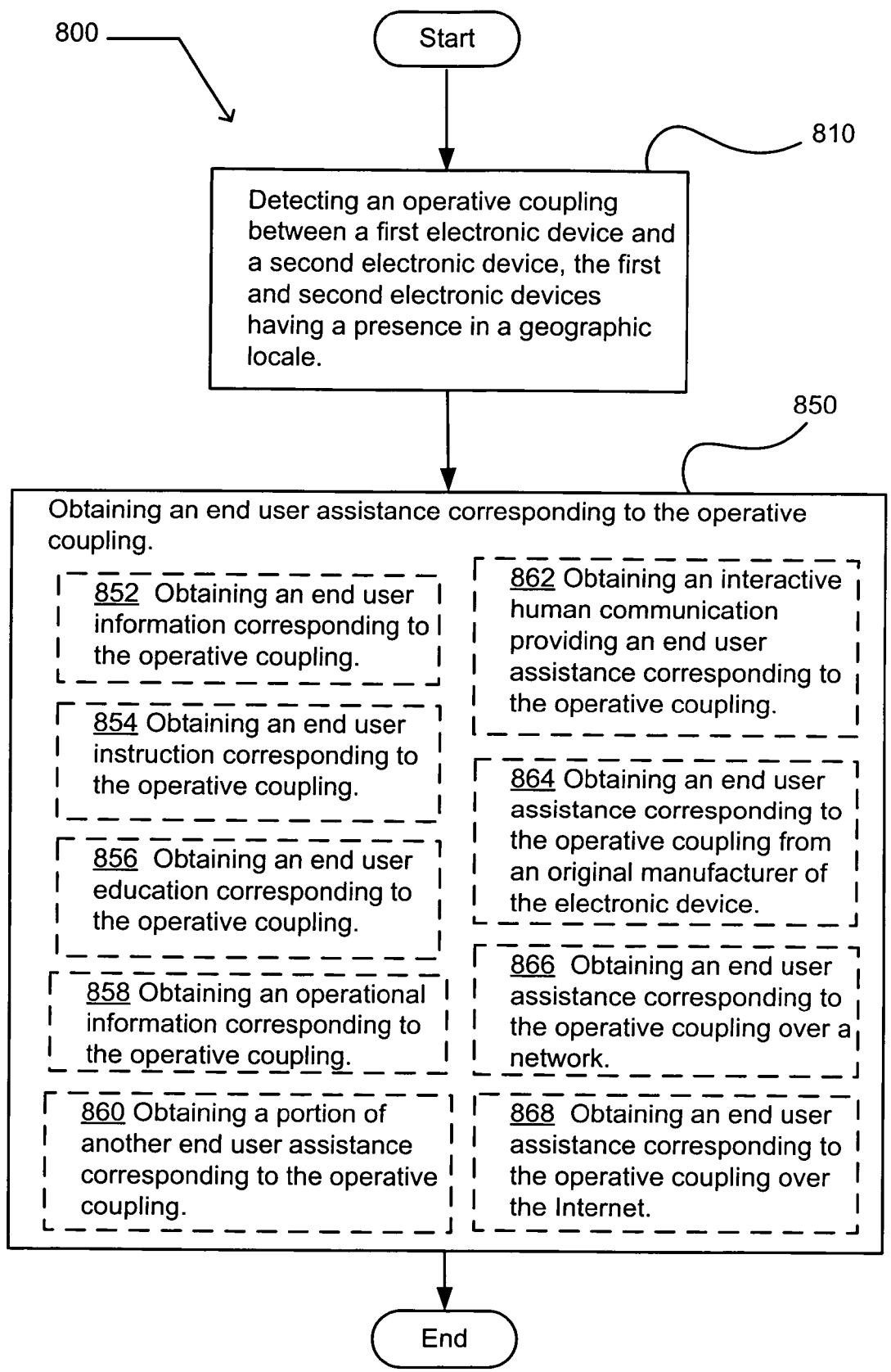
FIG. 25 illustrates another alternative embodiment of the exemplary operational flow of FIG. 22.

FIG. 25 illustrates another alternative embodiment of the exemplary operational flow 800 of FIG. 22. FIG. 25 illustrates an embodiment where the help operation 850 may include at least one additional operation. Additional operations may include an operation 852, an operation 854, an operation 856, an operation 858, an operation 860, an operation 862, an operation 864, an operation 866, and an operation 868. At the operation 852, a user information corresponding to the operative coupling is obtained. At the operation 854, a user instruction corresponding to the operative coupling is obtained. At the operation 856, a user education corresponding to the operative coupling is obtained. At the operation 858, an operational information corresponding to the operative coupling is obtained. At the operation 860, a portion of another user assistance corresponding to the operative coupling is obtained. At the operation 862, an interactive human communication providing an end user assistance corresponding to the operative coupling is obtained. At the operation 864, an end user assistance corresponding to the operative coupling is obtained from an original manufacturer of the electronic device. At the operation 866, an end user assistance corresponding to the operative coupling is obtained over a network. At the operation 868, an end user assistance corresponding to the operative coupling is obtained over the Internet.

Figure 26:
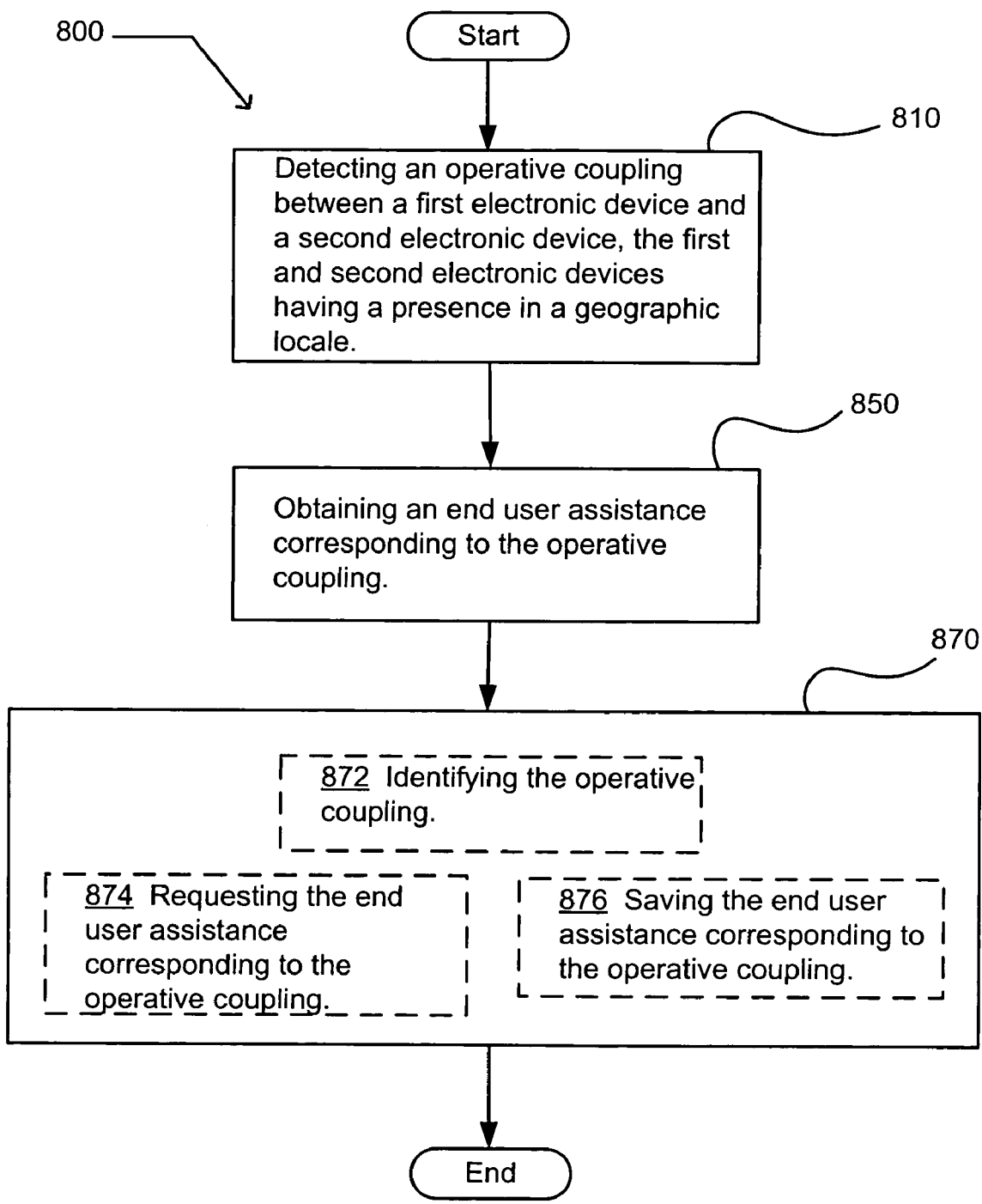
FIG. 26 illustrates an alternative embodiment of the exemplary operational flow of FIG. 22.

FIG. 26 illustrates an alternative embodiment of the exemplary operational flow 800 of FIG. 22. FIG. 26 illustrates an embodiment where the operational flow 800 may include at least one additional operation 870. Additional operations may include a recognition operation 872, a call operation 874, and a storage operation 876. At the recognition operation 872, the operative coupling is identified. At the call operation 874, the end user assistance corresponding to the operative coupling is requested. At the storage operation 876, the end user assistance corresponding to the operative coupling is saved.

FIG. 27 illustrates a partial view of an exemplary computer program product 900 that includes a computer program 904 for executing a computer process on a computing device. An embodiment of the exemplary computer program product 900 may be provided using a computer-readable medium 902, and includes computer executable instructions. The computer executable instructions encode the computer program 904 for executing on a computer system a process that includes identifying an operative coupling between a first electronic device and a second electronic device, the first and second electronic devices having a presence in a geographic locale. The process also includes obtaining an end user assistance corresponding to the operative coupling. In an alternative embodiment, the process may include at least one additional instruction. Additional instructions may include instruction 906, instruction 908, and instruction 910. At instruction 906, the process includes receiving a signal indicative of the operative coupling between a first electronic device and a second electronic device. At the instruction 908, the process includes saving the end user assistance corresponding to the operative coupling. At the instruction 910, the process includes providing the end user assistance corresponding to the operative coupling. The computer-readable medium 902 may include a computer storage medium, which may be carried by a computer-readable carrier (not shown). The computer-readable medium 902 may include a communications medium (not shown).

Figure 28:
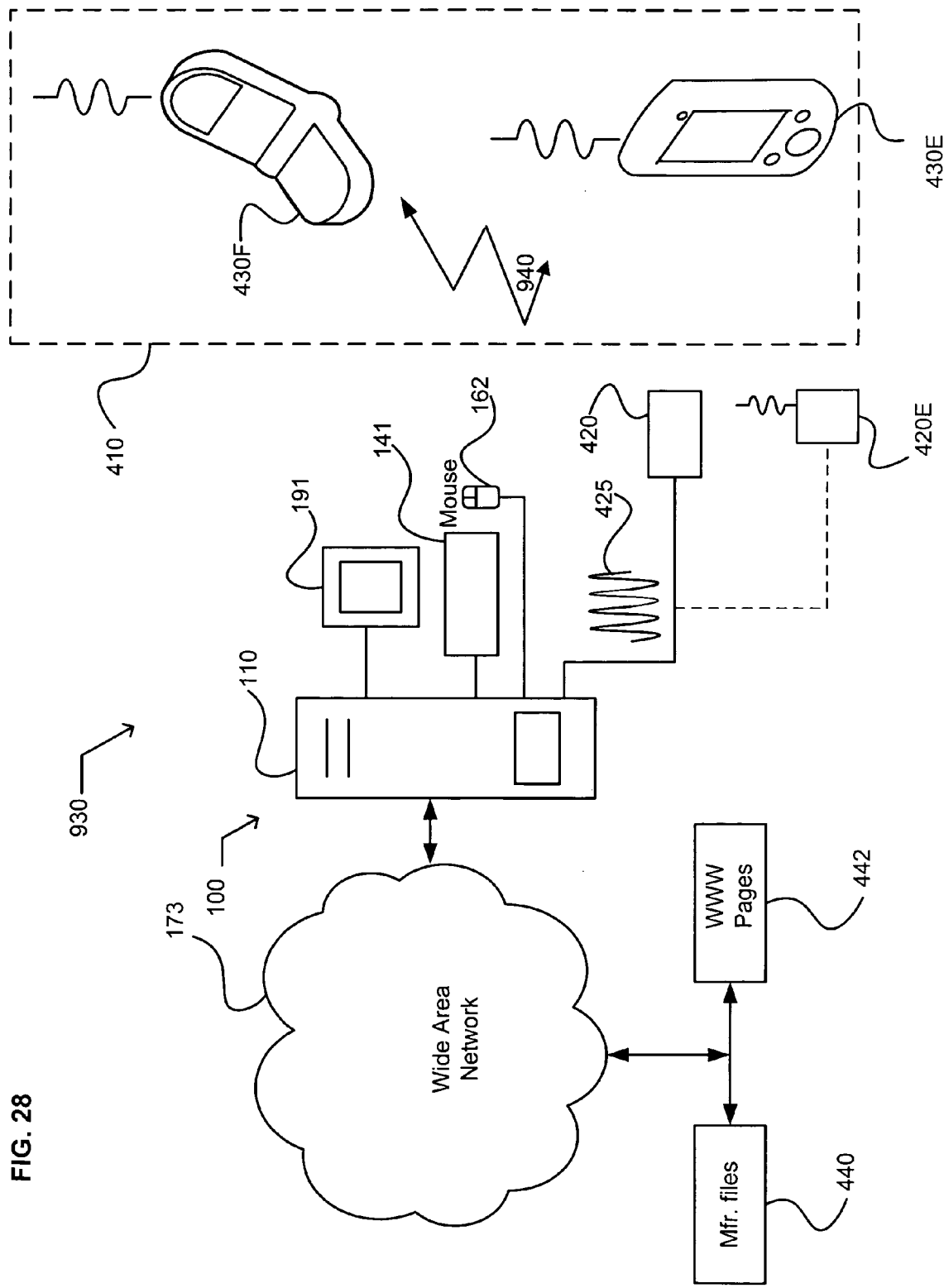
FIG. 28 illustrates an exemplary system in which embodiments may be implemented.

FIG. 28 illustrates an exemplary system 930 in which embodiments may be implemented. The system 930 includes a computing system environment, illustrated as the computing system environment 100 and the computing device 110 of FIG. 2. The system 930 may include a sensor, such as the sensor 420, operable to provide a signal, such as the signal 425 indicative of a plurality of items each having a presence within the geographic locale 410. The plurality of items is illustrated as an electronic device 430E and an electronic device 430F. FIG. 28 illustrates an operative coupling 940 between the electronic device 430E and electronic device 430 F. The operative coupling 940 may include any type of operative coupling. For example and without limitation, the operative coupling 940 may include a wired coupling, and/or a wireless coupling. The computing device 110 includes an operability to receive a signal indicative of the operative coupling 940 between the first electronic device 430E and the second electronic device 430F. The computing device 110 further includes a computer program product encoding a computer program for executing on the computing device a computer process for obtaining an end user assistance corresponding to the operative coupling 940. The computer process includes instructions that when executed on the computing device cause the computing device to identify the operative coupling between a first electronic device and a second electronic device in response to the signal indicative of an operative coupling, and obtain an end user assistance corresponding to the identified operative coupling. In an alternative embodiment, the first electronic device 430E may include the computing device 110. In further alternative embodiments, the instructions may include saving the end user assistance, and/or providing the end user assistance.

Figure 29:
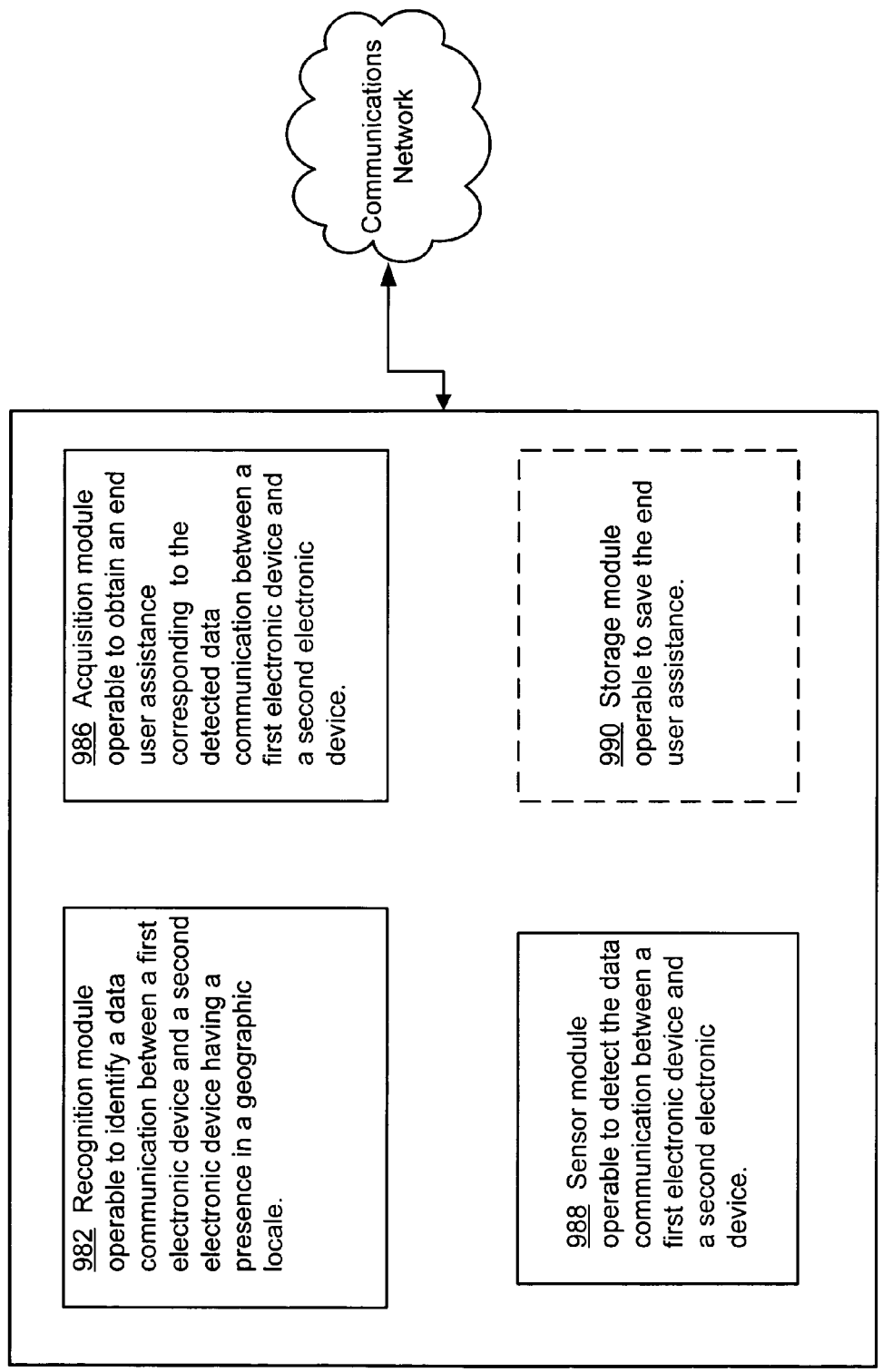
FIG. 29 includes an exemplary system in which embodiments may be implemented.

FIG. 29 includes an exemplary system 980 in which embodiments may be implemented. The system 980 includes a recognition module 982, an acquisition module 986, and a sensor module 988. The recognition module 982 includes operability to identify a data communication between a first electronic device and a second electronic device, the first and second electronic devices having a presence in a geographic locale. The acquisition module 986 includes operability to obtain an end user assistance corresponding to the detected data communication between a first electronic device and a second electronic device. The sensor module 988 includes operability to detect the data communication between a first electronic device and a second electronic device. In an alternative embodiment, the system 980 may include at least one additional module. An additional module may include a storage module 990 operable to save the end user assistance.

Figure 30:
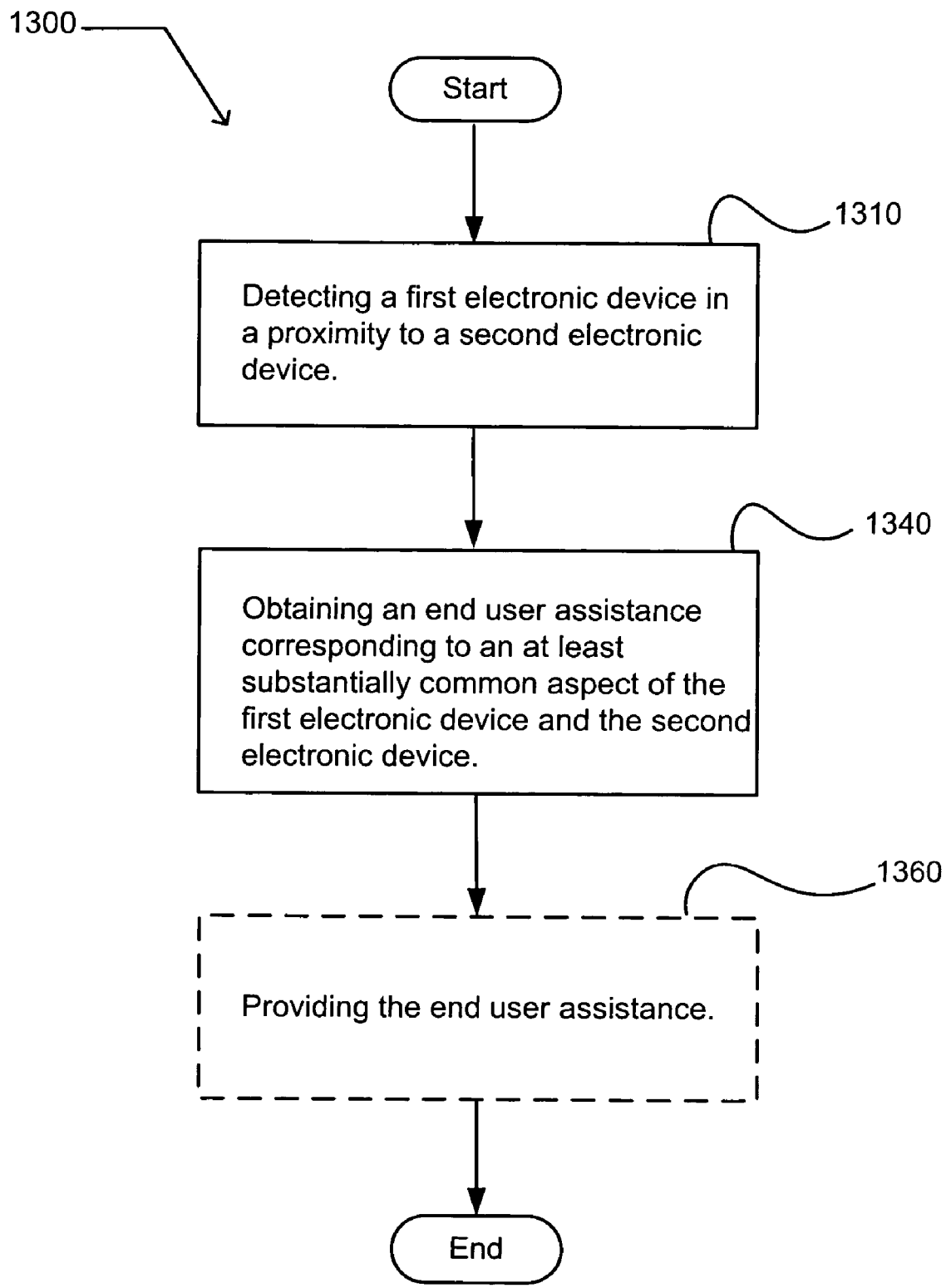
FIG. 30 illustrates an operational flow representing exemplary operations that obtains an end user assistance corresponding to an at least substantially common aspect of the first electronic device and the second electronic device.

FIG. 30 illustrates an operational flow 1300 representing exemplary operations that obtain an end user assistance corresponding to an at least substantially common aspect of the first electronic device and the second electronic device. After a start operation, the operation flow 1300 moves to a sensing operation 1310. At the sensing operation 1310, a first electronic device in a proximity to a second electronic device is detected. At an acquisition operation 1340, an end user assistance corresponding to an at least substantially common aspect of the first electronic device and the second electronic device is obtained. The operational flow 1300 then moves to an end operation. In an alternative embodiment, the operational flow 1300 may include one or more additional operations, such as an operation 1360. At the operation 1360, the end user assistance is provided.

Figure 31:
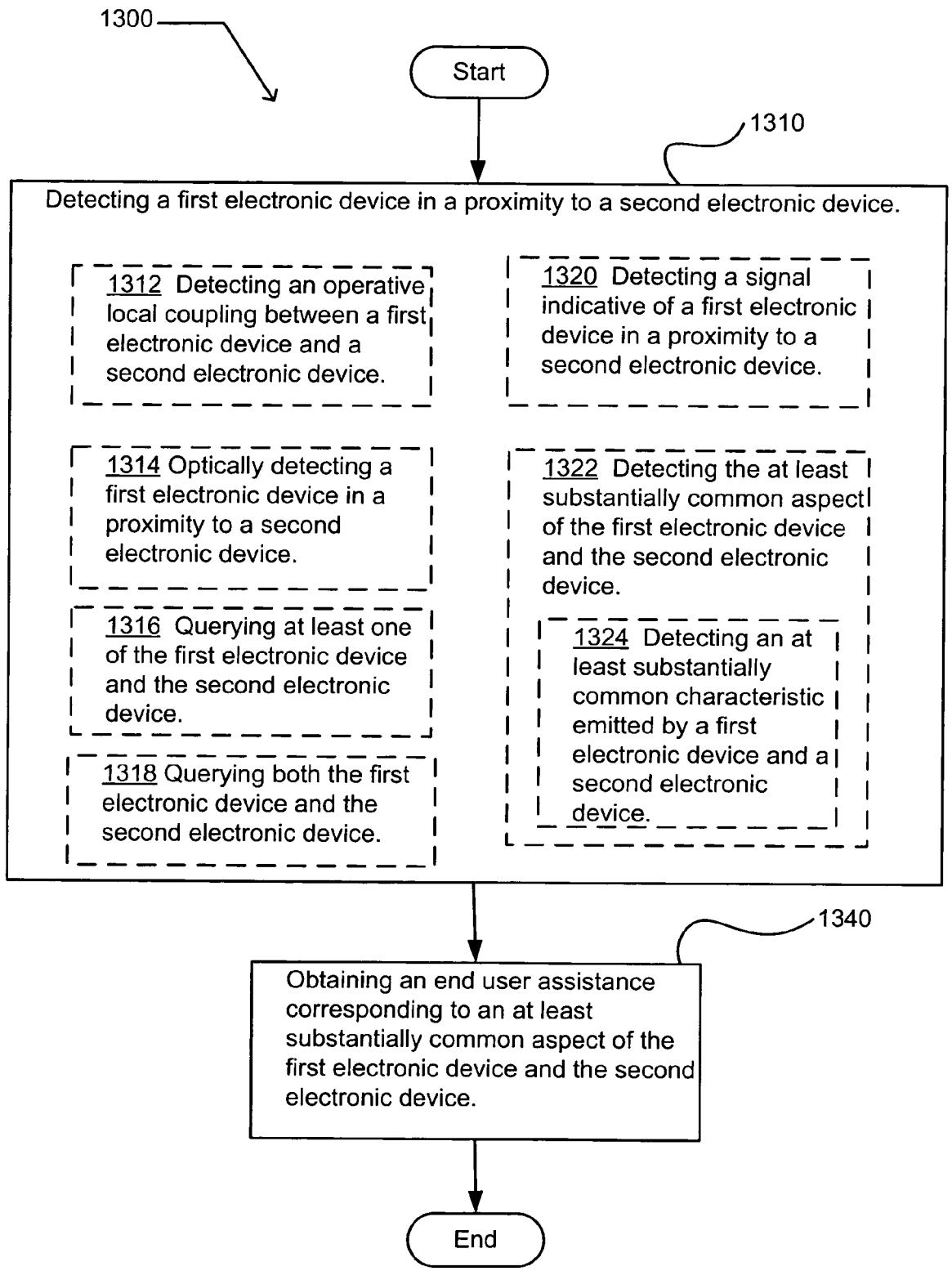
FIG. 31 illustrates an alternative embodiment of the exemplary operational flow of FIG.30.

FIG. 31 illustrates an alternative embodiment of the exemplary operational flow 1300 of FIG. 30. The sensing operation 1310 may include one or more additional operations. The additional operations may include an operation 1312, an operation 1314, an operation 1316, an operation 1318, an operation 1320, and an operation 1322. At the operation 1312, an operative local coupling is detected between a first electronic device and a second electronic device. In an alternative embodiment, the operative local coupling may include a coupling directly between the first and second electronic devices, and not through an intermediate device. In another alternative embodiment, the operative local coupling may include a coupling between the first and second electronic devices through an intermediate device, wherein the first and second electronic devices and the intermediate device are all located within a premises, such as a residential premises and/or a business premises. At the operation 1314, a first electronic device is optically detected in a proximity to a second electronic device. At the operation 1316, at least one of the first electronic device and the second electronic device is queried to detect a first electronic device in a proximity to a second electronic device. At the operation 1318, both of the first electronic device and the second electronic device are queried to detect a first electronic device in a proximity to a second electronic device. For example, in an embodiment, both the first and second electronic devices may be queried for their GPS coordinates, and proximity detected by comparing the GPS coordinates. At the operation 1320, a signal indicative of a first electronic device in a proximity to a second electronic device is detected. In an embodiment, the detecting may include detecting a presence of a substantially common low power tuner signal, such as a heterodyne signal, RFID signals, emitted sounds, signals transmitted on a preselected frequency and/or frequencies commonly used by portable wireless devices. At the operation 1322, an at least substantially common aspect of the first electronic device and the second electronic device are detected. For example, in an embodiment, the first and second electronic devices may be queried for address books, contact lists, favorites lists, and/or channel presets. The operation 1322 may include one or more additional operations, such as the operation 1324. At the operation 1324, an at least substantially common characteristic emitted by a first electronic device and a second electronic device is detected.

Figure 32:
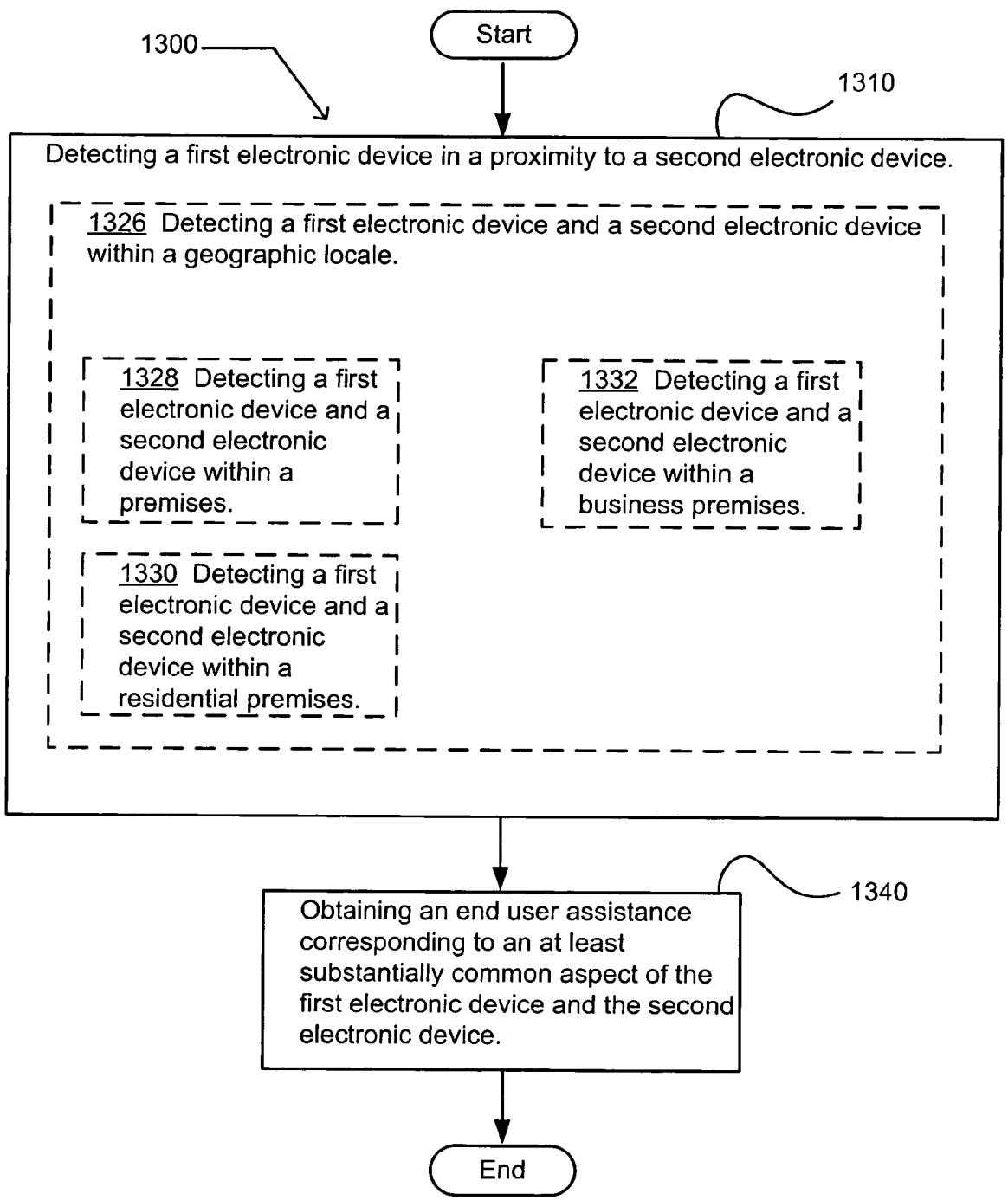
FIG. 32 illustrates another alternative embodiment of the exemplary operational flow of FIG. 30.

FIG. 32 illustrates an alternative embodiment of the exemplary operational flow 1300 of FIG. 30. The sensing operation 1310 may include one or more additional operations, such as the operation 1326. At the operation 1326, a first electronic device and a second electronic device are detected within a geographic locale. The operation 1326 may include one or more additional operations. The additional operations may include an operation 1328, an operation 1330, and an operation 1332. At the operation 1328, a first electronic device and a second electronic device are detected within a premises. At the operation 1330, a first electronic device and a second electronic device are detected within a residential premises. At the operation 1332, a first electronic device and a second electronic device are detected within a business premises.

Figure 33:
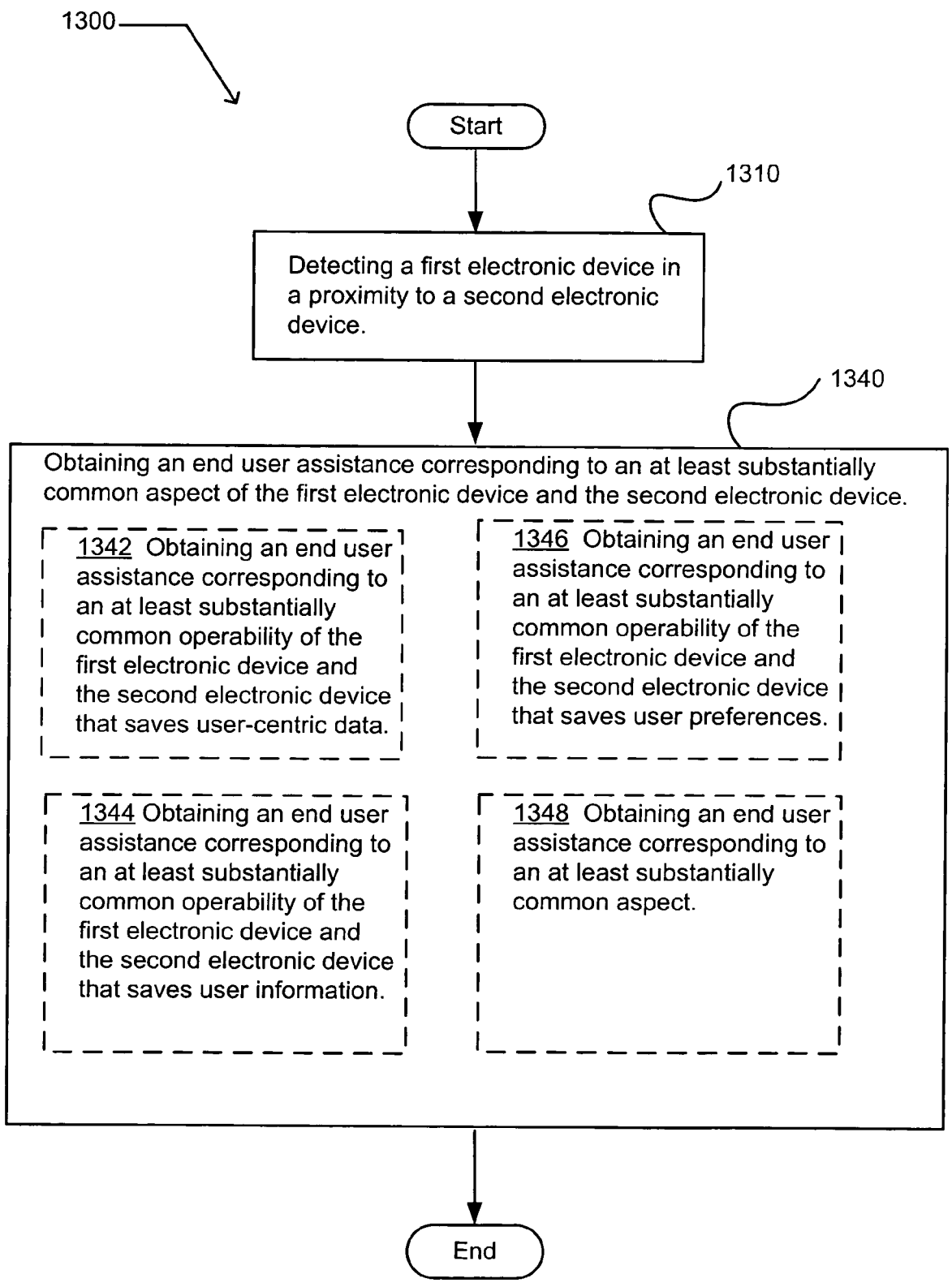
FIG. 33 illustrates an alternative embodiment of the exemplary operational flow of FIG. 30.

FIG. 33 illustrates an alternative embodiment of the exemplary operational flow 1300 of FIG. 30. The acquisition operation 1340 may include one or more additional operations. The additional operations may include an operation 1342, an operation 1344, an operation 1346, and an operation 1348. At the operation 1342, an end user assistance is obtained corresponding to an at least substantially common operability that saves user-centric data of the first electronic device and the second electronic device. At the operation 1344, an end user assistance is obtained corresponding to an at least substantially common operability that saves user information of the first electronic device and the second electronic device. At the operation 1346, an end user assistance is obtained corresponding to an at least substantially common operability that saves user preferences of the first electronic device and the second electronic device. At the operation 1348, an end user assistance is obtained corresponding to an at least substantially common aspect.

FIG. 34 illustrates an alternative embodiment of the exemplary operational flow 1300 of FIG. 30. The acquisition operation 1340 may include one or more additional operations. The additional operations may include an operation 1350, and operation 1352, an operation 1354, and an operation 1356. At the operation 1350, a user instruction is obtained corresponding to an at least substantially common aspect of the first electronic device and the second electronic device. At the operation 1352, a user education is obtained corresponding to a substantially common state of the electronic device of the first electronic device and the second electronic device. At the operation 1354, an operational information is obtained corresponding to a substantially common state of the electronic device of the first electronic device and the second electronic device. At the operation 1356, an end user assistance is obtained from a portion of another user assistance.

FIG. 35 illustrates a partial view of an exemplary computer program product 1380 that includes a computer program 1384 for executing a computer process on a computing device. An embodiment of the exemplary computer program product 1380 may be provided using a computer-readable medium 1382, and includes computer executable instructions. The computer product 1380 encodes the computer program 1384 for executing on a computing device a computer process that includes detecting a first electronic device in a proximity to a second electronic device, and obtaining an end user assistance corresponding to an at least substantially common aspect of the first electronic device and the second electronic device. In an alternative embodiment, the process may include at least one additional instruction, such as an instruction 1386. At the instruction 1386, the process includes providing the end user assistance. The computer-readable medium 1382 may include a computer storage medium, which may be carried by a computer-readable carrier (not shown). The computer-readable medium 1382 may include a communications medium (not shown).

Figure 36:
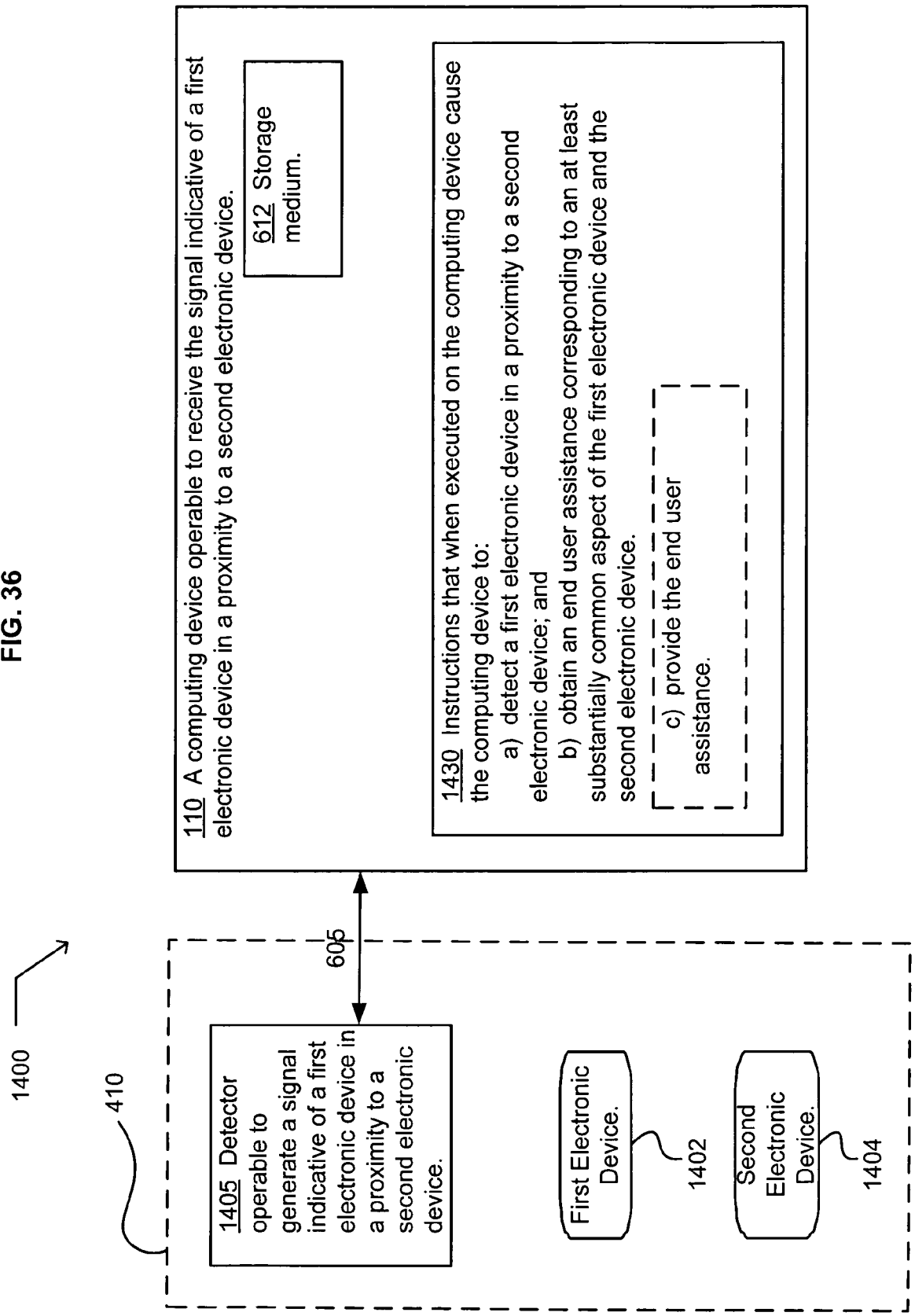
FIG. 36 illustrates an exemplary system in which embodiments may be implemented.

FIG. 36 illustrates an exemplary system 1400 in which embodiments may be implemented. The system 1400 includes a computing device, illustrated as the computing device 110 of FIG. 2. The system 1400 may include a detector 1405 operable to generate a signal indicative of a first electronic device in a proximity to a second electronic device, which is illustrated as a first electronic device 1402 and a second electronic device 1404 located within the geographic locale 410. The computing device 110 includes an operability to receive the signal indicative of a first electronic device 1402 in a proximity to the second atomic device 1404. The detector 1405 and the computing device 110 are coupled by a coupler, such as the coupler 605 of FIG. 19. The computing device 110 further includes a computer program product encoding a computer program for executing on the computing device a computer process for obtaining an end user assistance. The computer process includes instructions 1430 that when executed on the computing device cause the computing device to detect a first electronic device in a proximity to a second electronic device, and obtain an end user assistance corresponding to an at least substantially common aspect of the first electronic device and the second electronic device. In an alternative embodiment, the computer process may include additional instructions, such as to provide the end user assistance. In an embodiment, the first electronic device 1402 may include the computing device 110. In another embodiment, the computing device 110 may include the first electronic device 1402.

Figure 37:
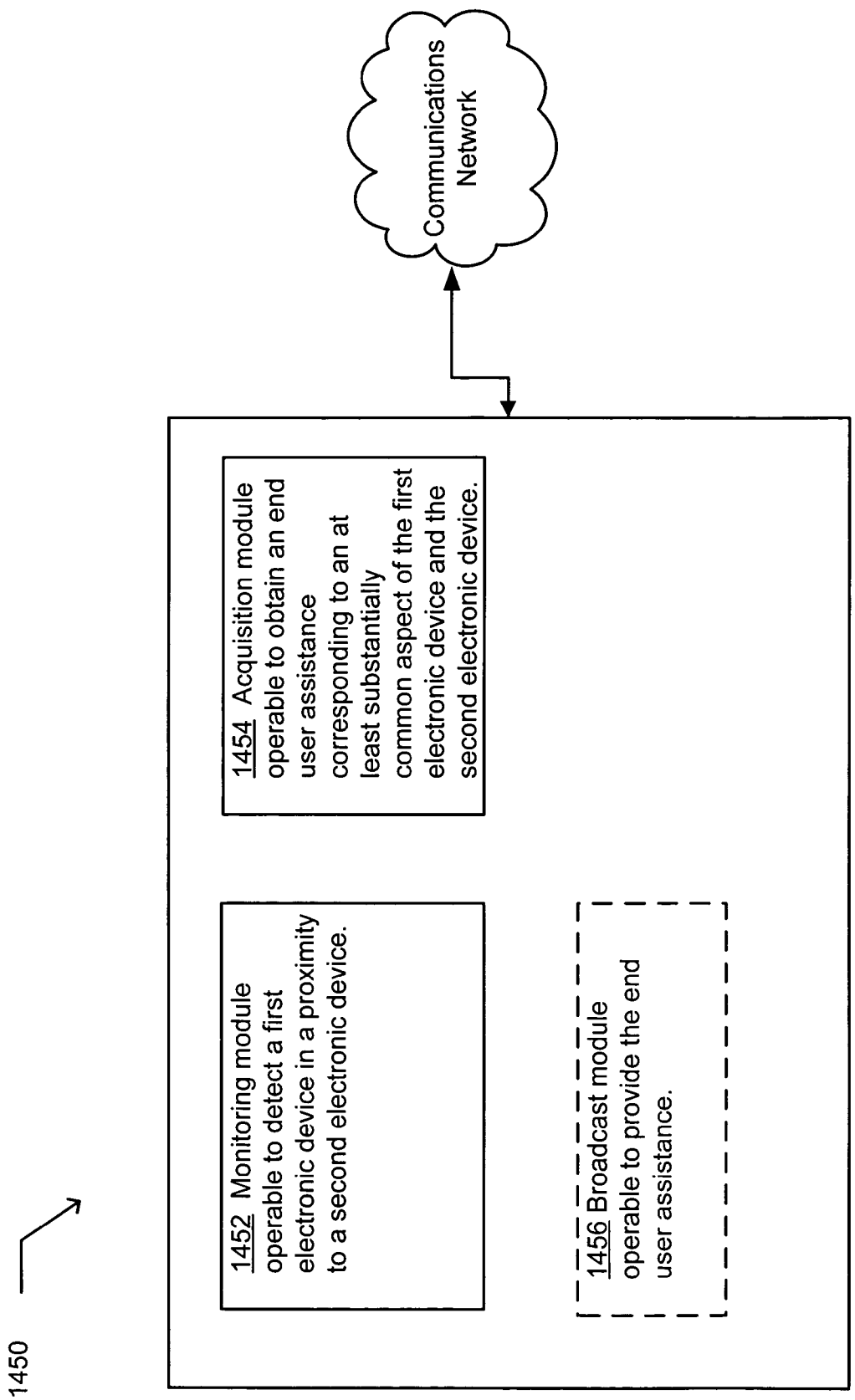
FIG. 37 illustrates an exemplary system in which embodiments may be implemented.

FIG. 37 illustrates an exemplary system 1450 in which embodiments may be implemented. The system 1450 includes a monitoring module 1452, and an acquisition module 1454. The monitoring module 1452 includes an operability to detect a first electronic device in a proximity to a second electronic device. The acquisition module 1454 includes an operability to obtain an end user assistance corresponding to an at least substantially common aspect of the first electronic device and the second electronic device. In an alternative embodiment, the system 1450 may include one or more additional modules, such as a broadcast module 1456. The broadcast module 1456 includes an operability to provide the end user assistance.

Figure 38:
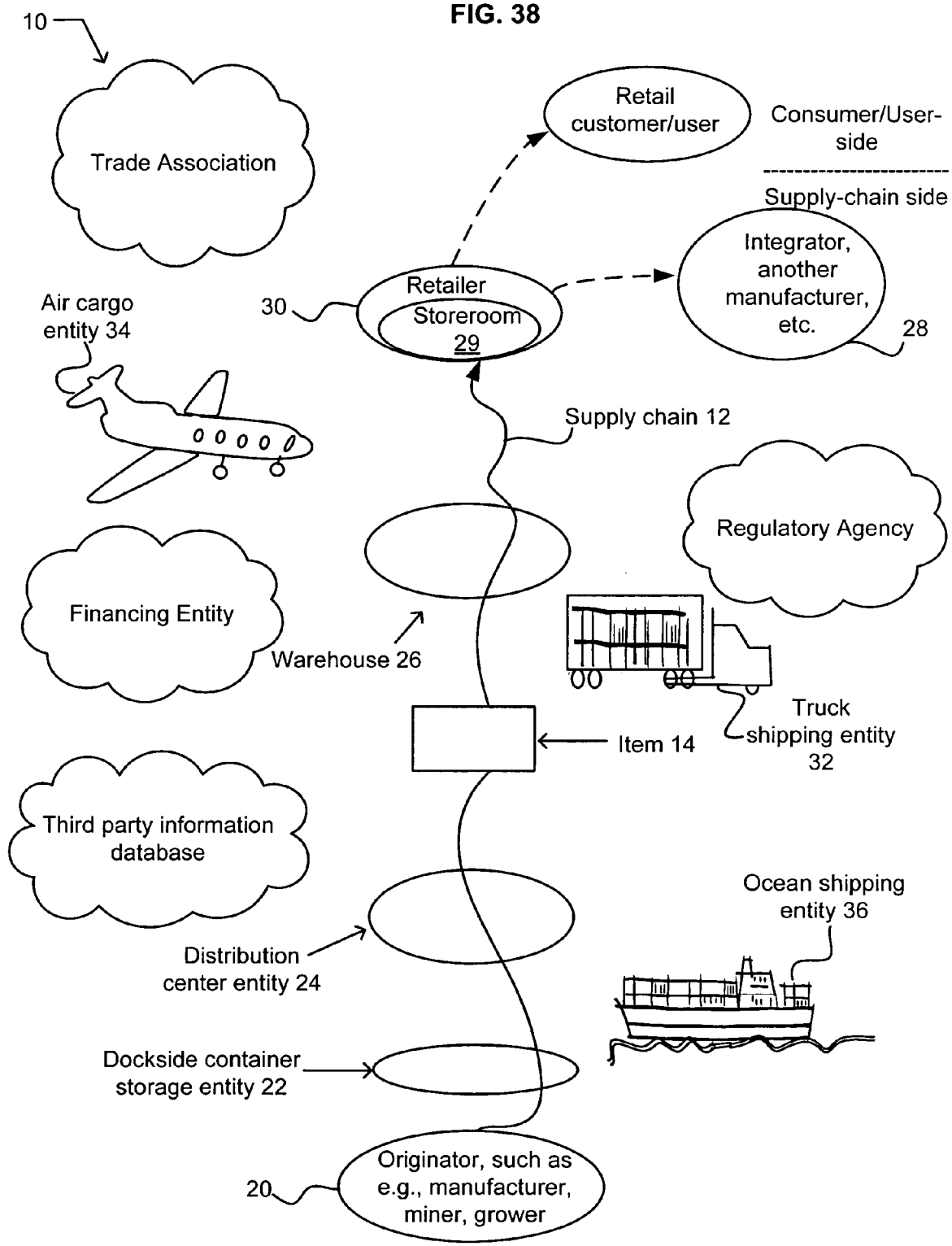
FIG. 38 illustrates a brief, general description of a supply-chain environment in which embodiments may be implemented.

FIG. 38 illustrates a brief, general description of a supply-chain environment 10 in which embodiments may be implemented. A supply chain, such as the supply chain 12, may include a series of movements of an item 14 from its manufacturer to a retailer's shelf or to another manufacturer that integrates the item into another product. A supply chain may include a linked set of resources and processes that begins with the sourcing of raw material for an item, and extends through the delivery of the item to the final customer. A supply chain may include vendors, manufacturing facilities, logistics providers, transportation entities, internal distribution centers, distributors, wholesalers, and all other entities that lead up to a final customer acceptance. An extended supply chain for a given company may also include secondary vendors to their immediate vendors, and the customers of their immediate customers.

For example, the item 14 may travel the supply chain 12 that originates at an originator 20, such as a manufacturer, miner, or grower, and that terminates at a retailer 30 or an integrator 28. If the supply chain terminates at a supply room 29 of the retailer 30 or the retail display of the retailer, the item may ultimately move to a retail customer/user. If the supply chain terminates at the integrator 28, the item 14 may be incorporated into another product or repackaged and move along another supply chain that originates with the integrator. Between the originator 20 and the retailer 30 or integrator 28, the item 14 may have a presence within a geographic locale controlled by a dockside container storage entity 22. The item 14 may also have a presence within a geographic locale controlled by distribution center entity 24, and may have a presence in a warehouse controlled by a warehouse entity 26.

The item 14 may be moved along the supply chain 12 by one or more forms of conveyance. For example, a ocean shipping entity 36 may convey the item between a dock controlled by the dockside container storage entity 22 and a distribution center controlled by the distribution center entity 24. By way of further example, a truck shipment enterprise entity 32 may convey the item between the distribution center and a warehouse controlled by a warehouse entity 26. In a further example, an air cargo entity 34 may convey the item between the warehouse 26 and the storeroom 32.

Technology may benefit a supply chain by providing an ability to track and identify the item 14 as the item moves through the supply chain 12. Benefits may be provided by combining unique product codes and/or identifying symbols, such as the Electronic Product Code (EPC) system, and identification technology, including bar code and radio frequency identification (RFID) technologies. A tracked and/or identified item may include an individual product, a case of a product, and/or a pallet of products.

In the illustrated supply chain environment 10, one or more of the entities along the supply chain 12 may have a network-capable computer system (not shown) operable to identify the item 14 when it is present in their facilities or conveyance. In addition, the one or more entities may associate information with the item 14 when it is present in their facilities or conveyance. Such associated information may include historical information, such as when the item was present, who delivered it, to who it was delivered, and conditions associated with its presence, such as time, date, temperature, impacts, or vibration. Such associated information may also include information obtained from a third party.

In addition to the parties described above that have possession of the item during its movement along the supply chain 14, other parties may have an interest in the item and/or may have information relevant to the item. For example, such other parties may include a regulatory agency, a financing entity, a third-party database, and/or a trade association. One or more of these parties may have a network-capable computer system (not shown) operable to associate information with the item 14.

Figure 39:
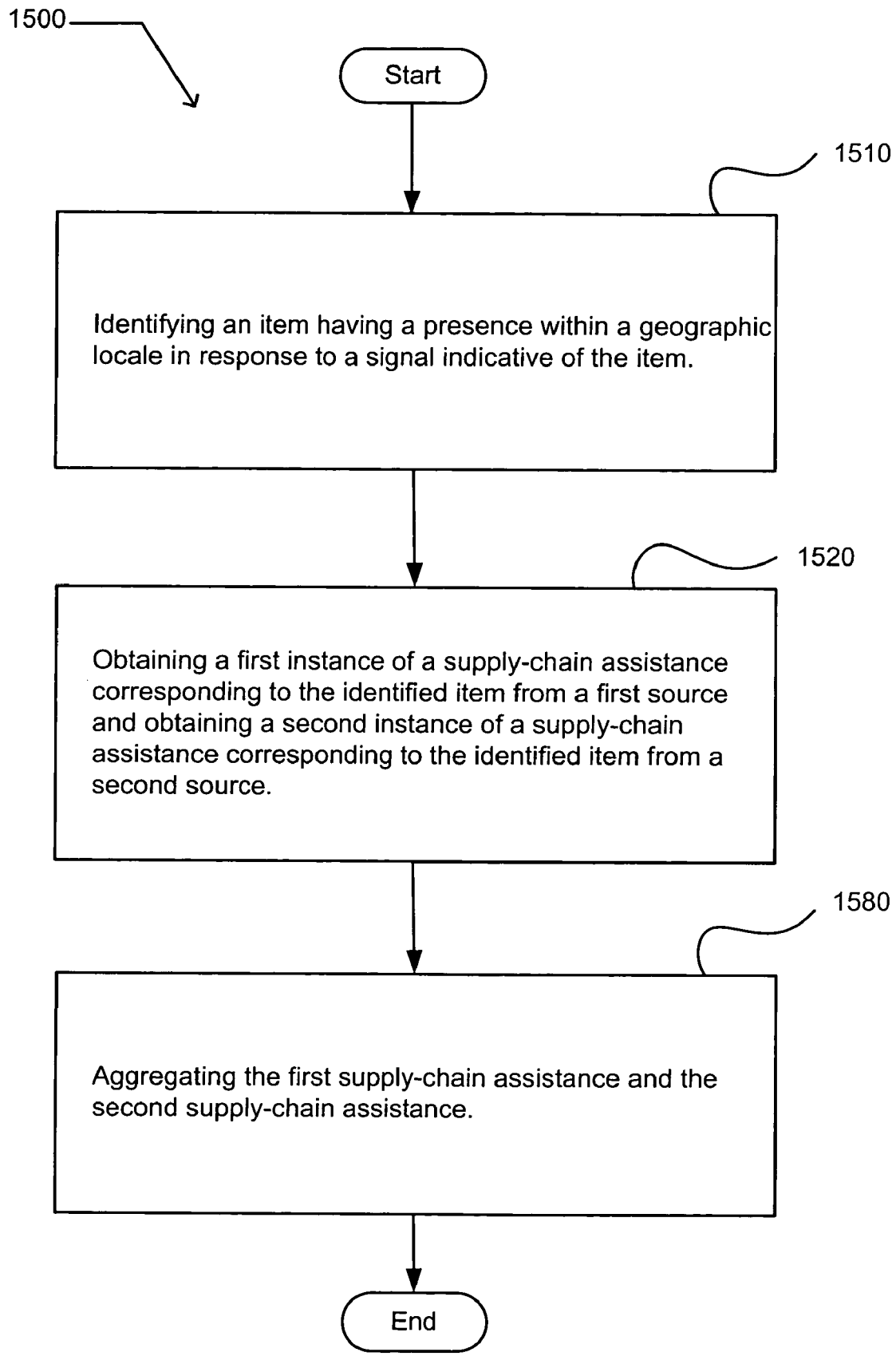
FIG. 39 illustrates an operational flow representing exemplary computer-implemented operations that obtain a supply-chain assistance corresponding to an item having a presence within a geographic locale.

FIG. 39 illustrates an operational flow 1500 representing exemplary computer-implemented operations that obtain a supply-chain assistance corresponding to an item having a presence within a geographic locale. In an embodiment, the geographic locale may include any environment in which one or more items in a supply chain may have a presence. In another embodiment, a geographic locale may include a bounded environment. In a further embodiment, a geographic locale may include an enclosed premises. For example and without limitation, in certain embodiments, a geographic locale may include a portion of a distribution center, a warehouse, a storeroom, a retail store, and/or a retail shelf. A geographic locale may be part of a premises or an entire premises. A geographic locale may be under control of one or more persons and/or entities, such as a manufacturer, an enterprise, a wholesaler, a distributor, a retailer, a business and/or an individual. In an embodiment, a geographic locale may include a transport operable to convey an item along a supply chain, such as a ship, a truck, a train, and/or an airplane.

In an embodiment, a supply-chain assistance may include any thing that may help, aid, support, and/or assist a supply-chain user. In an embodiment, a supply-chain user may be anyone directly or indirectly associated with a supply chain, such as the supply chain 12, in which an item, such as the item 14, is moving. In another embodiment, a supply-chain user may be anyone who might benefit from receiving supply-chain assistance corresponding to the item, such as a product manager whose responsibilities include retailing the item, or a manager of a store that will stock the item. In a further embodiment, a supply-chain user may include a person or entity involved in conveying or moving the item along a supply chain, such as a shipper.

After a start operation, the operational flow 1500 moves to a recognition operation 1510 where an item having a presence within a geographic locale is identified in response to a signal indicative of the item. The item may include an individual product, a case of a product, and/or a pallet of products. At a search operation 1520, a first instance of a supply-chain assistance corresponding to the identified item is obtained from a first source and a second instance of a supply-chain assistance corresponding to the identified item is obtained from a second source. At a combination operation 1580, the first supply-chain assistance and the second supply-chain assistance are aggregated. The operational flow 1500 then moves to an end operation.

Figure 40:
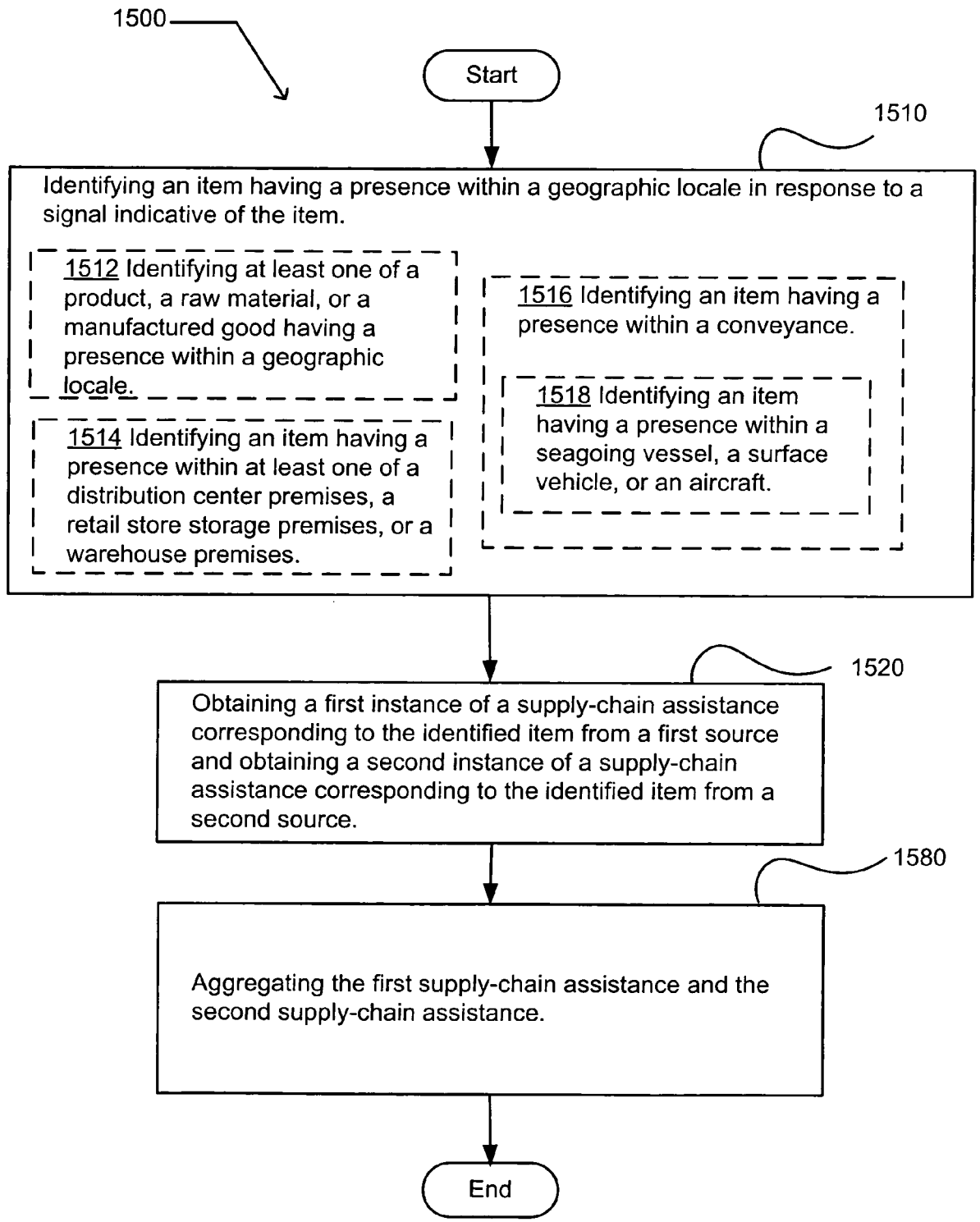
FIG. 40 illustrates an alternative embodiment of the exemplary operational flow of FIG. 39.

FIG. 40 illustrates an alternative embodiment of the exemplary operational flow 1500 of FIG. 39. The recognition operation 1510 may include one or more additional operations. Additional operations may include an operation 1512, an operation 1514, and an operation 1516. At the operation 1512, at least one of a product, a raw material, or a manufactured good is identified having a presence within a geographic locale. At the operation 1514, an item is identified having a presence within at least one of a distribution center premises, a retail store storage premises, or a warehouse premises. At the operation 1516, an item is identified having a presence within a conveyance. The operation 1516 may include at least one additional operation, such as an operation 1518. At the operation 1518, an item is identified having a presence within at least one of a seagoing vessel, a surface vehicle, or an aircraft.

Figure 41:
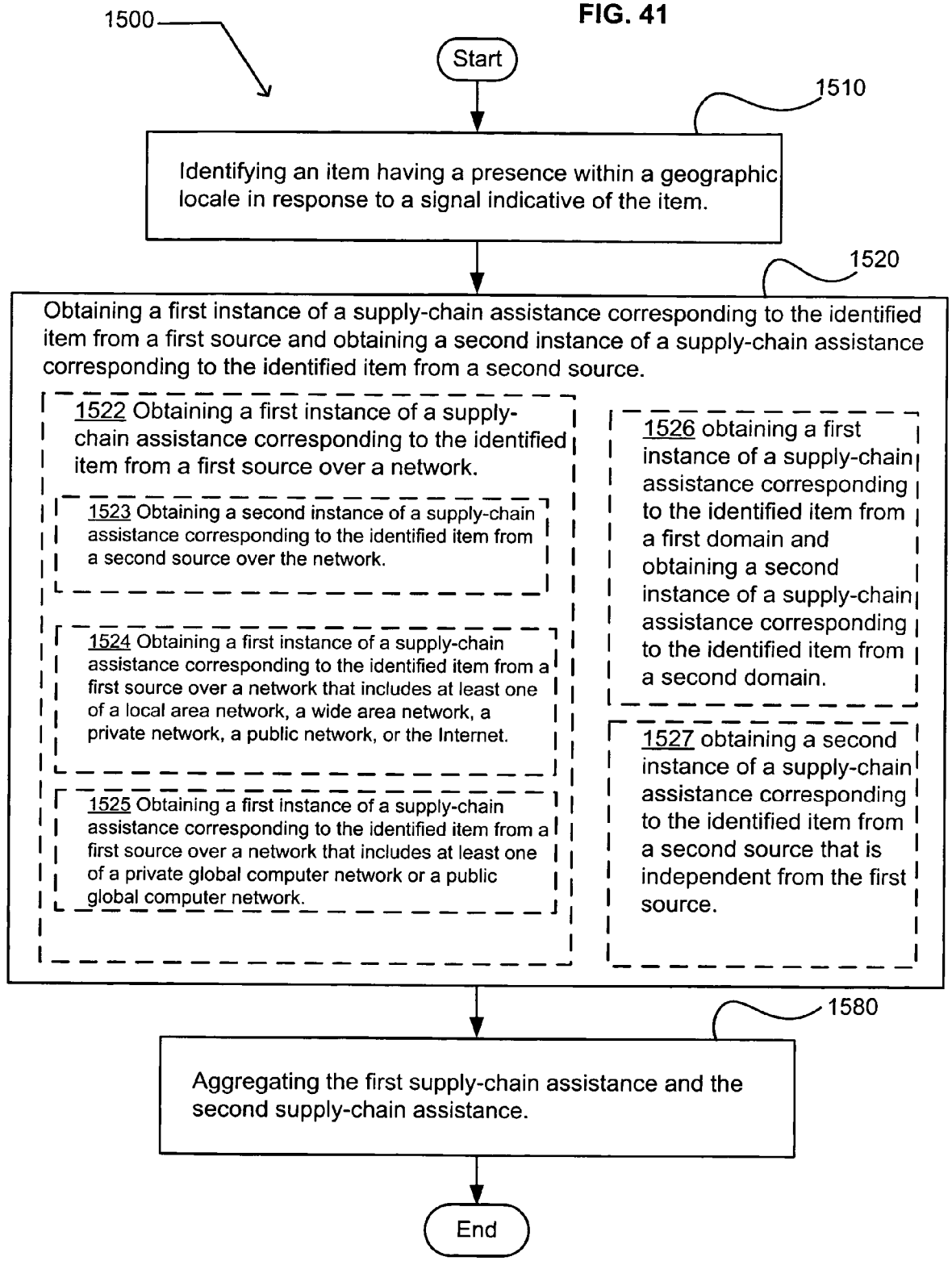
FIG. 41 illustrates an alternative embodiment of the exemplary operational flow of FIG. 39.

FIG. 41 illustrates an alternative embodiment of the exemplary operational flow 1500 of FIG. 39. The search operation 1520 may include one or more additional operations. Additional operations may include an operation 1522, an operation 1526, and an operation 1527. At the operation 1522, a first instance of a supply-chain assistance corresponding to the identified item is obtained from a first source over a network.

The operation 1522 may include one or more additional operations. Additional operations may include an operation 1523 an operation 1524, and an operation 1525. At the operation 1523, a second instance of a supply-chain assistance corresponding to the identified item is obtained from a second source over the network. At the operation 1524, a first instance of a supply-chain assistance corresponding to the identified item is obtained from a first source over a network that includes at least one of a local area network, a wide area network, a private network, a public network, or the Internet. In an alternative embodiment, a network may include a temporary network, a decentralized network, a self-assembling network, an ad hoc network, and/or a multi-hop network.

At the operation 1525, a first instance of a supply-chain assistance corresponding to the identified item is obtained from a first source over a network that includes at least one of a private global computer network or a public global computer network. At the operation 1526, a first instance of a supply-chain assistance corresponding to the identified item is obtained from a first domain and a second instance of a supply-chain assistance corresponding to the identified item is obtained from a second domain. At the operation 1527, a second instance of a supply-chain assistance corresponding to the identified item is obtained from a second source that is independent from the first source.

Figure 42:
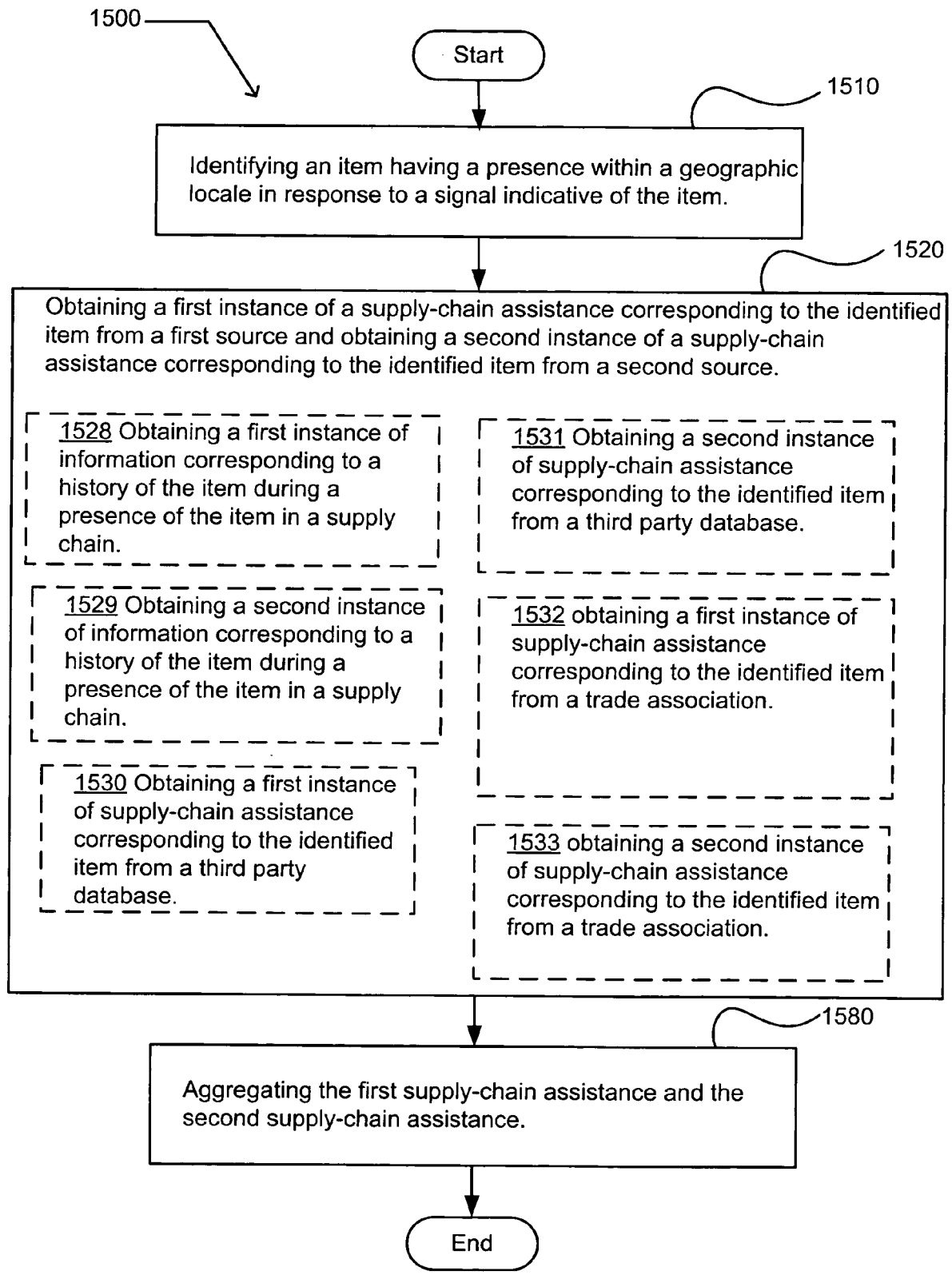
FIG. 42 illustrates a further alternative embodiment of the exemplary operational flow of FIG. 39.

FIG. 42 illustrates a further alternative embodiment of the exemplary operational flow 1500 of FIG. 39. The search operation 1520 may include one or more additional operations. Additional operations may include operations 1528 through 1533. At the operation 1528, a first instance of information is obtained corresponding to a history of the item during a presence of the item in a supply chain. At the operation 1529, a second instance of information corresponding to a history of the item during a presence of the item in a supply chain is obtained. At the operation 1530, a first instance of supply-chain assistance corresponding to the identified item is obtained from a third party database. At the operation 1531, a second instance of supply-chain assistance corresponding to the identified item is obtained from a third party database. At the operation 1532, a first instance of supply-chain assistance corresponding to the identified item is obtained from a trade association. At the operation 1533, a second instance of supply-chain assistance corresponding to the identified item is obtained from a trade association.

Figure 43:
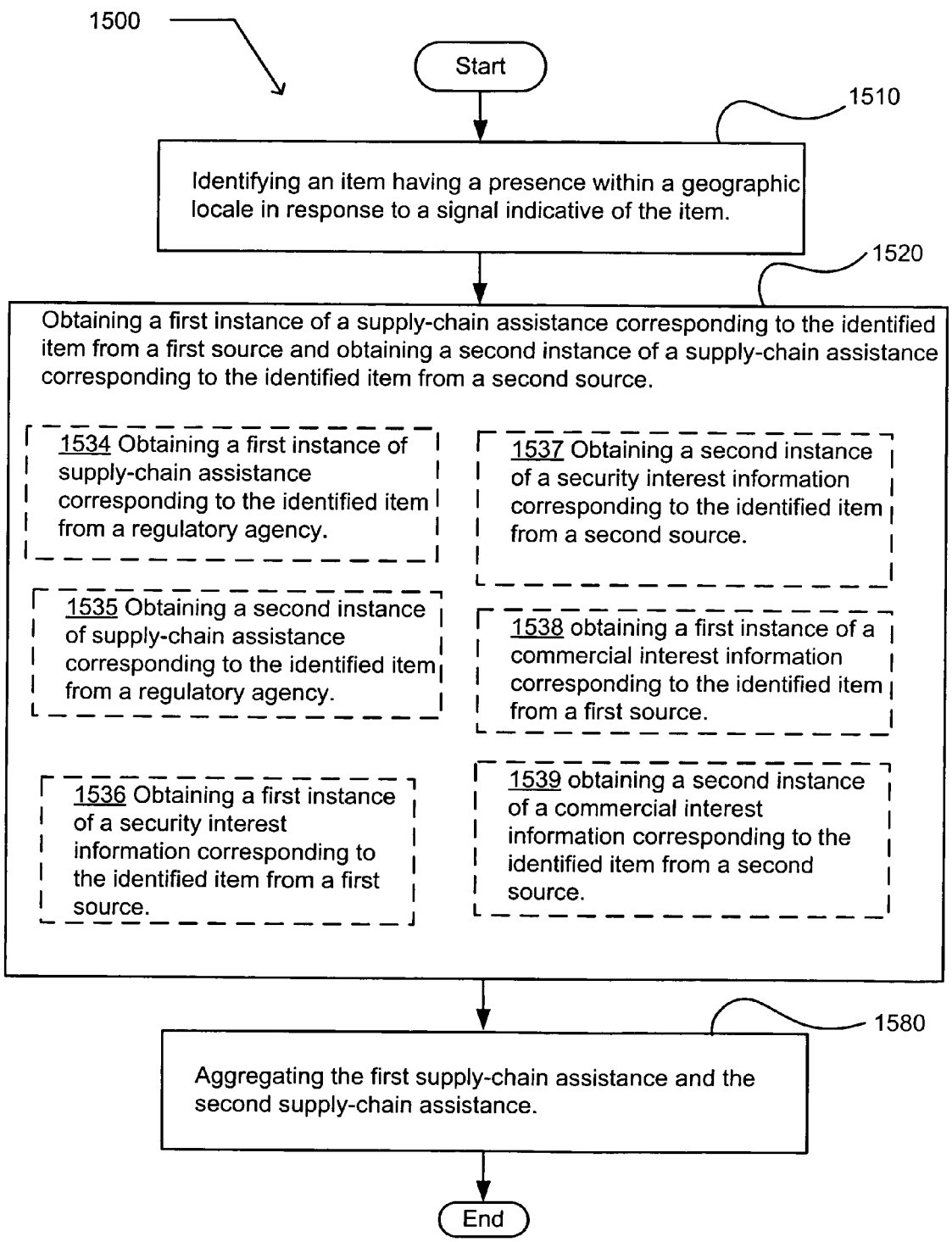
FIG. 43 illustrates an alternative embodiment of the exemplary operational flow of FIG. 39.

FIG. 43 illustrates a further alternative embodiment of the exemplary operational flow 1500 of FIG. 39. The search operation 1520 may include one or more additional operations. Additional operations may include operations 1534 through 1539. At the operation 1534, a first instance of supply-chain assistance corresponding to the identified item is obtained from a regulatory agency. At the operation 1535, a second instance of supply-chain assistance corresponding to the identified item is obtained from a regulatory agency. At the operation 1536, a first instance of a security interest information corresponding to the identified item is obtained from a first source. In an embodiment, a security interest may include an assignment of a security interest, a perfected security interest, or an unperfected security interest.

At the operation 1537, a second instance of a security interest information corresponding to the identified item is obtained from a second source. At the operation 1538, a first instance of a commercial interest information corresponding to the identified item is obtained from a first source. In an embodiment, a commercial interest information may include information related to a assignment of an interest in the item, a letter of credit, a letter-of-credit right, a guarantor's interest, an inventory financing agreement, or assignment of rights. At the operation 1539, a second instance of a commercial interest information corresponding to the identified item is obtained from a second source.

Figure 44:
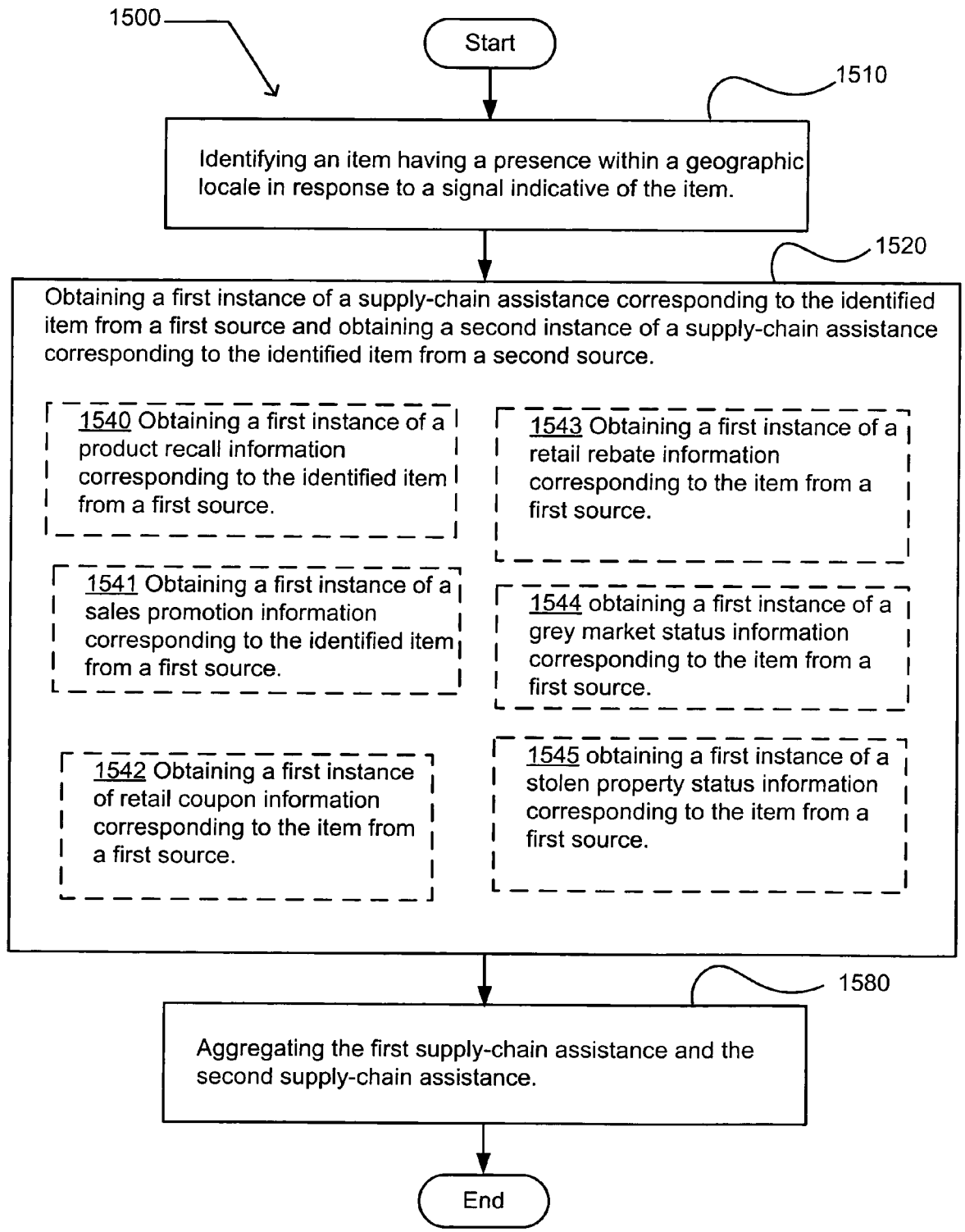
FIG. 44 illustrates another alternative embodiment of the exemplary operational flow of FIG. 39

FIG. 44 illustrates a further alternative embodiment of the exemplary operational flow 1500 of FIG. 39. The search operation 1520 may include one or more additional operations. Additional operations may include operations 1540 through 1545.

At the operation 1540, a first instance of a product recall information corresponding to the identified item is obtained from a first source. At the operation 1541, a first instance of a sales promotion information corresponding to the identified item is obtained from a first source. In an alternative embodiment, the sales promotion may include a manufacturer's sales promotion. At the operation 1542, a first instance of a retail coupon information corresponding the item is obtained from a first source. In an alternative embodiment, the retail coupon may include a manufacturer's retail coupon. At the operation 1543, a first instance of a retail rebate information corresponding to the item is obtained from a first source. In an alternative embodiment, the retail rebate for the item may include a manufacturer's retail rebate for the item. At the operation 1544, a first instance of a grey market status information corresponding to the item is obtained from a first source. At the operation 1545, a first instance of a stolen property status information corresponding to the item is obtained from a first source.

Figure 45:
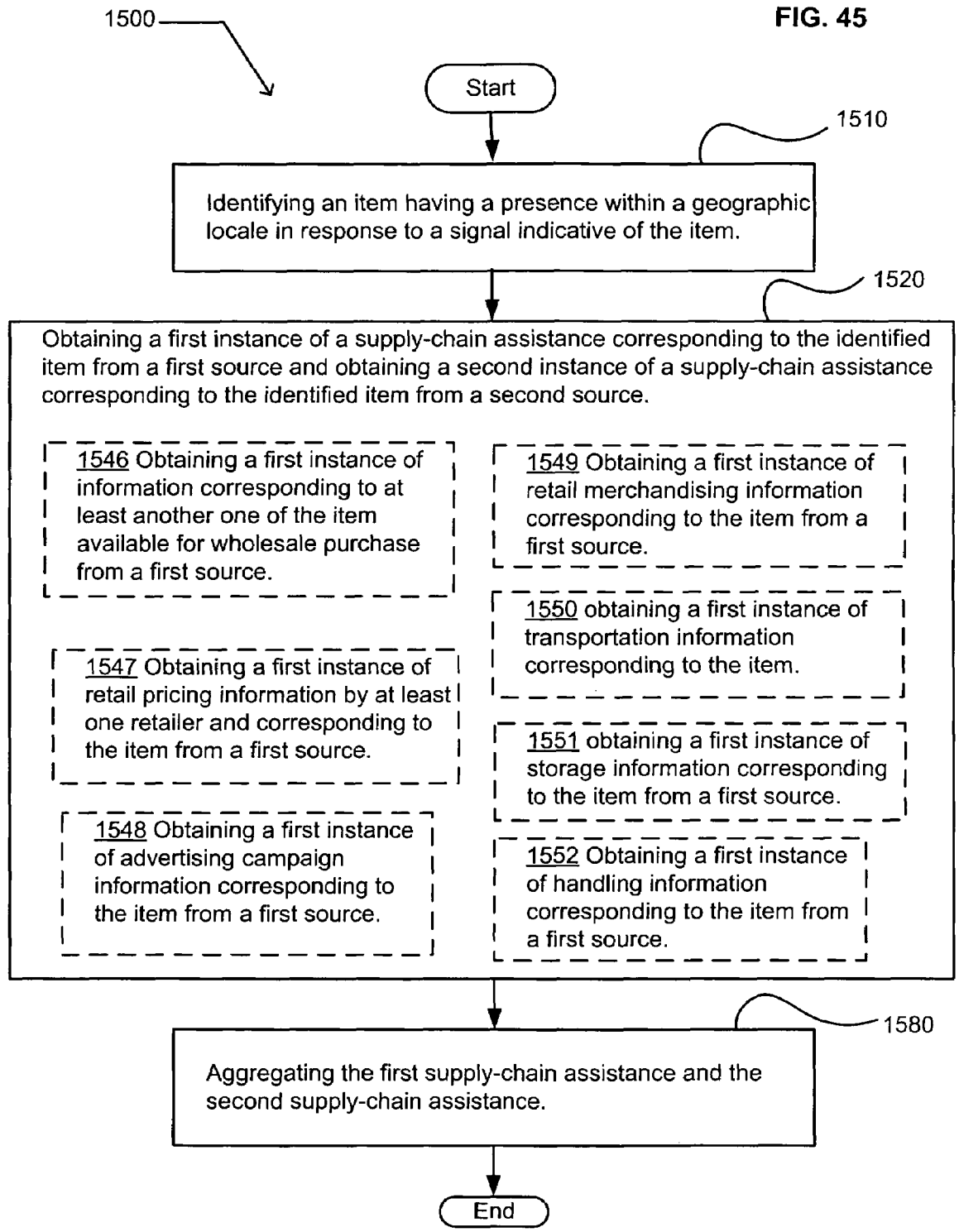
FIG. 45 illustrates a further alternative embodiment of the exemplary operational flow of FIG. 39.

FIG. 45 illustrates a further alternative embodiment of the exemplary operational flow 1500 of FIG. 39. The search operation 1520 may include one or more additional operations. Additional operations may include operations 1546 through 1552. At the operation 1546, a first instance of information corresponding to at least another one of the item available for wholesale purchase is obtained from a first source. For example, in an embodiment, the information may correspond to quantities of the item stored in another distribution warehouse and available for wholesale purchase by management of a geographic locale, such as the distribution warehouse in which the item is present and identified. This assistance provides the management of the warehouse an option to cover shortages of an item in their distribution warehouse by purchasing additional stock from another distribution warehouse. At the operation 1547, a first instance of retail pricing information by at least one retailer and corresponding to the item is obtained from a first source. For example, in an embodiment, management of a storeroom may receive assistance in a form of at least one retail price being charged by another retailer for the item having a presence within the storeroom. At the operation 1548, a first instance of advertising campaign information corresponding to the item is obtained from a first source. The advertising campaign related to the item may include a current, and/or future advertising campaign. The information may be received over the global computer network from a home office, another retailer, a wholesaler, and/or a third party.

At the operation 1549, a first instance of retail merchandising information corresponding to the item is obtained from a first source. In an embodiment, the retail merchandising for the item includes a shelf and/or aisle location within a store, a suggestion for displaying, and/or a suggestion for attracting shopper attention. At the operation 1550, a first instance of transportation information corresponding to the item is obtained from a first source. In an embodiment, information corresponding to transporting may include appropriate climate control information, vibration and shock limitation information, and/or hazardous material classification. At the operation 1551, a first instance of storage information corresponding to the item is obtained from a first source. In an embodiment, a storage information may include a warehouse-storage information, a conveyance-storage information, or a retail-space storage information. For example, a conveyance-storage information may include information corresponding to limitations on temperature or vibration. By way of further example, a retail-space-storage information may include co-location of the item within another item in a retail display. At the operation 1552, a first instance of handling information corresponding to the item is obtained from a first source.

Figure 46:
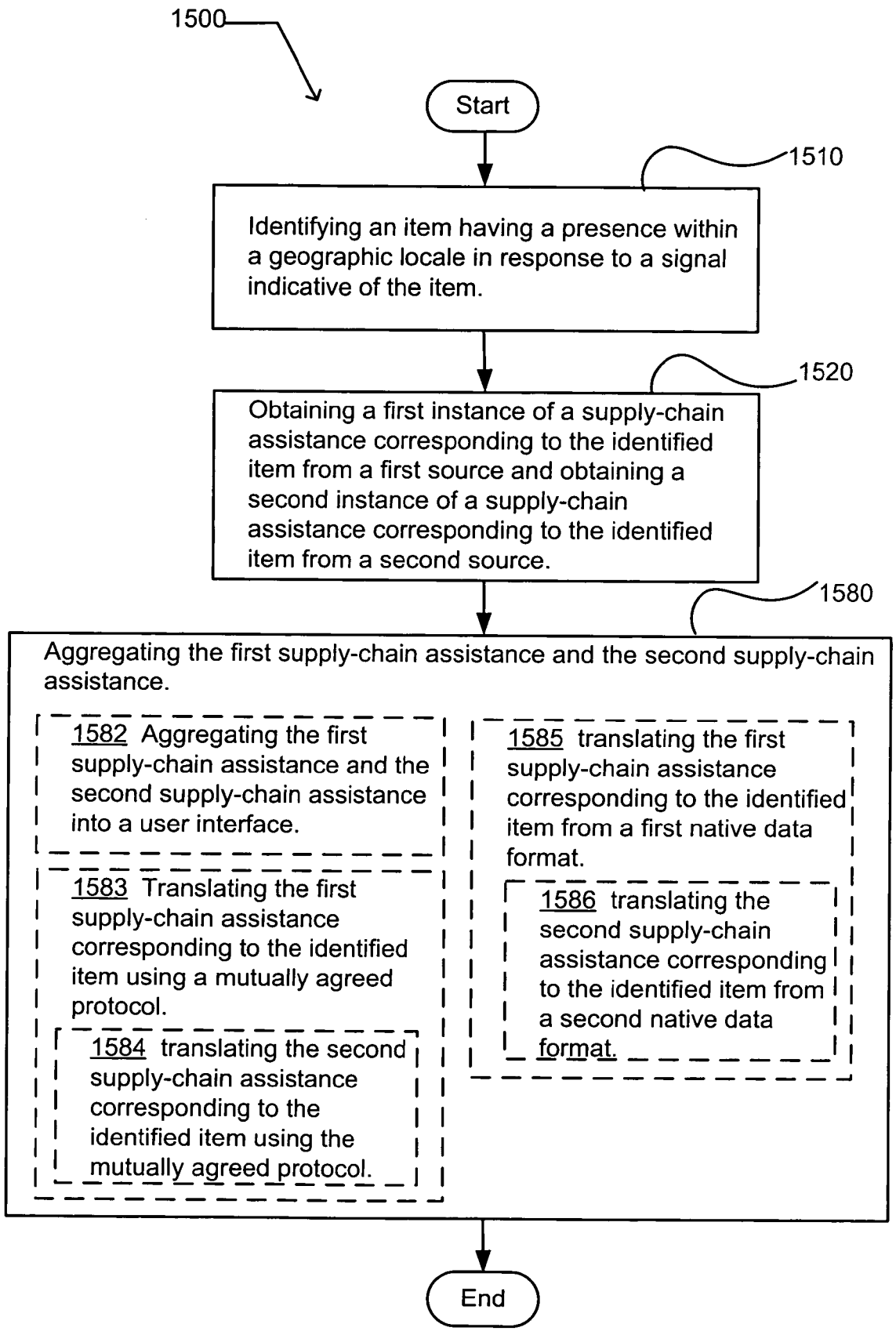
FIG. 46 illustrates an alternative embodiment of the exemplary operational flow of FIG. 39.

FIG. 46 illustrates a further alternative embodiment of the exemplary operational flow 1500 of FIG. 39. The combination operation 1580 may include one or more additional operations. Additional operations may include operations 1582 through 1586. At the operation 1582, the first supply-chain assistance and the second supply-chain assistance is aggregated into a user interface. At the operation 1583, the first supply-chain assistance corresponding to the identified item is translated using a mutually agreed protocol. The operation 1583 may include additional operations, such as an operation 1584. At the operation 1584, the second supply-chain assistance corresponding to the identified item is translated using the mutually agreed protocol. At the operation 1585, the first supply-chain assistance corresponding to the identified item is translated from a first native data format. The operation 1585 may include additional operations, such as an operation 1586. At the operation 1586, the second supply-chain assistance corresponding to the identified item is translated from a second native data format.

Figure 47:
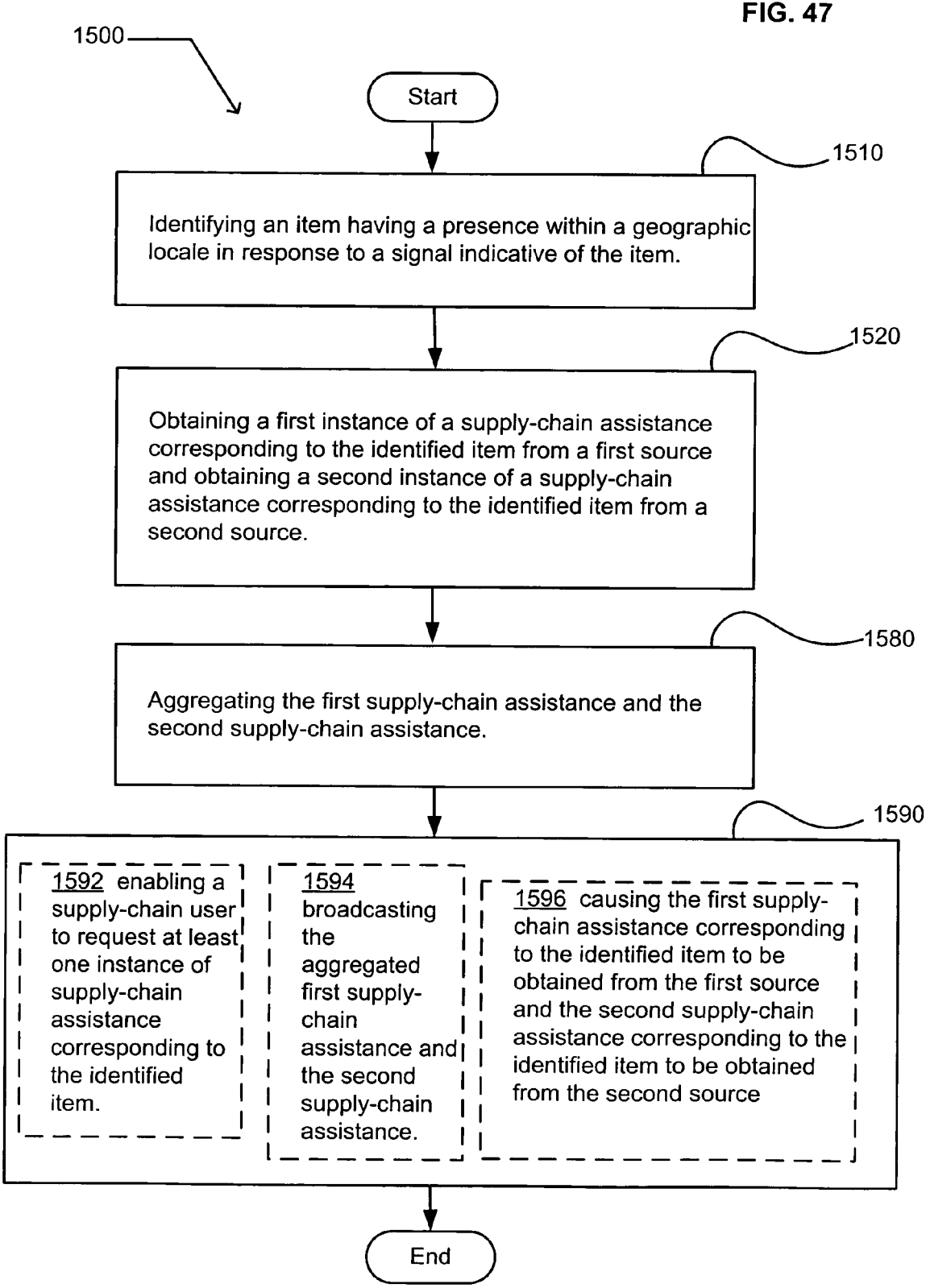
FIG. 47 illustrates another alternative embodiment of the exemplary operational flow of FIG. 39.

FIG. 47 illustrates another alternative embodiment of the exemplary operational flow 1500 of FIG. 39. The operational flow 1500 may include one or more additional operations, illustrated as additional operations 1590. Additional operations 1590 may include an operation 1592, an operation 1594, and an operation 1596. At the operation 1592, a supply-chain user is enabled to request at least one instance of supply-chain assistance corresponding to the identified item. At the operation 1594, the aggregated first supply-chain assistance and the second supply-chain assistance are broadcast. At the operation 1596, the first supply-chain assistance corresponding to the identified item is caused to be obtained from the first source and the second supply-chain assistance corresponding to the identified item is caused to be obtained from the second source.

Figure 48:
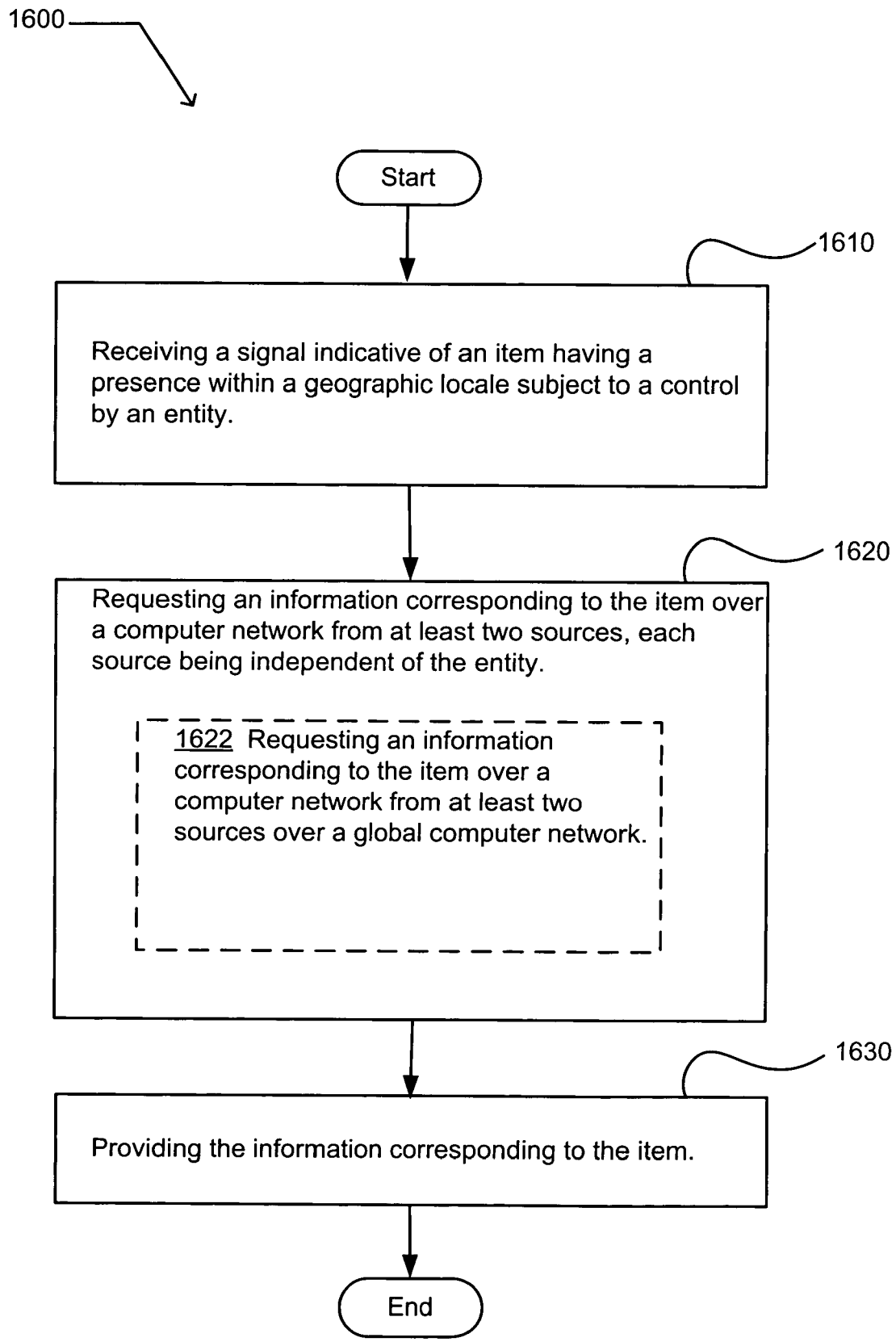
FIG. 48 illustrates an operational flow representing exemplary computer-implemented operations.

FIG. 48 illustrates an operational flow 1600 representing exemplary computer-implemented operations. After a start operation, the operational flow 1600 moves to a reception operation 1610. At the reception operation 1610, a signal is received indicative of an item having a presence within a geographic locale subject to a control by an entity. In an embodiment, a geographic locale may be subject to a control by at least one of an owner of the geographic locale, a tenant of the geographic locale, or an occupier of the geographic locale. At a search operation 1620, an information is requested corresponding to the item over a computer network from at least two sources, each source being independent of the entity. The search operation 1620 may include one or more additional operations, such as an operation 1622. At the operation 1622, an information corresponding to the item over a computer network is requested from at least two sources over a global computer network. At a broadcast operation 1630, the information corresponding to the item is provided. The operational flow 1600 then moves to an end operation.

Figure 49:
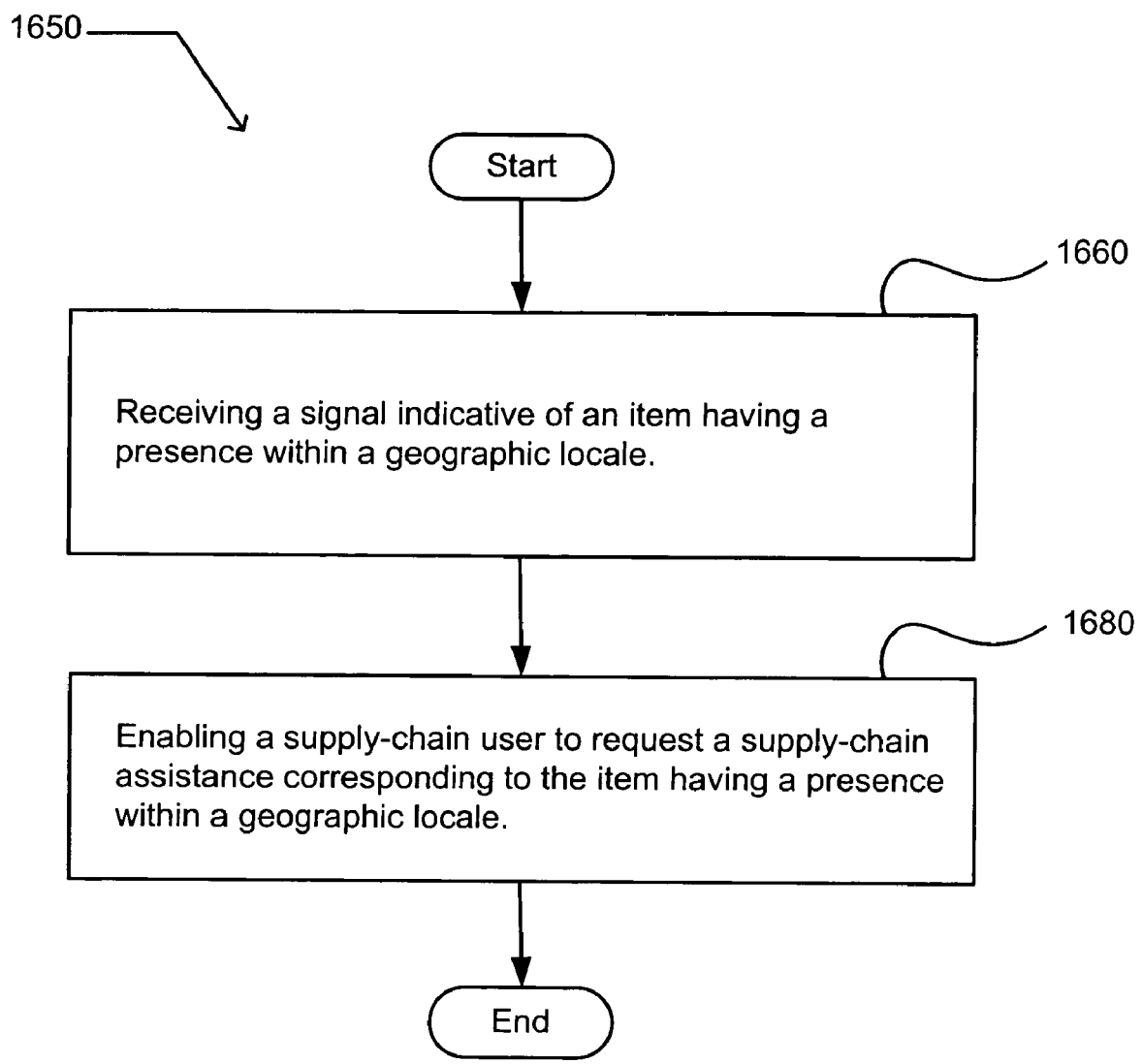
FIG. 49 illustrates an operational flow representing exemplary computer-implemented operations.

FIG. 49 illustrates an operational flow 1650 representing exemplary computer-implemented operations. After a start operation, the operational flow 1650 moves to a reception operation 1660. At the reception operation 1660, a signal indicative of an item having a presence within a geographic locale is received. At a user selection operation 1680, a supply-chain user is enabled to request a supply-chain assistance corresponding to the item having a presence within a geographic locale. In an embodiment, a supply-chain user may be anyone associated with a supply chain in which the item is moving. In another embodiment, a supply-chain user may be anyone who might benefit from receiving supply-chain assistance corresponding to the item, such as a product manager whose responsibilities include retailing the item, or a manager of a store that will stock the item. The operational flow 1650 then moves to an end operation.

Figure 50:
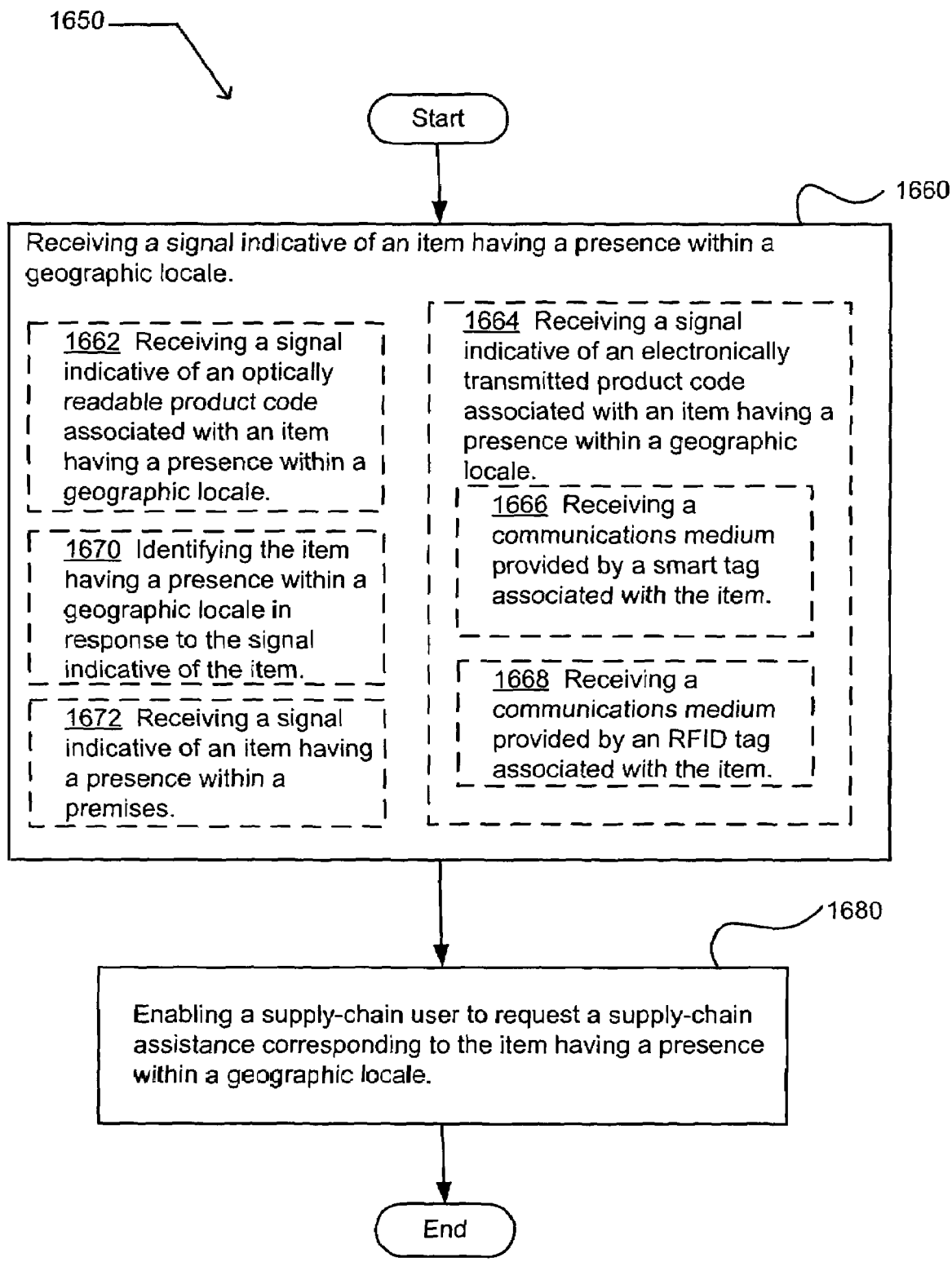
FIG. 50 illustrates another embodiment of the exemplary operational flow of FIG. 49.

FIG. 50 illustrates another embodiment of the exemplary operational flow 1600 of FIG. 49. The reception operation of 1660 may include additional operations.

The additional operations may include an operation 1662, an operation 1664, an operation 1670, and an operation 1672. At the operation 1662, a signal is received indicative of an optically readable product code associated with an item having a presence within a geographic locale. In an embodiment, the optically readable product code may include a bar code, and the bar code may be indicative of an EPC. At the operation 1664, a signal is received indicative of an electronically transmitted product code associated with an item having a presence within a geographic locale. In an embodiment, the electronically transmitted product code associated with the item may include an EPC transmitted by an RFID device associated with the item, such as an RFID tag affixed to the item.

In an embodiment, the operation 1664 may include additional operations, such as an operation 1666, and an operation 1668. At the operation 1666, a communications medium provided by a smart tag associated with the item is received. At the operation 1668, a radio frequency identification provided by an RFID tag 30 associated with the item is received. At the operation 1670, the item having a presence within a geographic locale is identified in response to the signal indicative of the item. At the operation 1672, a signal indicative of an item having a presence within a premises is received.

Figure 51:
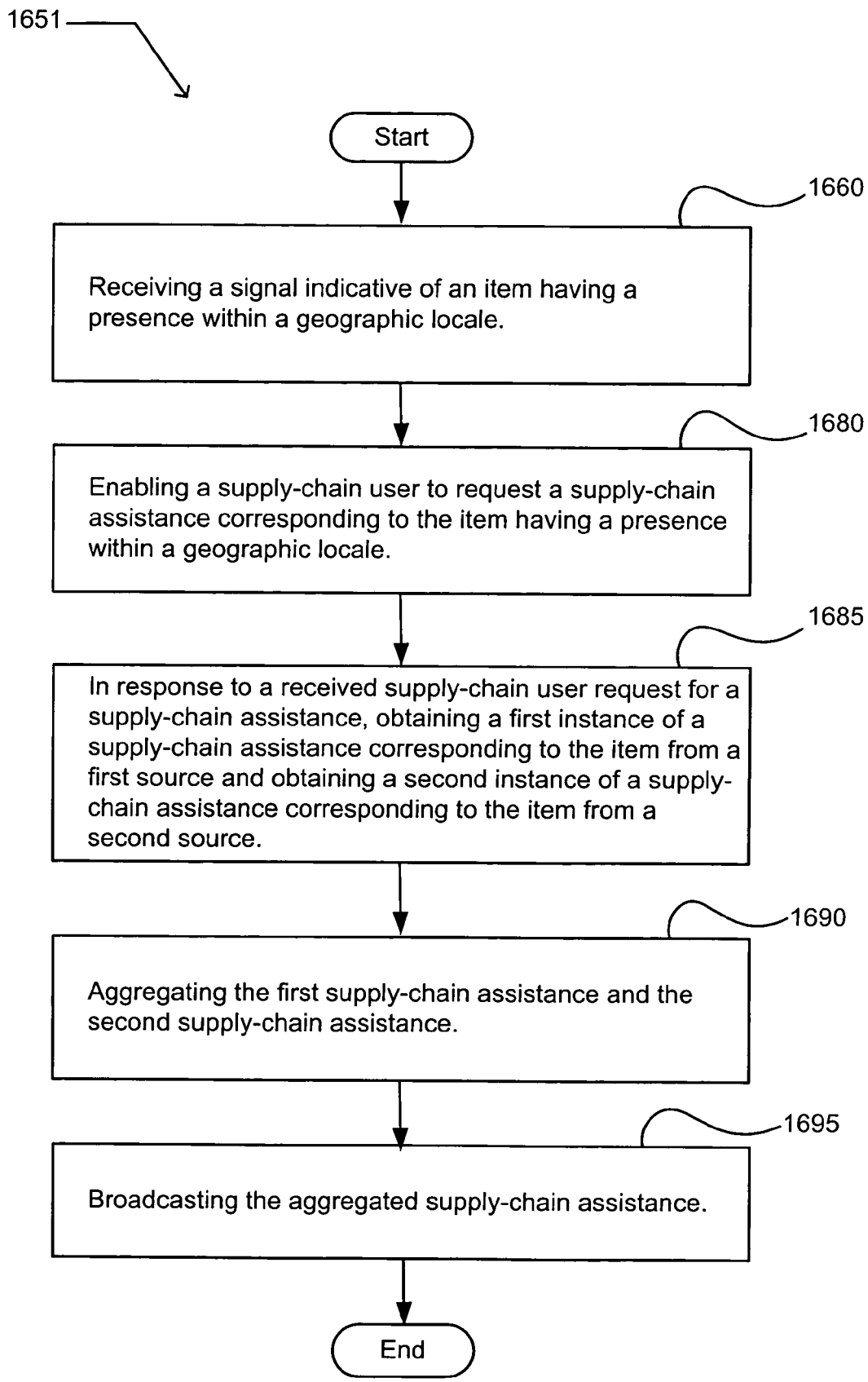
FIG. 51 illustrates an operational flow representing exemplary computer-implemented operations that obtain a supply-chain assistance corresponding to an item having a presence within a geographic locale.

FIG. 51 illustrates an operational flow 1651 representing exemplary computer-implemented operations that obtain a supply-chain assistance corresponding to an item having a presence within a geographic locale. After a start operation, the operational flow 1650 moves to a reception operation 1660. At the reception operation 1660, a signal indicative of an item having a presence within a geographic locale is received. At a user selection operation 1680, a supply-chain user is enabled to request a supply-chain assistance corresponding to the item having a presence within a geographic locale. At a search operation 1685, in response to a received supply-chain user request for a supply-chain assistance, a first instance of a supply-chain assistance corresponding to the item is obtained from a first source and obtaining a second instance of a supply-chain assistance corresponding to the item is obtained from a second source. At a combination operation 1690, the first supply-chain assistance and the second supply-chain assistance are aggregated. At a broadcast operation 1695, the aggregated supply-chain assistance is provided. The operational flow 1651 then moves to an end operation.

FIG. 52 illustrates a partial view of an exemplary computer program product 1700 that includes a computer program 1704 for executing a computer process on a computing device. In an embodiment, the exemplary computer program product 1700 may be provided using a computer-readable medium 1702 and includes computer-readable instructions.

The computer product 1700 encodes the computer program 1704 for executing on a computing device a computer process that includes identifying an item having a presence within a geographic locale in response to a signal indicative of the item. The process includes obtaining a first instance of a supply-chain assistance corresponding to the identified item from a first source and obtaining a second instance of a supply-chain assistance corresponding to the identified item from a second source. The process further includes aggregating the first supply-chain assistance and the second supply-chain assistance. In an alternative embodiment, the computer program product 1704 may include additional processes, such as the process 1706 and as the process 1708. At the process 1706, the obtaining a first instance of a supply-chain assistance corresponding to the identified item from a first source includes obtaining a first instance of a supply-chain assistance corresponding to the identified item from a network. At the process 1708, the obtaining a second instance of a supply-chain assistance corresponding to the identified item from a second source includes obtaining a second instance of a supply-chain assistance corresponding to the identified item from the network. The computer-readable medium 1702 may include a computer storage medium, which may be carried by a computer-readable carrier (not shown). The computer-readable medium 1702 may include a communications medium (not shown).

FIG. 53 illustrates an environment 1720 in which embodiments of an exemplary system 1721 may be implemented. The system 1721 includes a computing system environment that includes a computing device, illustrated as the computing device 110 of FIG. 1. The environment 1720 also includes the sensor 420 operable to generate a signal (not shown) indicative of the item 430 having a presence within the geographic locale 410. The computing device 110 includes a storage medium 612. The computing device is operable to receive a signal indicative of an item having a presence within a geographic locale through a coupling 605 between the sensor 420 and the computing device 110, and to access a network. The storage medium 612 may be any computer storage media.

The system 1721 further includes computer executable instructions 1730 that when executed on the computing device 110 causes the computing device to identify an item having a presence within a geographic locale in response to the signal indicative of the item. Also to obtain a first instance of a supply-chain assistance corresponding to the identified item from a first source and obtain a second instance of a supply-chain assistance corresponding to the identified item from a second source. The instructions further cause the computing device to aggregate the first supply-chain assistance and the second supply-chain assistance. In an alternative embodiment, the instructions 1730 may cause the computing device to perform additional operations, such as an operation 1732, and an operation 1734. At the operation 1732, the obtaining a first instance of a supply-chain assistance corresponding to the identified item from a first source includes obtaining a first instance of a supply-chain assistance corresponding to the identified item from a first source over the network. At the operation 1734, the obtaining a second instance of a supply-chain assistance corresponding to the identified item from a second source includes obtaining a second instance of a supply-chain assistance corresponding to the identified item from a second source over the network.

Figure 54:
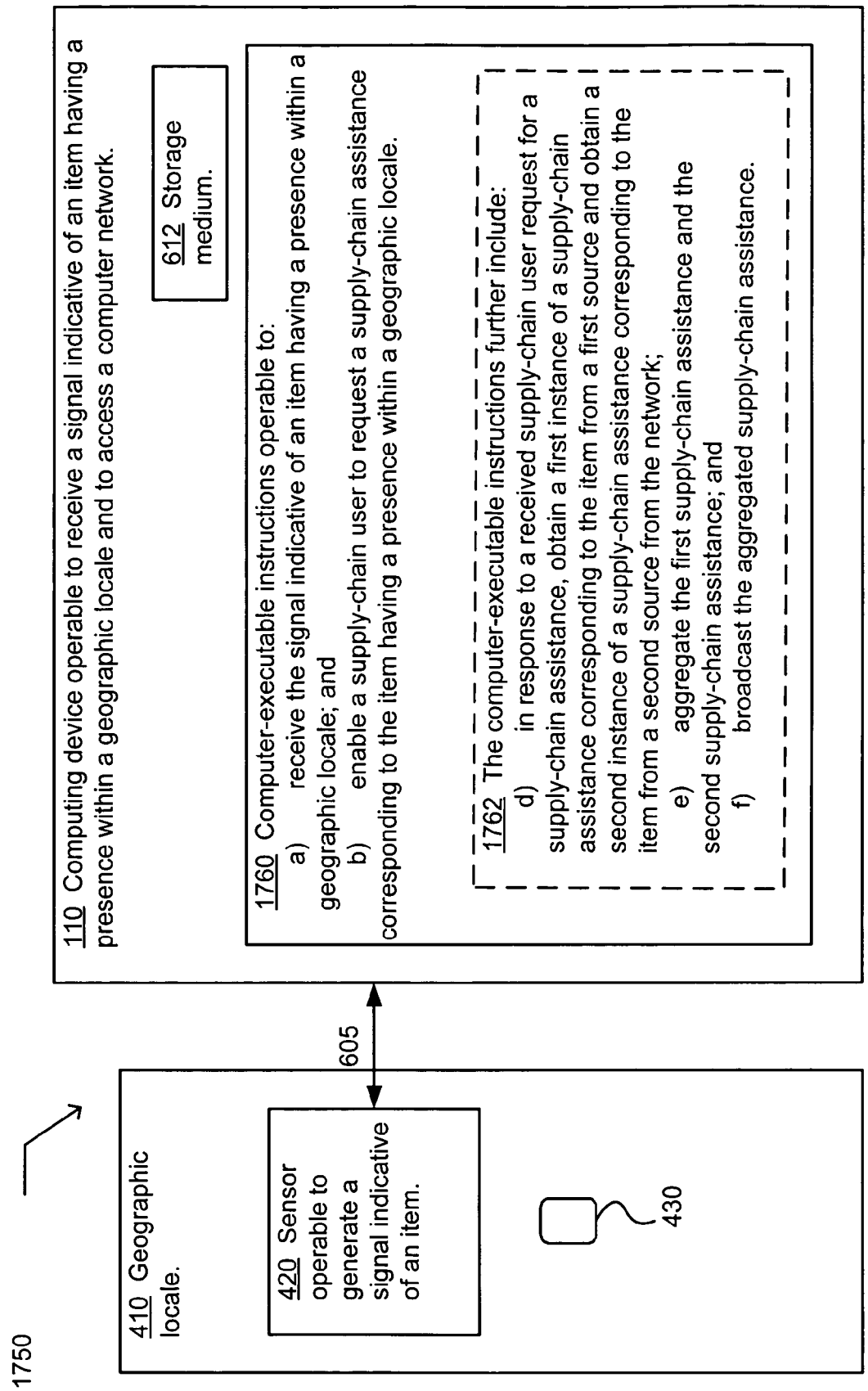
FIG. 54 illustrates an exemplary system in which embodiments may be implemented.

FIG. 54 illustrates an exemplary system 1750 in which embodiments may be implemented. The system 1750 includes a computing system environment that includes a computing device, illustrated as the computing device 110 of FIG. 1. The system 1750 also includes the sensor 420 operable to generate a signal (not shown) indicative of the item 430 having a presence within the geographic locale 410. The computing device 110 includes a storage medium 612, which may be any computer storage media. The computing device 110 includes an operability to receive the signal indicative of an item through a coupling 605 between the sensor 420 and the computing device 110, and to access a computer network.

The system 1750 further includes computer executable instructions 1760 that when executed on the computing device 110 causes the computing device to receive a signal indicative of an item having a presence within a geographic locale, and to enable a supply-chain user to request a supply-chain assistance corresponding to the item having a presence within a geographic locale. The computer executable instructions 1760 may include at least one additional operation, such as an operation 1762. At the operation 1762, the instructions further include, in response to a received supply-chain user request for a supply-chain assistance, to obtain a first instance of a supply-chain assistance corresponding to the item from a first source and obtain a second instance of a supply-chain assistance corresponding to the item from a second source from the network. The instructions also further include to aggregate the first supply-chain assistance and the second supply-chain assistance, and broadcast the aggregated supply-chain assistance.

Figure 55:
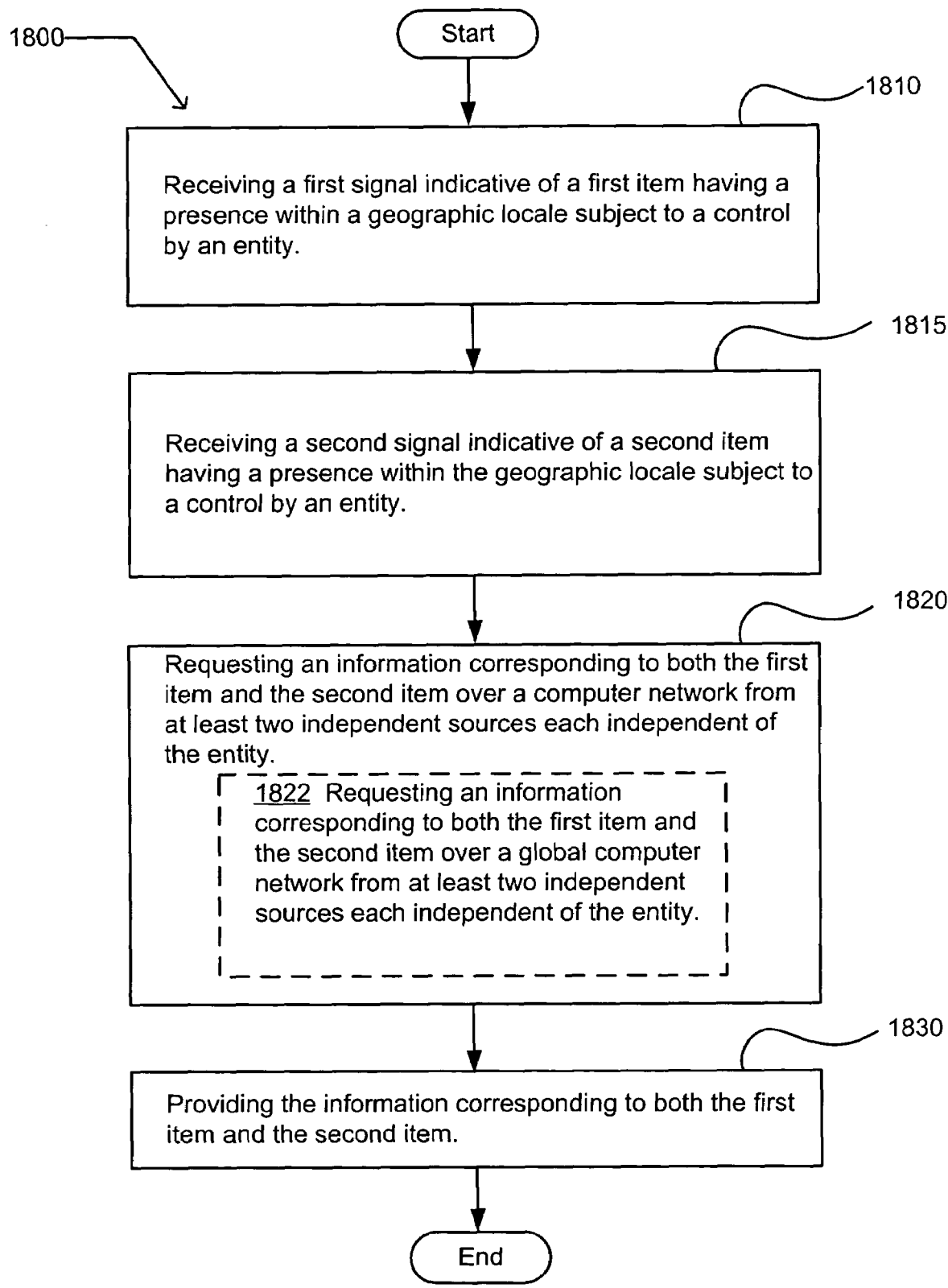
FIG. 55 illustrates an operational flow representing exemplary computer-implemented operations.

FIG. 55 illustrates an operational flow 1800 representing exemplary computer-implemented operations. After a start operation, the operational flow 1800 moves to a reception operation 1810. At the first reception operation 1810, a first signal is received indicative of a first item having a presence within a geographic locale subject to a control by an entity. At the second reception operation 1815, a second signal is received indicative of a second item having a presence within the geographic locale subject to a control by an entity. At a search operation 1820, an information corresponding to both the first item and the second item is requested over a computer network from at least two sources each independent of the entity. In an alternative embodiment, the search operation 1820 may include one or more additional operations, such as an operation 1822. At the operation 1822, an information corresponding to both the first item and the second item is requested over a global computer network from at least two sources each independent of the entity. At a broadcast operation 1830, the information is provided. The operational flow 1800 then moves to an end operation.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

What is claimed is:

1. A computer-implemented method comprising:
   a) receiving a signal indicative of an item and generated directly in response to the item having a presence within a geographical locale;
   b) identifying the item having a presence within the geographic locale in response to the signal indicative of the item;
   c) in direct response to the identifying the item, obtaining a first supply-chain assistance corresponding to the identified item from a first source and obtaining a second supply-chain assistance corresponding to the identified item from a second source; and d) aggregating the first supply-chain assistance and the second supply-chain assistance.

2. The method of claim 1, wherein the identifying the item having a presence within the geographic locale includes
identifying at least one of a product, a raw material, or a manufactured good having a presence within the geographic locale.

3. The method of claim 1, wherein the identifying the item having a presence within the geographic locale includes
identifying the item having a presence within at least one of a distribution center premises, a retail store storage premises, or a warehouse premises.

4. The method of claim 1, wherein the identifying the item having a presence within the geographic locale includes
identifying the item having a presence within a conveyance.

5. The method of claim 1, wherein the obtaining a first supply-chain assistance corresponding to the identified item from a first source includes
obtaining a first supply-chain assistance corresponding to the identified item from a first source over a network.

6. The method of claim 5, wherein the obtaining a second supply-chain assistance corresponding to the identified item from a second source includes
obtaining a second supply-chain assistance corresponding to the identified item from a second source over the network.

7. The method of claim 5, wherein the obtaining a first supply-chain assistance corresponding to the identified item from a first source over a network includes
obtaining a first supply-chain assistance corresponding to the identified item from a first source over a network that includes at least one of a local area network, a wide area network, a private network, a public network, or the Internet.

8. The method of claim 5, wherein the obtaining a first supply-chain assistance corresponding to the identified item from a first source over a network includes
obtaining a first supply-chain assistance corresponding to the identified item from a first source over a network that includes at least one of a private global computer network or a public global computer network.

9. The method of claim 1, wherein the obtaining a first supply-chain assistance corresponding to the identified item from a first source and a second supply-chain assistance corresponding to the identified item from a second source includes
obtaining a first supply-chain assistance corresponding to the identified item from a first domain and obtaining a second supply-chain assistance corresponding to the identified item from a second domain.

10. The method of claim 1, wherein the obtaining a second supply-chain assistance corresponding to the identified item from a second source includes
obtaining a second supply-chain assistance corresponding to the identified item from a second source that is independent from the first source.

11. The method of claim 1, wherein the obtaining a first supply-chain assistance corresponding to the identified item from a first source includes
obtaining a first information corresponding to a history of the item during a presence of the item in a supply chain.

12. The method of claim 1, wherein the obtaining a second supply-chain assistance corresponding to the identified item from a second source includes
obtaining a second information corresponding to a history of the item during a presence of the item in a supply chain.

13. The method of claim 1, wherein the obtaining a first supply-chain assistance corresponding to the identified item from a first source includes
obtaining a first supply-chain assistance corresponding to the identified item from a third party database.

14. The method of claim 1, wherein the obtaining a second supply-chain assistance corresponding to the identified item from a second source includes
obtaining a second supply-chain assistance corresponding to the identified item from a third party database.

15. The method of claim 1, wherein the obtaining a first supply-chain assistance corresponding to the identified item from a first source includes
obtaining a first supply-chain assistance corresponding to the identified item from a trade association.

16. The method of claim 1, wherein the obtaining a second supply-chain assistance corresponding to the identified item from a second source includes
obtaining a second supply-chain assistance corresponding to the identified item from a trade association.

17. The method of claim 1, wherein the obtaining a first supply-chain assistance corresponding to the identified item from a first source includes
obtaining a first supply-chain assistance corresponding to the identified item from a regulatory agency.

18. The method of claim 1, wherein the obtaining a second supply-chain assistance corresponding to the identified item from a second source includes
obtaining a second supply-chain assistance corresponding to the identified item from a regulatory agency.

19. The method of claim 1, wherein the obtaining a first supply-chain assistance corresponding to the identified item from a first source includes
obtaining a first security interest information corresponding to the identified item from a first source.

20. The method of claim 1, wherein the obtaining a second supply-chain assistance corresponding to the identified item from a second source includes
obtaining a second security interest information corresponding to the identified item from a second source.

21. The method of claim 1, wherein the obtaining a first supply-chain assistance corresponding to the identified item from a first source includes
obtaining a first commercial interest information corresponding to the identified item from a first source.

22. The method of claim 1, wherein the obtaining a second supply-chain assistance corresponding to the identified item from a second source includes
obtaining a second commercial interest information corresponding to the identified item from a second source.

23. The method of claim 1, wherein the obtaining a first supply-chain assistance corresponding to the identified item from a first source includes
obtaining a first stolen property status information corresponding to the item from a first source.

24. The method of claim 1, wherein the obtaining a first supply-chain assistance corresponding to the identified item from a first source includes obtaining a first storage information corresponding to the item from a first source.

25. The method of claim 1, wherein the aggregating the first supply-chain assistance and the second supply-chain assistance includes
aggregating the first supply-chain assistance and the second supply-chain assistance into a user interface.

26. The method of claim 1, wherein the aggregating the first supply-chain assistance and the second supply-chain assistance includes
　　translating the first supply-chain assistance corresponding to the identified item using a mutually agreed protocol.

27. The method of claim 1, wherein the aggregating the first supply-chain assistance and the second supply-chain assistance includes
　　translating the first supply-chain assistance corresponding to the identified item from a first native data format.

28. The method of claim 1, further comprising:
　　e) enabling a supply-chain user to request at least one supply-chain assistance corresponding to the identified item.

29. The method of claim 1, further comprising:
　　e) broadcasting the aggregated first supply-chain assistance and the second supply-chain assistance.

30. The method of claim 1, further comprising:
　　e) causing the first supply-chain assistance corresponding to the identified item to be obtained from the first source and the second supply-chain assistance corresponding to the identified item to be obtained from the second source.

31. A computer-implemented method comprising:
　　a) receiving a signal indicative of an item and machine generated directly in response to the item having a presence within a geographic locale; and
　　b) identifying the item having a presence within the geographic locale in response to the signal indicative of the item; and
　　c) enabling a supply-chain user to request a supply-chain assistance corresponding to the identified item having a presence within a geographic locale
　　d) in response to receiving a user request for a supply-chain assistance corresponding to the item having a presence within a geographic locale, obtaining a first supply-chain assistance corresponding to the item from a first source and obtaining a second supply-chain assistance corresponding to the item from a second source;
　　e) aggregating the first supply-chain assistance and the second supply-chain assistance; and
　　f) broadcasting the aggregated supply-chain assistance.

32. The method of claim 31, wherein the receiving a signal indicative of an item and machine generated directly in response to the item having a presence within a geographic locale includes
　　receiving a signal indicative of an optically readable product code associated with an item and machine generated directly in response to the item having a presence within a geographic locale.

33. The method of claim 31, wherein the receiving a signal indicative of an item and machine generated directly in response to the item having a presence within a geographic locale includes
　　receiving a signal indicative of an electronically transmitted product code associated with an item and machine generated directly in response to the item having a presence within a geographic locale.

34. The method of claim 31, wherein the receiving a signal indicative of an item and machine generated directly in response to the item having a presence within a geographic locale includes
　　receiving a signal indicative of an item and machine generated directly in response to the item having a presence within a premises.

35. A system comprising:
　　a) a computing device operable to receive signals indicative of identifying information of items; and
　　b) instructions that when executed on the computing device cause the computing device to:
　　　　(i) identify an item having present within a geographic locale in response to a received signal indicative of identifying information of the item, the received signal generated directly in response to a presence of the item within the geographic locale;
　　　　(ii) obtain in direct response to the identity of the item a first supply-chain assistance corresponding to the identified item from a first source and obtain a second supply-chain assistance corresponding to the identified item from a second source; and
　　　　(iii) facilitate saving an aggregation of the first supply-chain assistance and the second supply-chain assistance.

36. The computer program product of claim 35, wherein the obtain in direct response to the identity of the item a first supply-chain assistance corresponding to the identified item from a first source includes
　　obtain in direct response to the identity of the item in direct response to the identity of the item a first supply-chain assistance corresponding to the identified item from a first source over the network.

37. The computer program product of claim 35, wherein the obtain in direct response to the identity of the item a second supply-chain assistance corresponding to the identified item from a second source includes
　　obtain in direct response to the identity of the item a second supply-chain assistance corresponding to the identified item from a second source over the network.

38. A system comprising:
　　a) a sensor operable independent of human action to generate signals indicative of items present within a geographic locale;
　　b) a computing device including a storage medium, and operable to receive the signals indicative of items present within the geographic locale and to access a computer network; and
　　c) instructions that when executed on the computing device cause the computing device to:
　　　　(i) receive a signal generated by the sensor and indicative of an item present within the geographic locale;
　　　　(ii) in response to a received user request for a supply-chain assistance, obtain a first a supply-chain assistance corresponding to the item from a first source and obtain a second a supply-chain assistance corresponding to the item from a second source from the network; and
　　　　(iii) aggregate the first supply-chain assistance and the second supply-chain assistance.

39. The system of claim 38, wherein the instructions further include:
　　　　(iv) broadcast the aggregated supply-chain assistance.

* * * * *

UNITED STATES PATENT AND TRADEMARK OFFICE
CERTIFICATE OF CORRECTION

PATENT NO. : 7,694,881 B2 Page 1 of 1
APPLICATION NO. : 11/061387
DATED : April 13, 2010
INVENTOR(S) : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this
Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,694,881 B2  
APPLICATION NO. : 11/061387  
DATED : April 13, 2010  
INVENTOR(S) : Edward K. Y. Jung et al.

It is certified that error appears in the above-identified patent and that said Letters Patent is hereby corrected as shown below:

Please apply the following corrections

Column 35, Line 25: -- a) receiving a signal indicative of an item ~~and machine~~ --

Column 35, Line 27: -- within a geographic locale; ~~and~~ --

Column 35, Line 30: -- item; ~~and~~ --

Column 35, Line 33: -- presence within a geographic locale: --

Column 36, Line 9: -- (i) identify an item having a ~~present~~presence within a geographic --

Column 36, Line 22: -- 36. The ~~computer program product~~system of claim 35, wherein --

Column 36, Line 30: -- 37. The ~~computer program product~~system of claim 35, wherein --

Column 36, Line 51: -- chain assistance, obtain a first ~~a~~ supply-chain --

Column 36, Line 53: -- obtain a second ~~a~~ supply-chain assistance --

Signed and Sealed this  
Tenth Day of May, 2011

David J. Kappos  
*Director of the United States Patent and Trademark Office*